(12) United States Patent
Taylor et al.

(10) Patent No.: US 6,461,231 B1
(45) Date of Patent: Oct. 8, 2002

(54) AIR ABRASIVE BLAST LINE TRAVEL MACHINE

(75) Inventors: Sidney A. Taylor; Stanley J. Rogala; Andrzej Stenzel, all of Houston, TX (US)

(73) Assignee: CRC-Evans Rehabilitation Systems, Inc., Houston, TX (US)

( * ) Notice: Subject to any disclaimer, the term of this patent is extended or adjusted under 35 U.S.C. 154(b) by 0 days.

(21) Appl. No.: 08/327,489

(22) Filed: Oct. 21, 1994

Related U.S. Application Data

(63) Continuation-in-part of application No. 08/104,171, filed on Aug. 6, 1993, now Pat. No. 5,458,683, which is a continuation-in-part of application No. 07/911,759, filed on Jul. 10, 1992, now abandoned, which is a continuation-in-part of application No. 07/567,238, filed on Aug. 14, 1990, now Pat. No. 5,129,355.

(51) Int. Cl.[7] ................................................. B24C 3/06
(52) U.S. Cl. ........................................ 451/92; 451/88
(58) Field of Search ............................. 451/92, 76, 75, 451/87, 88, 102; 118/72, 73, DIG. 11; 15/104.04

(56) References Cited

U.S. PATENT DOCUMENTS

| | | | |
|---|---|---|---|
| 1,375,979 A | 4/1921 | Taber | |
| 1,611,920 A | 12/1926 | Kinzbach | |
| 1,796,691 A | 3/1931 | Janzen | |
| 1,815,573 A | 7/1931 | McManis | |
| 1,821,352 A | 9/1931 | McManis | |
| 1,829,831 A | 11/1931 | Hiskey | |
| 1,898,964 A | 2/1933 | Jinnett | |
| 1,899,379 A | 2/1933 | Adams | |
| 1,910,497 A | 5/1933 | Peik | |
| 1,926,387 A | 9/1933 | Jansen | |
| 1,941,002 A | 12/1933 | Harrison | 242/11 |
| 2,044,778 A | 6/1936 | Halstead | |

(List continued on next page.)

FOREIGN PATENT DOCUMENTS

| | | |
|---|---|---|
| CA | 988403 | 5/1976 |
| CA | 1043056 | 11/1978 |
| CA | 1080918 | 7/1980 |
| CA | 1131418 | 9/1982 |
| CA | 1211352 | 9/1986 |
| CA | 2072615 | 7/1991 |
| EP | 0000808 | 7/1978 |
| EP | 0105545 | 4/1984 |

(List continued on next page.)

OTHER PUBLICATIONS

M. Hashish, "Cutting With Abrasive Waterjets", *Mechanical Engineering*, pp. 60–69, Mar., 1984.
Canadian Ultra Pressure Services Inc. Bulletin, one page, published Nov., 1987.
Canadian Ultra Pressure Services Inc. Brochure, 28 pages, published Dec., 1987.
Butterworth Jetting Systems Inc. Brochure, "20,000 PSI Waterjetting", 4 pages, published Sep., 1986.

(List continued on next page.)

*Primary Examiner*—Robert A. Rose
(74) *Attorney, Agent, or Firm*—Sidley Austin Brown & Wood LLP

(57) ABSTRACT

A pipeline treating apparatus (10) is disclosed which is used to clean the exterior of a pipeline (12) with high pressure air with entrained abrasive. The apparatus has an improved classifier and separator to separate the abrasive grit from lighter debris which includes a classifier and separator within a manifold duct (56) which returns the grit to a collection pan (40) for recovery and causes the lighter airborne dust to be removed through a return duct (58). A series of pressure relief filters (82) reduce the air pressure within a blast chamber (28) and resist debris escaping from the blast chamber past the triple seals (76, 78, 80). The blast nozzle assemblies (834) are attached to the nozzle oscillating frames by snap fittings (74) which avoids threaded connections which may become contaminated by the debris.

19 Claims, 50 Drawing Sheets

U.S. PATENT DOCUMENTS

| | | |
|---|---|---|
| 2,053,307 A | 9/1936 | Wilson |
| 2,302,196 A | 11/1942 | Downs et al. |
| 2,460,989 A | 2/1949 | Kraner |
| 2,556,116 A | 6/1951 | Smith |
| 2,576,861 A | 11/1951 | Shaw et al. |
| 2,597,021 A | 5/1952 | Norris |
| 2,600,358 A | 6/1952 | Bolton et al. |
| 2,611,146 A | 9/1952 | Buckley |
| 2,621,446 A | 12/1952 | Russell |
| 2,651,312 A | 9/1953 | McBeth |
| 2,685,293 A | 8/1954 | Dauphinee et al. |
| 2,741,878 A | 4/1956 | Morain |
| 2,782,436 A | 2/1957 | Tomer |
| 2,790,230 A | 4/1957 | Sobek |
| 2,858,555 A | 11/1958 | Medovick |
| 2,869,291 A | 1/1959 | Clay |
| 2,896,644 A | 7/1959 | Emanuel |
| 2,900,992 A | 8/1959 | Johnson |
| 2,933,802 A | 4/1960 | Fuchs |
| 2,990,653 A | 7/1961 | Browning |
| 3,023,756 A | 3/1962 | Proctor |
| 3,033,125 A | 5/1962 | Pleuger |
| 3,033,215 A | 5/1962 | Miller |
| 3,050,759 A | 8/1962 | Betzel, Sr. |
| 3,324,867 A | 6/1967 | Freese |
| 3,362,109 A | 1/1968 | Wallace |
| 3,391,701 A | 7/1968 | Richardson et al. |
| 3,407,099 A | 10/1968 | Schell |
| 3,432,872 A | 3/1969 | Kirschke |
| 3,439,649 A | 4/1969 | Probst et al. |
| 3,468,362 A | 9/1969 | Burkhardt et al. |
| 3,689,311 A | 9/1972 | Loeffler et al. |
| 3,698,029 A | 10/1972 | Pulliam |
| 3,760,824 A | 9/1973 | Edwards et al. |
| 3,773,059 A | 11/1973 | Arneson |
| 3,902,513 A | 9/1975 | Franz |
| 3,916,925 A | 11/1975 | Crump |
| 3,933,519 A | 1/1976 | Koch et al. |
| 3,942,565 A | 3/1976 | Ratelle et al. |
| 3,984,254 A | 10/1976 | Alexandrov et al. |
| 3,994,766 A | 11/1976 | Dedels |
| 4,005,677 A | 2/1977 | Hart |
| 4,007,705 A | 2/1977 | Sherer et al. |
| 4,013,518 A | 3/1977 | Miko |
| 4,092,357 A | 5/1978 | Greco et al. |
| 4,110,862 A | 9/1978 | Buzkinsky et al. |
| 4,125,119 A | 11/1978 | Haas |
| 4,139,318 A | 2/1979 | Jakob et al. ............... 404/90 |
| 4,146,406 A | 3/1979 | Sampsell |
| 4,161,956 A | 7/1979 | Hadgkiss |
| 4,169,427 A | 10/1979 | Crump et al. |
| 4,185,359 A | 1/1980 | Niccols |
| 4,205,694 A | 6/1980 | Thompson et al. |
| 4,219,155 A | 8/1980 | Goerss |
| 4,225,362 A | 9/1980 | Sentell |
| 4,231,239 A | 11/1980 | Lazaroff |
| 4,237,817 A | 12/1980 | Hart et al. |
| 4,237,913 A | 12/1980 | Maasberg |
| 4,244,524 A | 1/1981 | Wellings |
| 4,337,784 A | 7/1982 | Goerss |
| 4,376,443 A | 3/1983 | Mondy, Jr. |
| 4,443,271 A | 4/1984 | Goerss |
| 4,445,451 A | 5/1984 | van den Broek |
| 4,460,005 A | 7/1984 | Rodger |
| 4,509,544 A | 4/1985 | Mains, Jr. |
| 4,552,594 A | 11/1985 | van Voskuilen et al. |
| 4,563,841 A | 1/1986 | Hart et al. |
| 4,569,159 A | 2/1986 | Wern et al. |
| 4,595,607 A | 6/1986 | Betteridge et al. |
| 4,603,516 A * | 8/1986 | Hoffman ..................... 451/92 |
| 4,677,936 A | 7/1987 | Dahlem |
| 4,677,998 A | 7/1987 | van Voskuilen et al. |
| 4,716,916 A | 1/1988 | Hodge |
| 4,718,439 A | 1/1988 | Gorra et al. |
| 4,734,950 A | 4/1988 | Schenke et al. |
| 4,771,499 A | 9/1988 | Fusi et al. |
| 4,785,588 A | 11/1988 | Woodward |
| 4,788,993 A | 12/1988 | Beer et al. |
| 4,809,720 A | 3/1989 | Heraty |
| 4,811,902 A | 3/1989 | Nagata |
| 4,830,882 A | 5/1989 | Ichinose et al. |
| 4,872,294 A | 10/1989 | Watts |
| 4,931,322 A | 6/1990 | Yamamoto et al. |
| 4,951,600 A | 8/1990 | Sochi et al. |
| 4,953,496 A | 9/1990 | Taylor et al. |
| 4,989,785 A | 2/1991 | Walendowski |
| 5,001,801 A | 3/1991 | Jarvis et al. |
| 5,052,423 A | 10/1991 | Chapman et al. |
| 5,056,271 A * | 10/1991 | Rose ........................... 451/92 |
| 5,069,234 A * | 12/1991 | Nielsen ....................... 451/92 |
| 5,074,323 A | 12/1991 | Chapman et al. |
| 5,085,016 A | 2/1992 | Rose |
| 5,091,034 A | 2/1992 | Hubert |
| 5,092,357 A | 3/1992 | Chapman et al. |
| 5,107,633 A * | 4/1992 | Rose ........................... 451/92 |
| 5,129,355 A | 7/1992 | Taylor et al. |
| 5,134,810 A * | 8/1992 | Carpenter ................... 451/92 |
| 5,136,969 A | 8/1992 | Chapman |
| 5,191,740 A | 3/1993 | Rose |
| 5,199,226 A | 4/1993 | Rose |
| 5,207,833 A | 5/1993 | Hart |
| 5,209,245 A | 5/1993 | Chapman et al. |
| 5,226,973 A | 7/1993 | Chapman et al. |
| 5,520,734 A | 5/1996 | Taylor et al. ............... 118/307 |

FOREIGN PATENT DOCUMENTS

| | | |
|---|---|---|
| EP | 0214841 | 3/1987 |
| EP | 0343878 | 11/1989 |
| EP | 0408883 | 1/1991 |
| EP | 0478922 | 4/1992 |
| EP | 0 578 343 A1 | 1/1994 |
| EP | 0 710 511 A1 | 5/1996 |
| GB | 1516903 | 7/1978 |
| GB | 2018626 | 10/1979 |
| JP | 5450158 | 4/1979 |
| JP | 59232770 | 12/1984 |
| JP | 60121286 | 6/1985 |
| JP | 123269/1987 | 8/1987 |
| JP | 181475/1988 | 11/1988 |
| NL | 8203501 | 9/1982 |
| NL | 8 500 048 A | 8/1986 |
| RU | 1276379 | 12/1984 |
| SU | 1136859 | 1/1985 |
| WO | 9111293 | 8/1991 |

OTHER PUBLICATIONS

Soviet Inventions Illustrated, P,Q Sections, Week 8533, Sep. 25, 1985, Derwent Publications Ltd., London, SU–1136–859 (Natural Gas Resins).

Soviet Patents Abstracts, P,Q Section, Week 8839, Nov. 9, 1988, Derwent Publications, SU–1380–810 (Mentyukov).

Sidney A. Taylor et al., "Over ditch coating removal a key to cutting rehab costs" (Pipeline Rehabilitation 2–Parts), Oil & Gas Journal, Feb. 7 and 14, 1994 editions by *PennWell Publishing Company*, pp. 2–7.

* cited by examiner

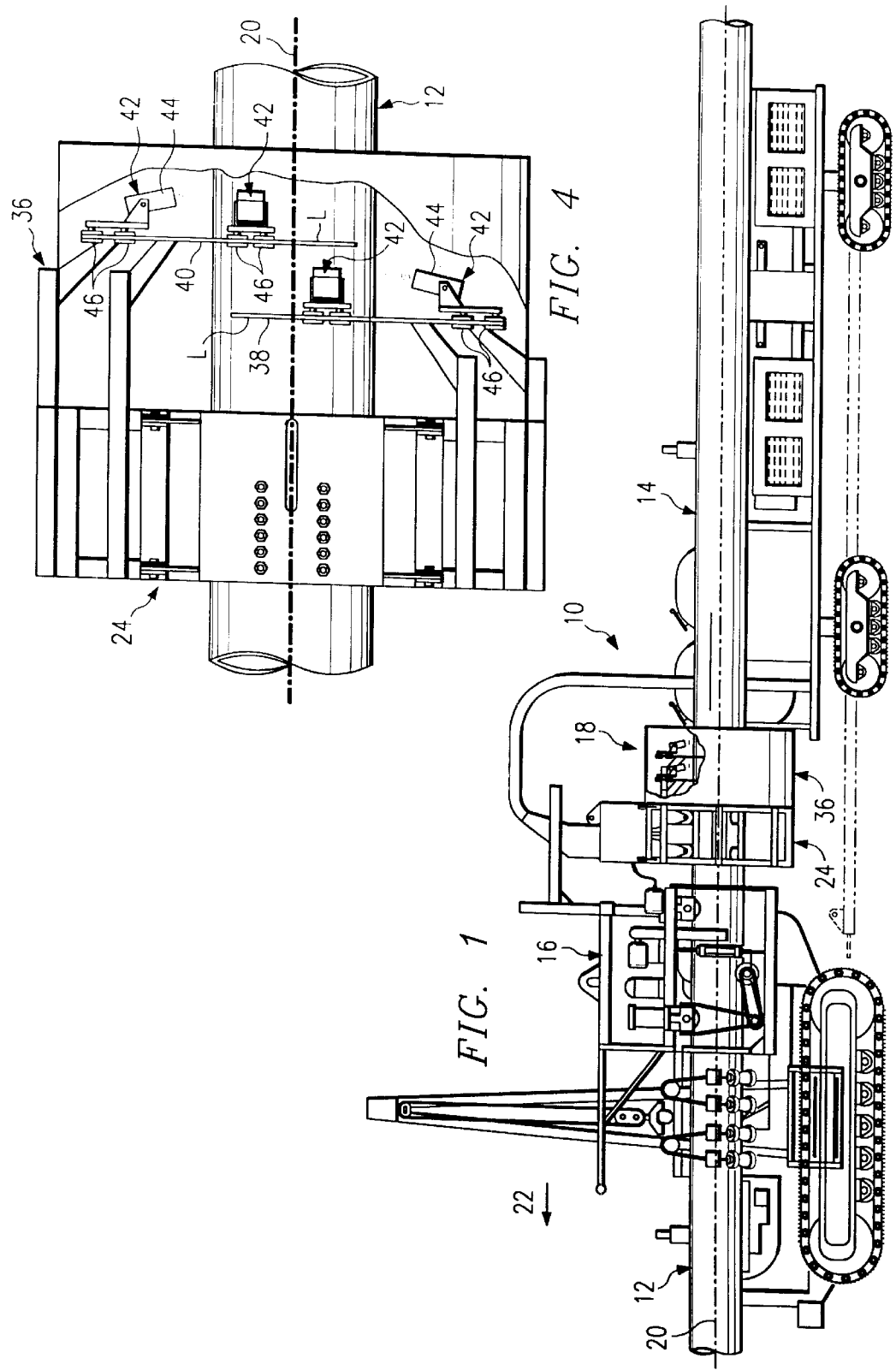

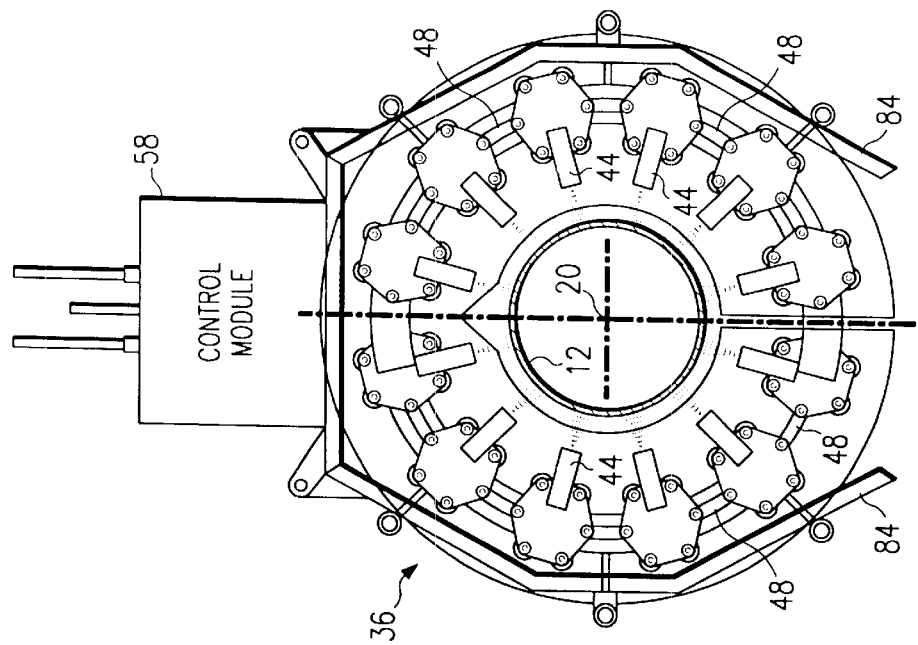
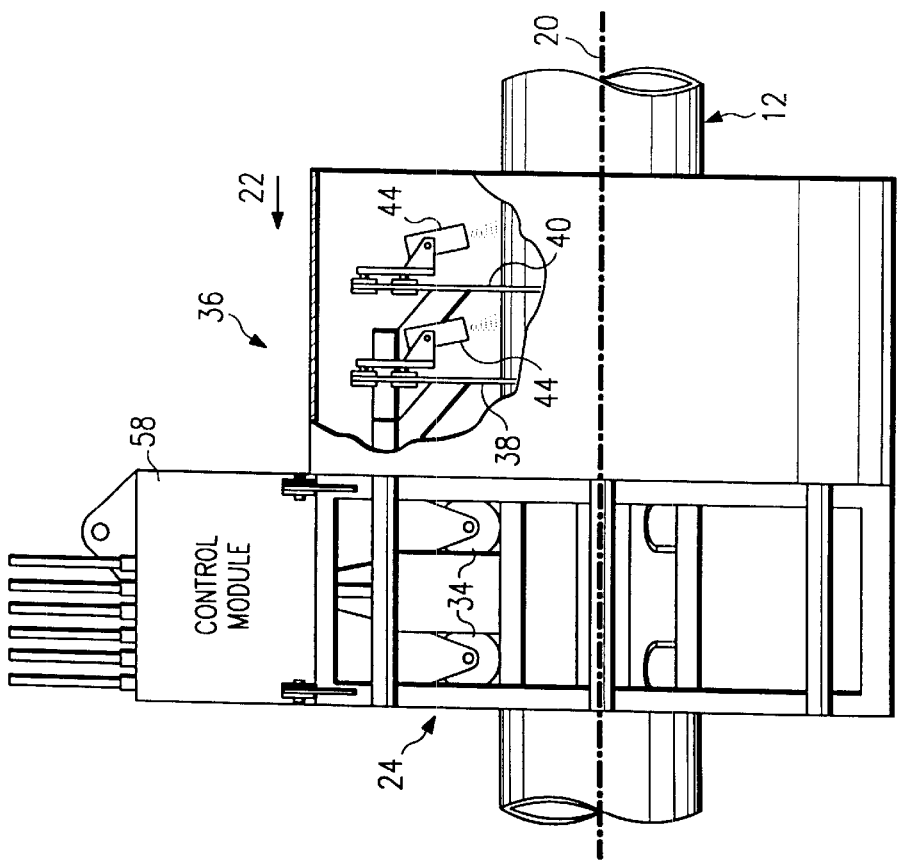

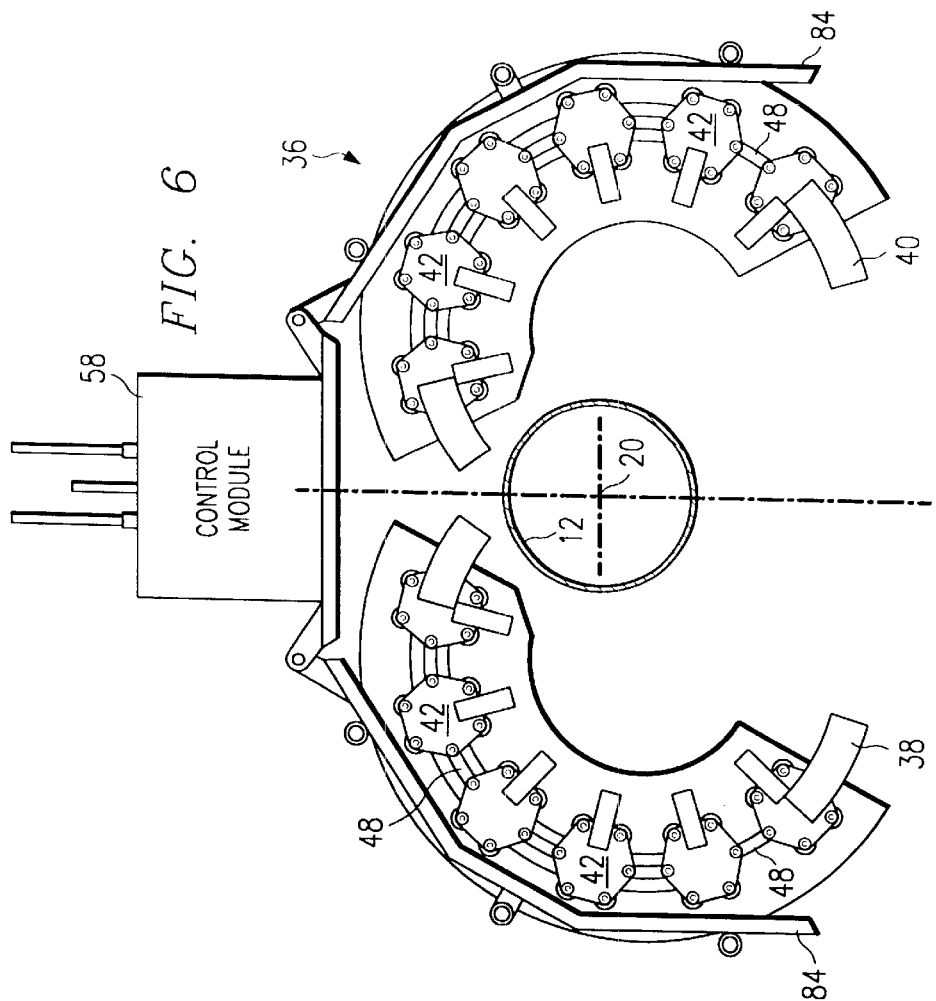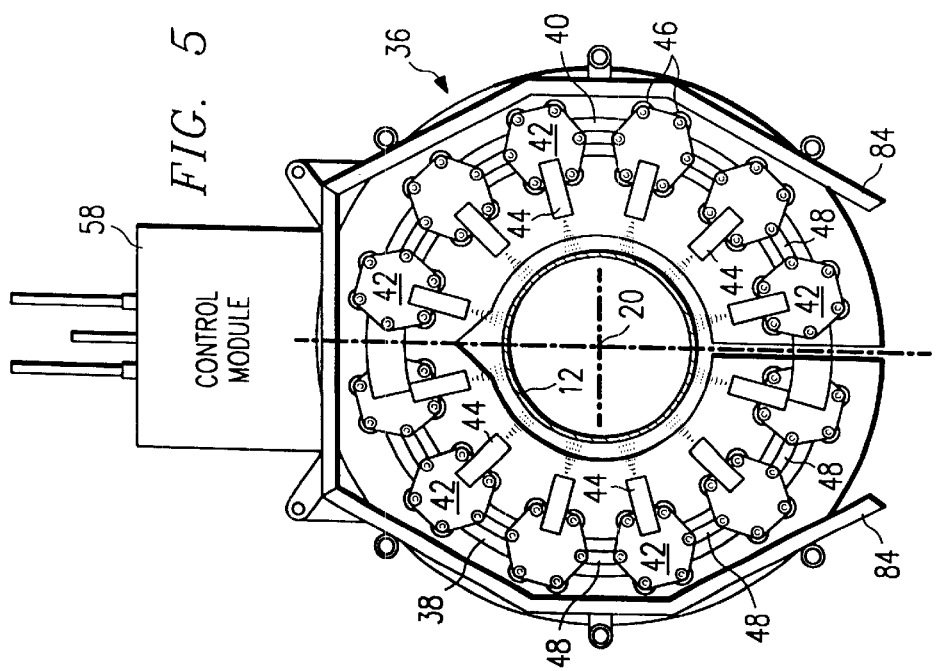

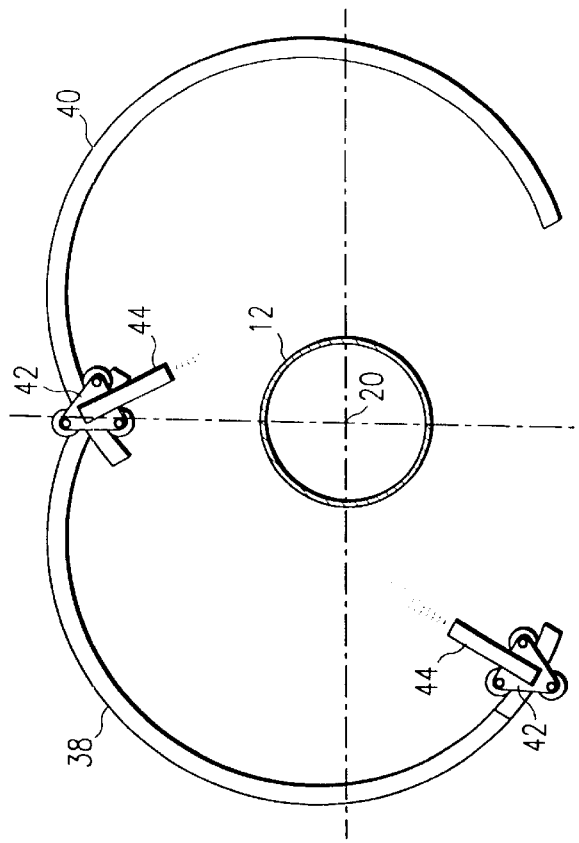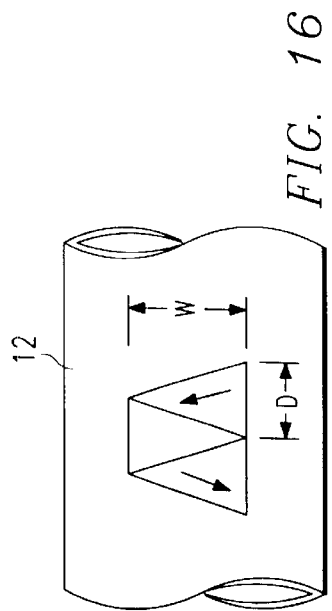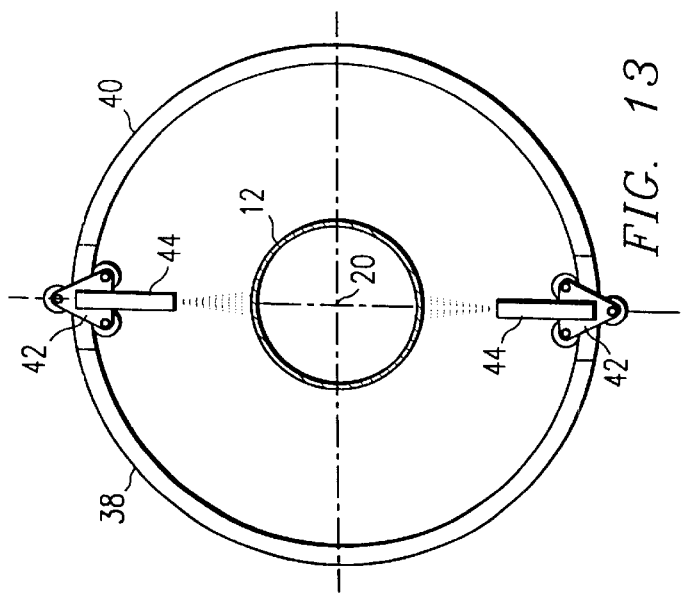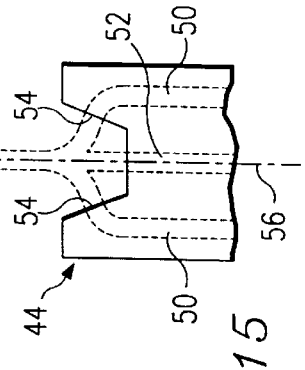
FIG. 14
FIG. 16
FIG. 13
FIG. 15

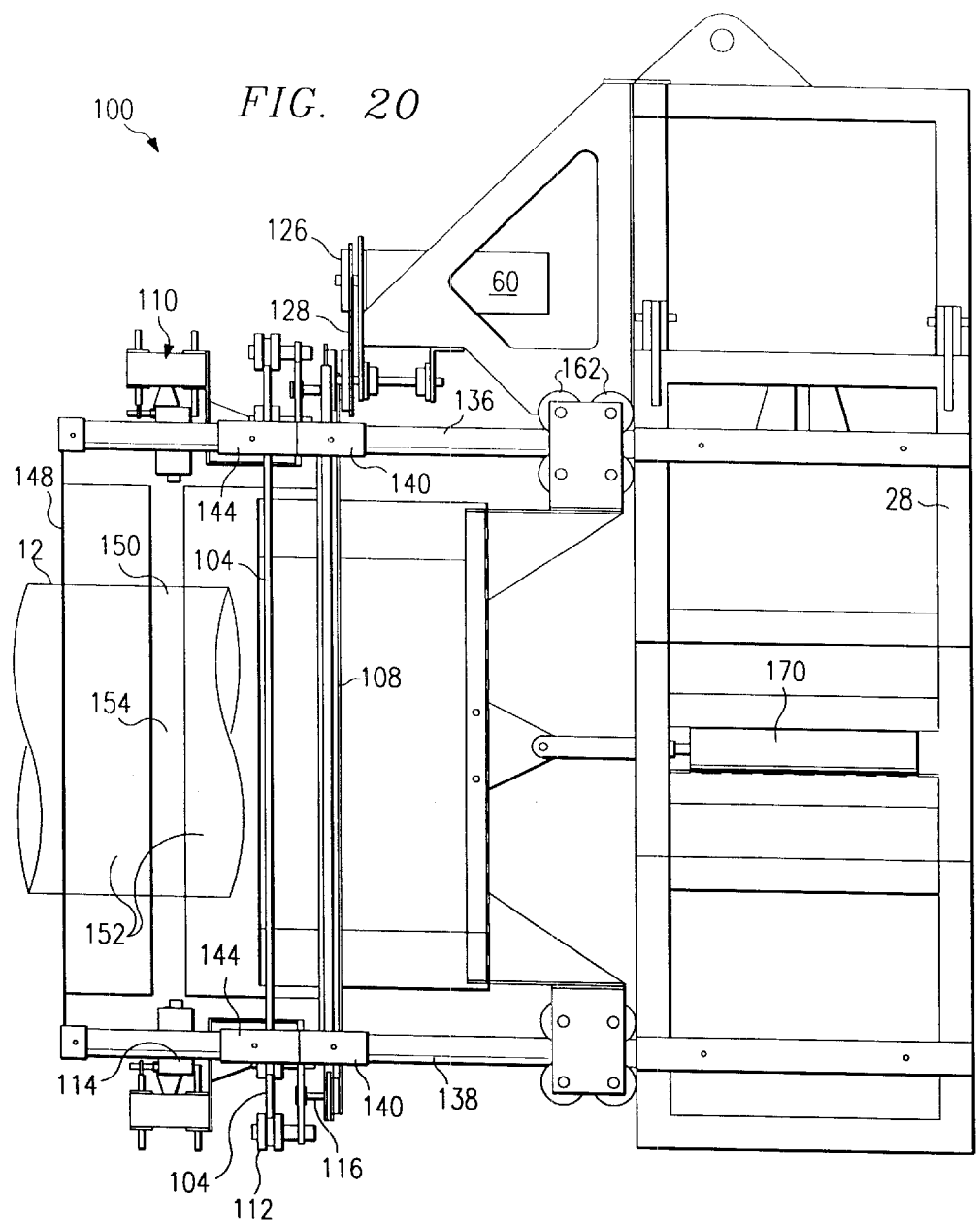

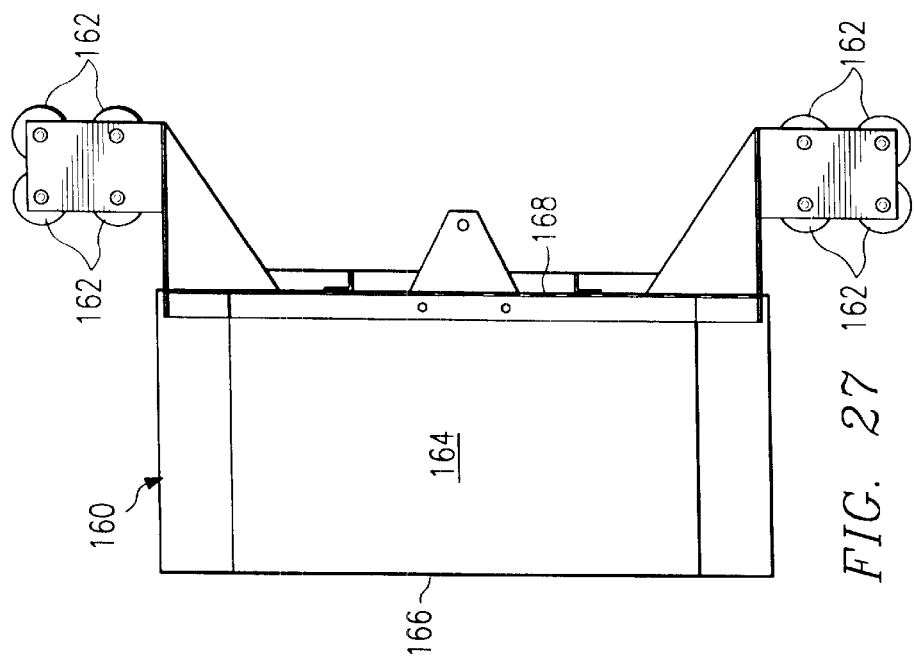
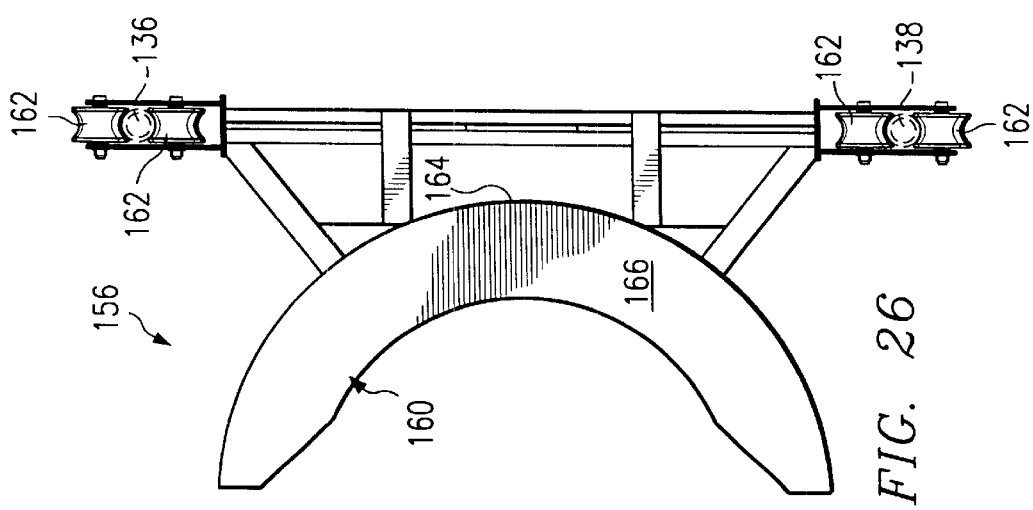

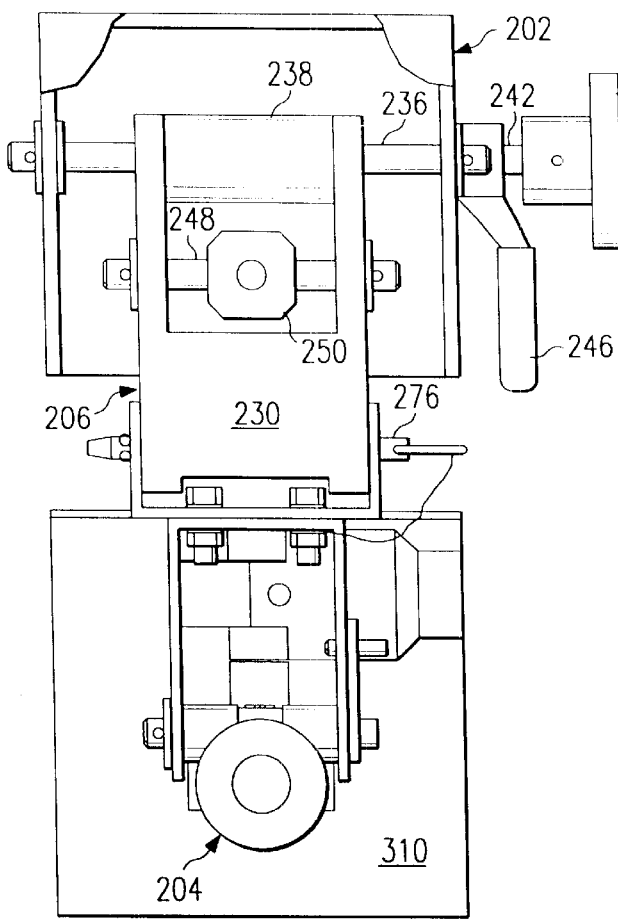
FIG. 31
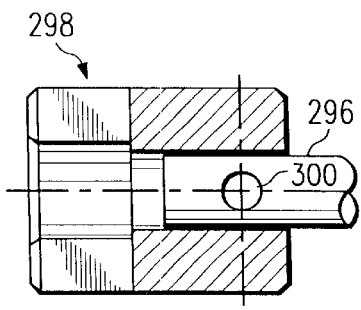
FIG. 37
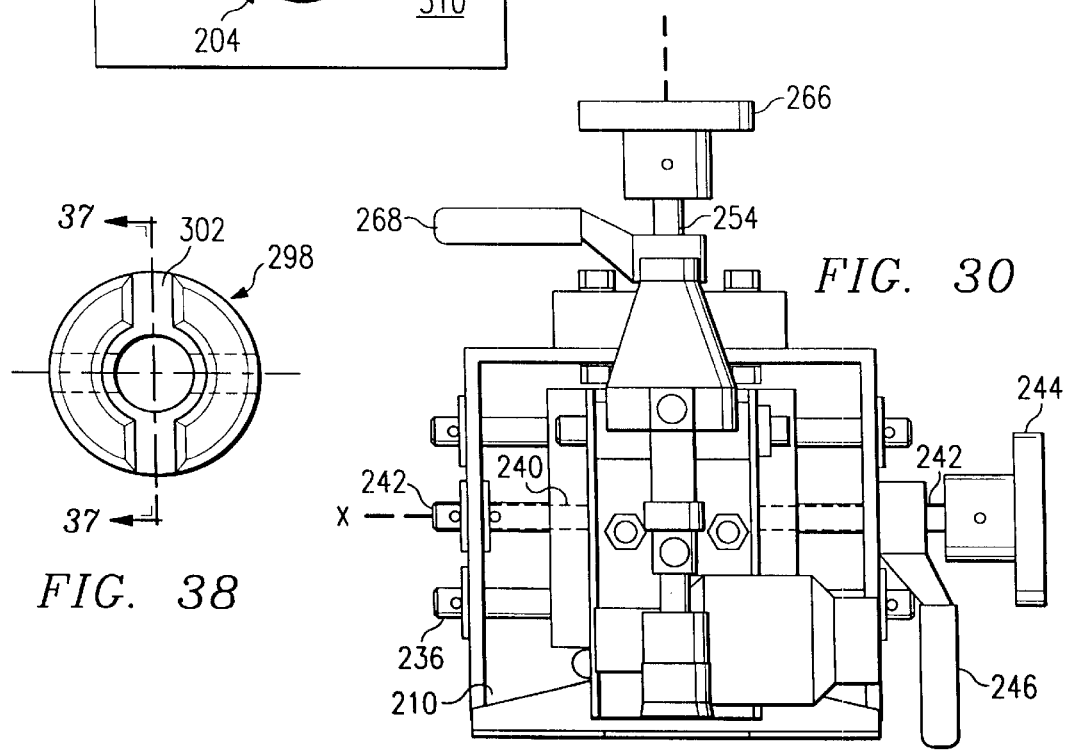
FIG. 38
FIG. 30

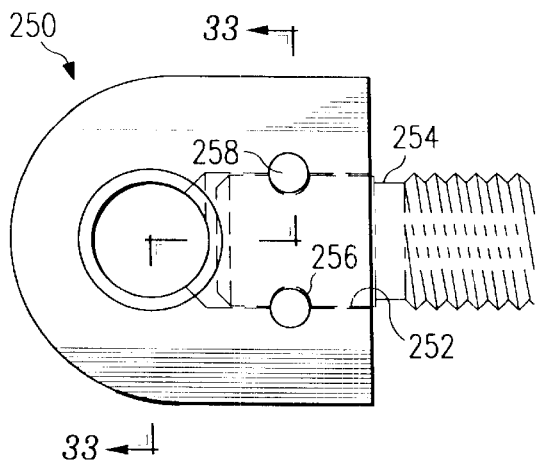
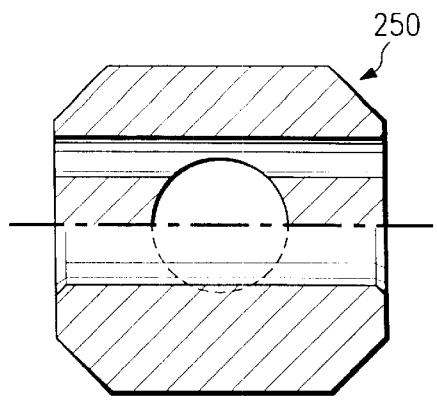
FIG. 32  FIG. 33
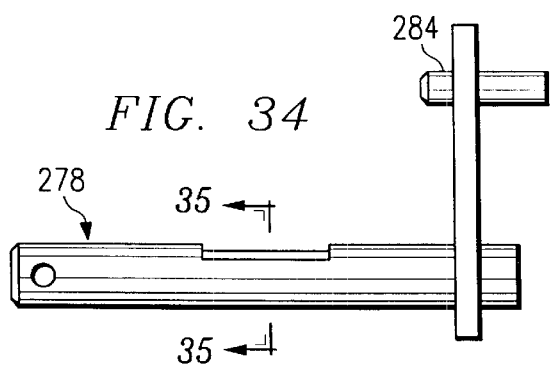
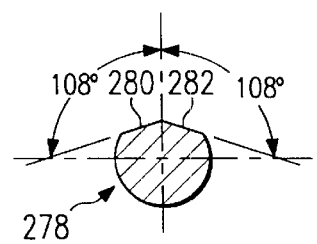
FIG. 34  FIG. 35
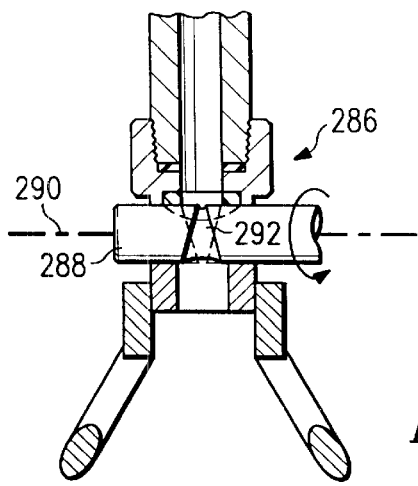
FIG. 36

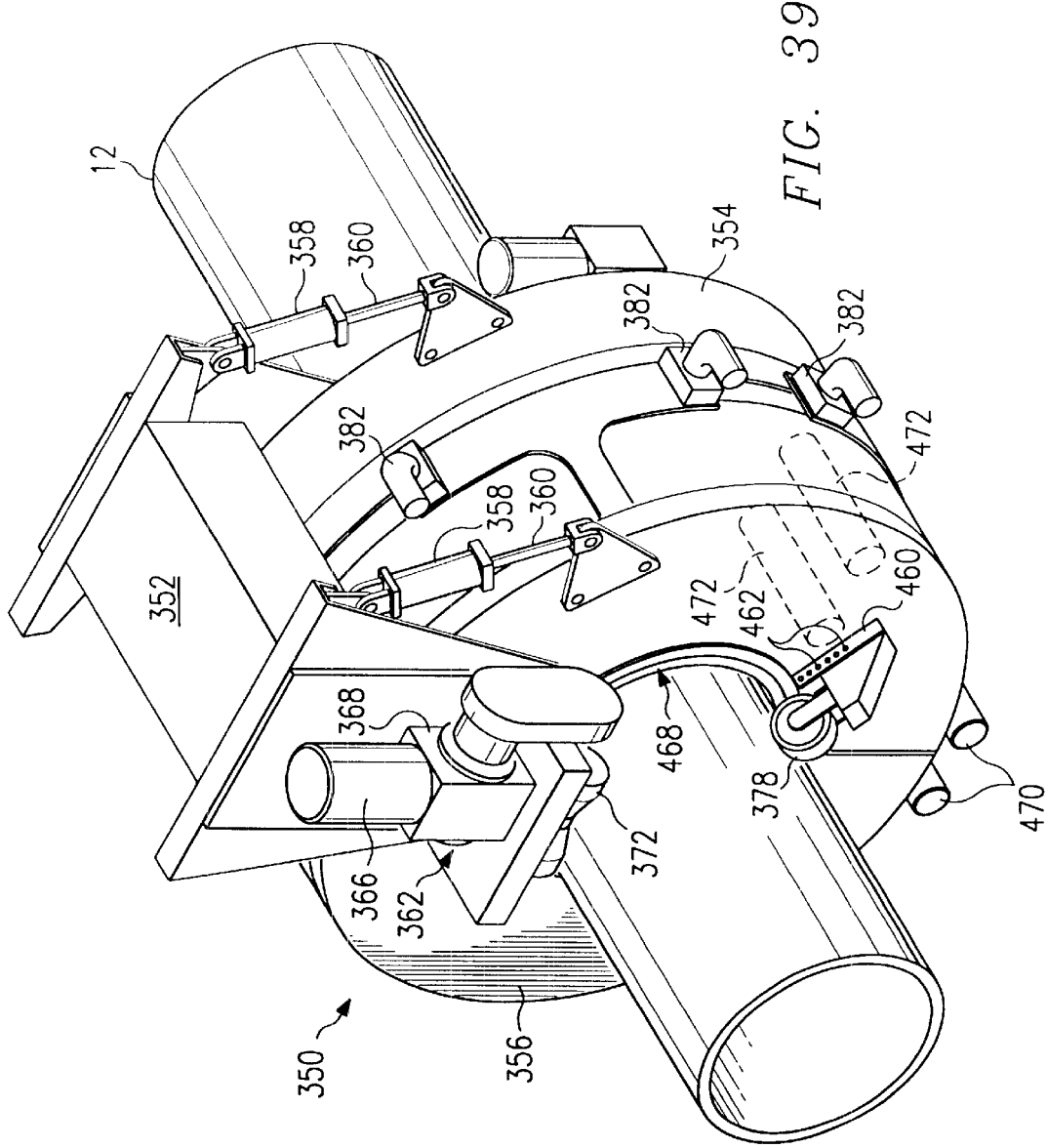

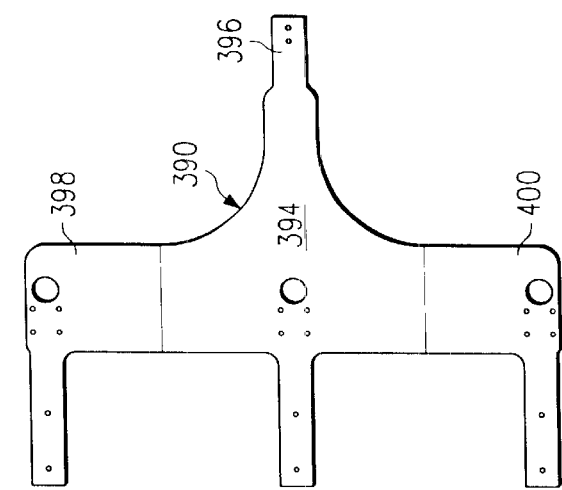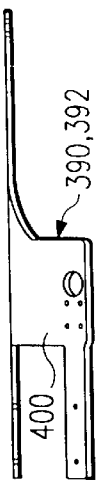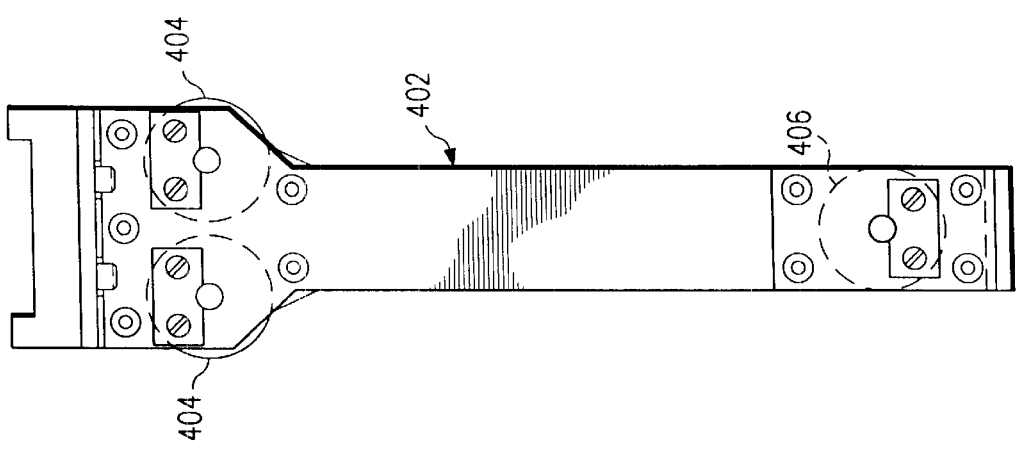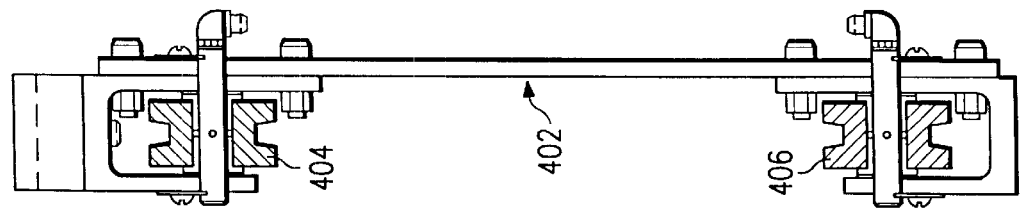

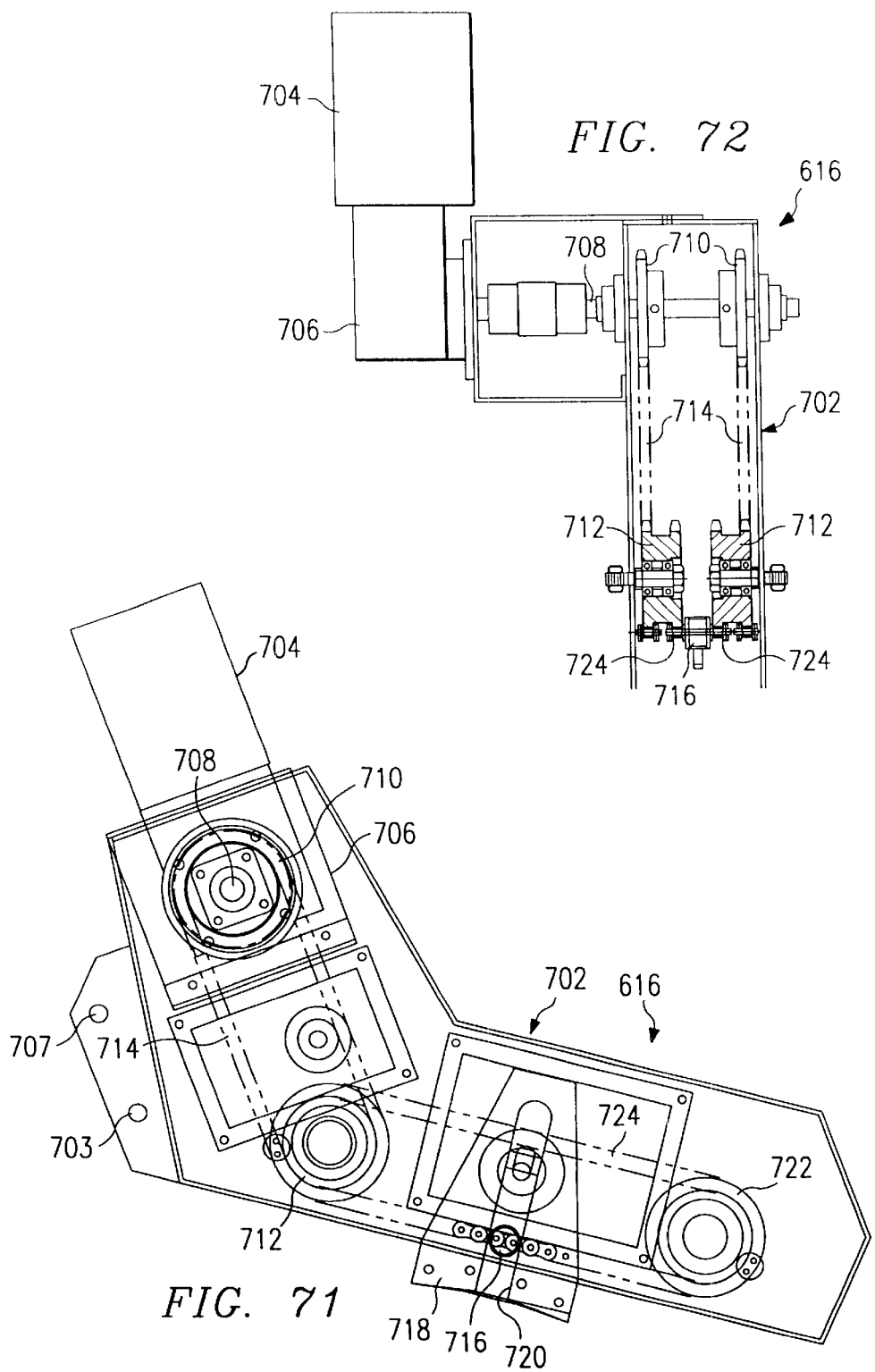

AIR ABRASIVE BLAST LINE TRAVEL MACHINE

CROSS REFERENCE TO RELATED APPLICATION

This application is a continuation-in-part of application Ser. No. 08/104,171 filed Aug. 6, 1993, now U.S. Pat. No. 5,458,683 which is a continuation-in-part of application Ser. No. 07/911,759 filed Jul. 10, 1992, now abandoned which is a continuation-in-part of application Ser. No. 07/567,238 filed Aug. 14, 1990 now U.S. Pat. No. 5,129,355.

TECHNICAL FIELD OF THE INVENTION

This invention relates to a machine for traveling along a pipe or pipeline to clean the surface with an abrasive.

BACKGROUND OF THE INVENTION

A pipeline is typically coated with a protective coating, such a protective tape or other material. After a period of time underground, this coating will deteriorate, requiring the pipeline to be dug up, the old coating removed and a new coating applied in order to maximize the life of the pipeline.

The cleaning of an older coating on a pipeline should be accomplished as rapidly as possible, as inexpensively as possible, and with minimum damage to the pipeline itself. There is a growing need for this service as many pipelines have now been underground sufficiently long that they do need to be treated. Further, improved coatings are being developed which make it desirable to remove the lesser effective original coatings and replace them with the new coatings.

A need therefore exists for a machine and process which cleans a pipeline quickly and effectively.

SUMMARY OF THE INVENTION

In accordance with one aspect of the present invention, a pipeline treating apparatus is provided for treating the exterior surface of a pipeline. The apparatus includes a housing defining an enclosed chamber about a portion of the exterior surface of the pipeline. A treating mechanism is mounted on the housing to treat the exterior surface of the pipeline with a treating media, the treating media removing debris from the exterior surface of the pipeline. A classifier and separator unit is mounted on the housing to separate the debris and the treating media to permit disposal of the debris and recycling of the treating media to the treating mechanism. A collector assembly is mounted on the housing to remove the debris and treating media from the enclosed chamber to the classifier and separator unit.

BRIEF DESCRIPTION OF THE DRAWINGS

The present invention will be better understood upon reading the detailed description set forth below in connection with the following drawings, wherein:

FIG. 1 is a side view of an automated pipeline treating apparatus forming a first embodiment of the present invention;

FIG. 2 is a side view of the automated jet cleaning unit used in the apparatus of FIG. 1;

FIG. 3 is a front view of the automated jet cleaning unit of FIG. 2;

FIG. 4 is a top view of the automated jet cleaning unit of FIG. 2;

FIG. 5 is an end view of the nozzle carriage assembly and abrasive cleaning nozzles utilized in the apparatus;

FIG. 6 is an end view of the nozzle carriage assembly and abrasive cleaning nozzles with the arcuate rings on which the nozzles are mounted pivoted to the removal position;

FIG. 13 is an illustrative view of the arcuate rings and abrasive cleaning nozzles in the operating position;

FIG. 14 is an illustrative view of the arcuate rings pivoted to the removal position.

FIG. 15 is an illustrative view of the nozzle used in the apparatus;

FIG. 16 is an illustrative view of the travel path of the spray from the nozzle;

FIG. 20 is a simplified side view of the apparatus of FIG. 17;

FIG. 26 is an end view of a shield assembly in the apparatus of FIG. 17;

FIG. 27 is a side view of the shield assembly;

FIG. 30 is an end view of the nozzle assembly;

FIG. 31 is a top view of the nozzle assembly;

FIG. 32 is a side view of the nut to adjust the gun in the y direction;

FIG. 33 is a top view of the nut of FIG. 32;

FIG. 34 is a side view of the gun mount pin;

FIG. 35 is a cross-sectional view taken through lines 35—35 in the direction of arrows in FIG. 34;

FIG. 36 is a cross-sectional view of the reversible nozzle;

FIG. 37 is a side view of the nozzle adapter;

FIG. 38 is an end view of the nozzle adapter;

FIG. 39 is a perspective view of a pipeline treating apparatus forming a fourth embodiment of the present invention;

FIG. 49 is a side view of a carriage used in the apparatus;

FIG. 50 is a front view of the carriage of FIG. 49;

FIG. 51 is a top view of a bracket used in the apparatus;

FIG. 52 is a side view of a bracket of FIG. 51;

FIG. 71 is a side view in partial cross-section of the first oscillation drive of the carriage;

FIG. 72 is a top view in partial cross-section of the first oscillation drive of the carriage;

DETAILED DESCRIPTION

Figure 8:
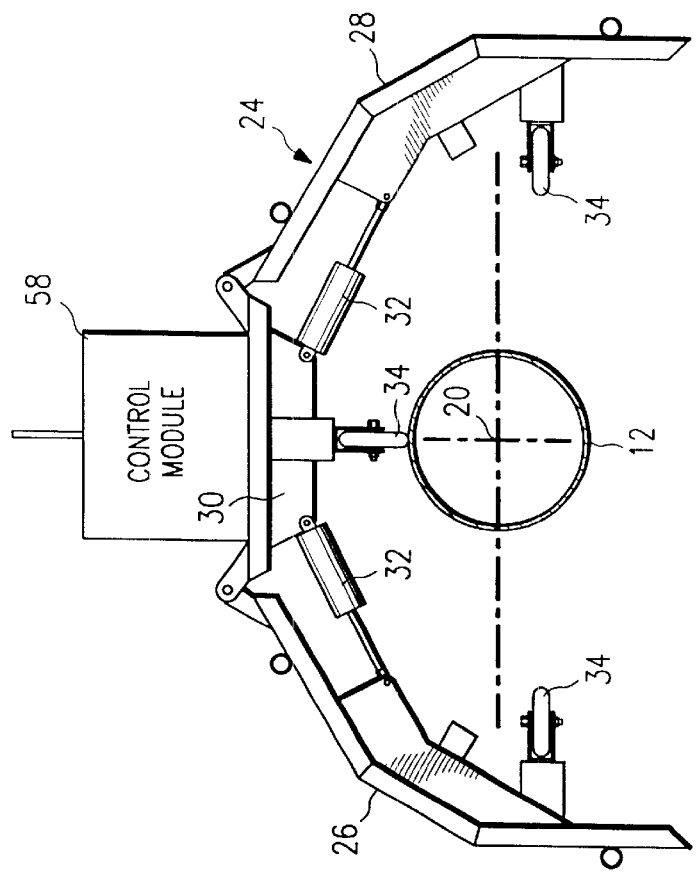
FIG. 8 is an end view of the centering apparatus in the removal position.

With reference now to the accompanying drawings, wherein like reference numerals designate like or similar parts throughout the several views, an automated pipeline treating apparatus 10 forming a first embodiment of the invention is illustrated in FIGS. 1–16. The apparatus 10 is used to clean and/or coat a pipeline 12, which can be either a new pipeline or a previously coated pipeline in need of rehabilitation. Typically, the pipeline to be rehabilitated will be a pipeline which has just been uncovered and raised out of the ditch with the original coating on the pipeline having degraded to a condition that is no longer serviceable.

In various modes of the apparatus 10, the apparatus can be used to clean any old coating off the pipeline and condition the outer surface of the pipeline itself for a new coating. In another mode, the apparatus 10 can be used to spray on the new coating once the pipeline surface has been prepared.

In the cleaning and surface preparation mode, the apparatus 10 includes three major sections, a sled unit 14, a travel unit 16 and an automated jet cleaning unit 18. The sled unit 14 is commonly mounted on tracks which is pulled parallel to the pipeline being treated and the weight of the sled unit thus has no effect whatsoever on the pipeline. In contrast, the travel unit 16 and automated jet cleaning unit 18 are supported on the pipeline itself for movement along the axis 20 of the pipe in the direction of arrow 22. The weight of the travel unit and automated jet cleaning unit will be such as to be readily carried by the pipeline without damage. The weight of these units does not have to be supported by a side boom or other lifting device during operation.

Figure 7:
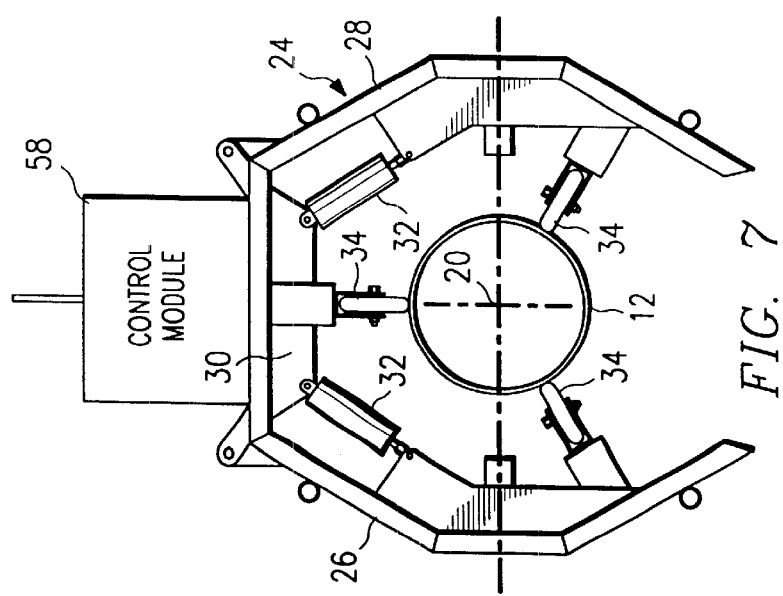
FIG. 7 is an end view of the centering assembly used in the apparatus centered about a pipeline.

With reference to FIGS. 2–8, various details of the automated jet cleaning unit 18 can be further described. The unit 18 includes a centering assembly 24. As best shown in FIGS. 7 and 8, the centering assembly 24 can be seen to include pivotal arms 26 and 28 which pivot on frame member 30 through the action of air cylinders 32 between an operating position, shown in FIG. 7, and an installation or removal position, shown in FIG. 8. Each of the arms, and the frame member mount an aligned pair of guide wheels 34 to support the centering assembly 24 on the pipeline. In the operating position, as seen in FIG. 7, the three pairs of guide wheels are distributed at 120° from each other around the pipeline so that the centering assembly 24 is centered on the pipeline. preferably, air pressure is maintained in cylinders 32 when the centering assembly is in the operating position to hold wheels 34 firmly against the pipeline to keep the centering assembly centered on the axis 20 of the pipe despite weld joints and surface irregularities.

Attached to the centering assembly 24 is a nozzle carriage assembly 36. The nozzle carriage assembly 36 includes two arcuate rings 38 and 40. Ring 38 is rigidly secured to arm 26. Ring 40 is similarly rigidly secured to arm 28. Thus, as seen in FIG. 6, as the cylinders 32 operate to pivot arms 26 and 28 into the installation or removal position, the arcuate rings 38 and 40 are similarly deployed.

As best seen in FIG. 4, the rings 38 and 40 are spaced apart a distance L from each other along the pipeline axis 20. The rings preferably have an arc greater than 180°. The radius of the rings 38 and 40 is selected so that the rings are concentric with the pipeline axis 20 when the arms 26 and 28 are in the operating position. Thus, in the operating position, the rings 38 and 40 are at a constant distance from the outer surface of the pipeline about the entire circumference of the pipeline.

Mounted on the arcuate rings 38 and 40 are a series of abrasive cleaning nozzle carriages 42, with each carriage supporting an abrasive cleaning nozzle 44. There are illustrated six carriages and nozzles on each of the rings 38 and 40. However, this number can be varied as will be described in detail hereinafter.

Each of the carriages 42 is supported on a ring by a series of wheels 46 guided on the inner and outer edges of the ring to permit the carriage and attached nozzle to move in an arcuate manner along the ring. Each of the carriages on a particular ring are interconnected by links 48 pivoted between adjacent carriages. Thus, motion of a carriage will be mirrored by the motion of the rest of the carriages on that particular ring.

With reference to FIG. 15, the details of the abrasive cleaning nozzles 44 can be described. The nozzles have passages 50 to carry high pressure water, for example in a pressure range of 10,000–15,000 psi. An abrasive channel 52 carries abrasives (typically sand) which are entrained in the water flow to enhance the cleaning activity of the nozzle. As can be seen, the high pressure water is sprayed from the nozzle through ports 54 at an angle relative to the center axis 56 of the nozzle and toward the axis 56. This creates a relative vacuum at passage 52 to entrain the abrasives in the water jet flow to enhance the cleaning action and provide an additional force to move the abrasive.

As can be seen in FIG. 2, the abrasive nozzles 44 are preferably mounted on their carriages so that the jet impinges on the outer surface of the pipeline at an oblique angle to the surface. The nozzles are preferably adjustably mounted to allow the operator to select the best angle. It has been found that this enhances the efficiency of cleaning. The use of high pressure water jets, particularly with entrained abrasives, is an improvement over shot blast cleaning, where shot impinges against the outer surface of the pipeline. Shot blast cleaning leaves a relatively smooth outer surface to the pipeline, which is not a suitable surface profile for bonding with adhesive to apply a new coat on the pipeline. The high pressure water jet, particularly with entrained abrasives, generates a highly irregular angular surface which is very conducive for bonding with adhesive.

Figure 10:
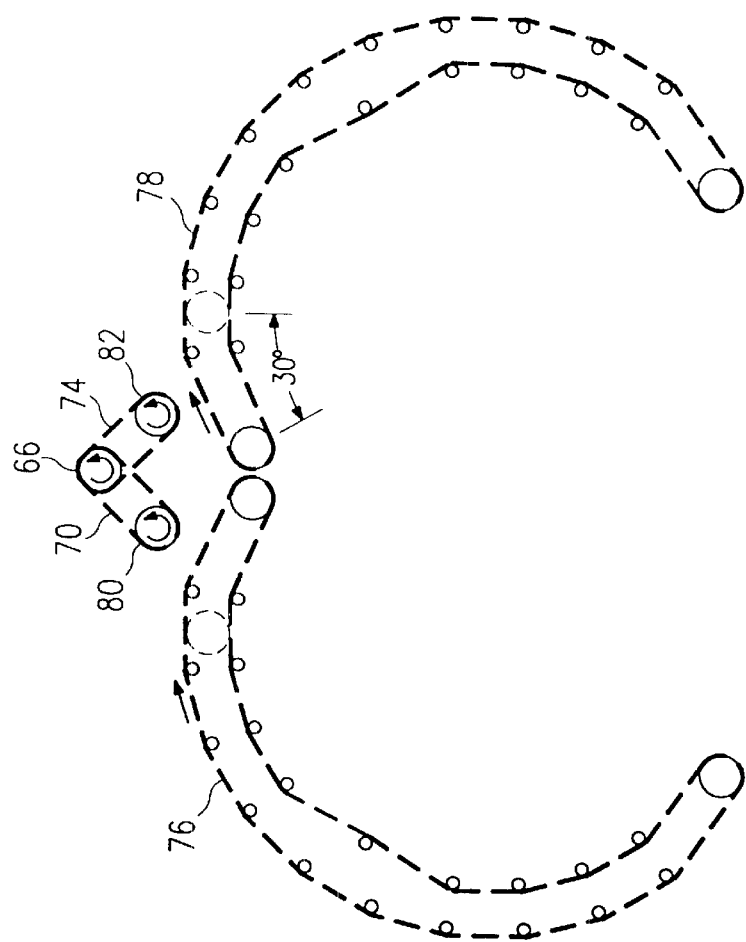
FIG. 10 is an illustrative view of the chain drive in the removal position.
Figure 11:
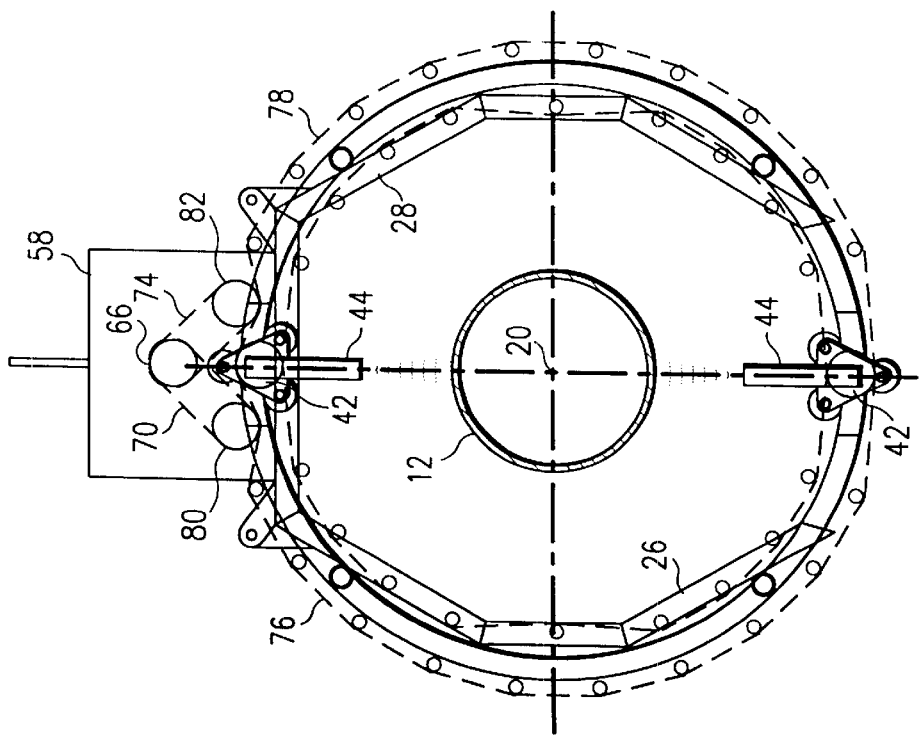
FIG. 11 is an end view of the nozzle carriage assembly and abrasive cleaning nozzles illustrating the chain drive.
Figure 17:
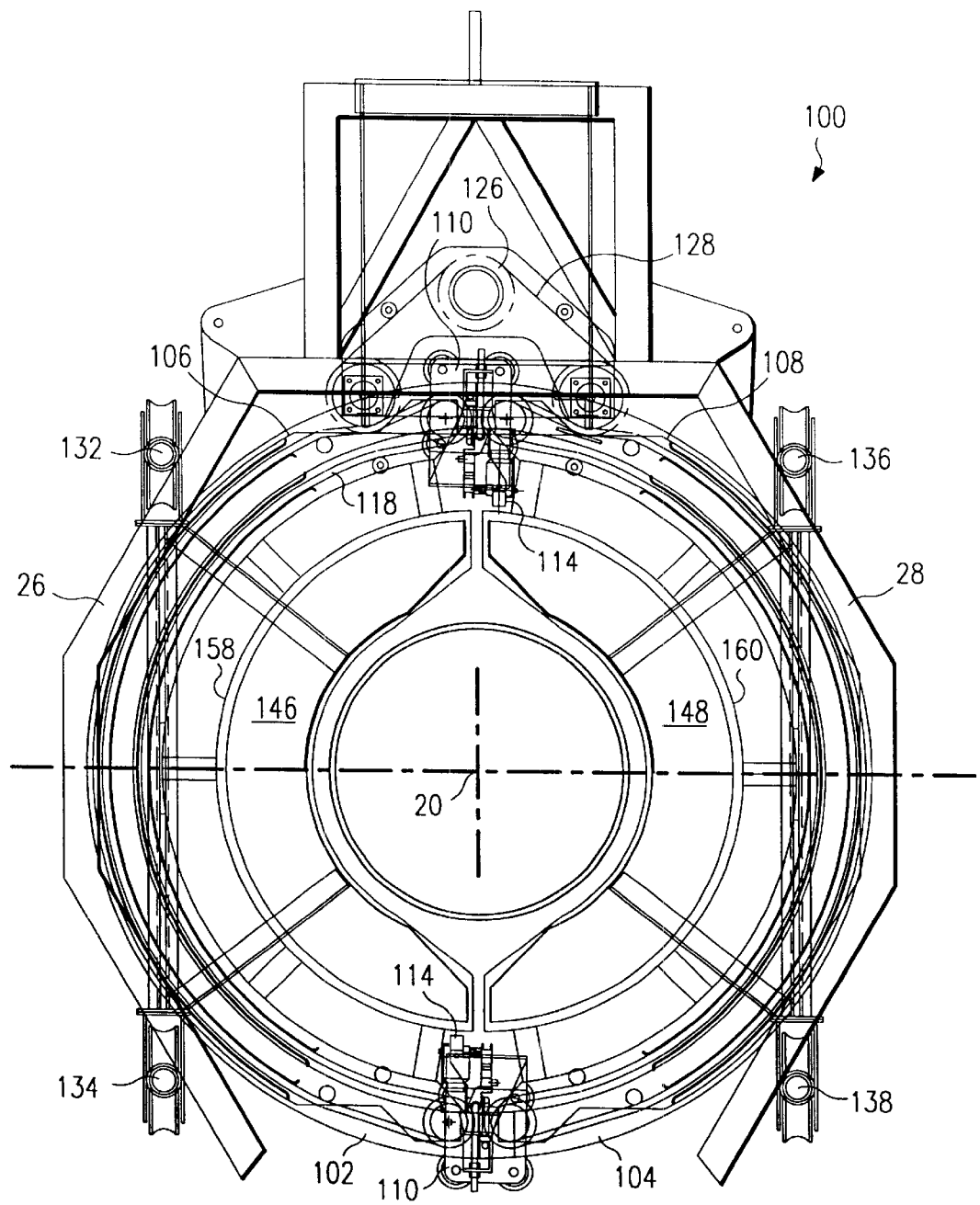
FIG. 17 is an end view of an automated pipeline treating apparatus forming a second embodiment of the present invention.

With reference to FIGS. 9–12, the mechanism for oscillating the nozzles 44 will be described. Mounted atop the centering assembly 24 is a control module 58. Within the control module is a motor 60 with a drive shaft 62 which extends out of the module and through the assembly 36 and extends parallel to the axis 20 of the pipeline when the units are in the operating position. The motor rotates shaft 62 in the direction of the arrow with an adjustable predetermined angular velocity. A first drive gear 64 is mounted on the shaft adjacent the ring 38. A second drive gear 66 is mounted on the shaft adjacent the arcuate ring 40. As seen in FIGS. 10 and 11, the first drive gear drives a first driven gear 68 through a chain 70. The second drive gear drives a second driven gear 72 through a chain 74. Drive gears 68 and 72 are supported from frame member 30 so that the distance between the gears does not vary whether the arms are in the operating or installation and removal position.

Arcuate ring 38 supports a continuous chain 76 which is supported about the periphery of the ring for 300 of the entire length of the ring. Arcuate ring 40 mounts a continuous chain 78 in the same manner.

Figure 9:
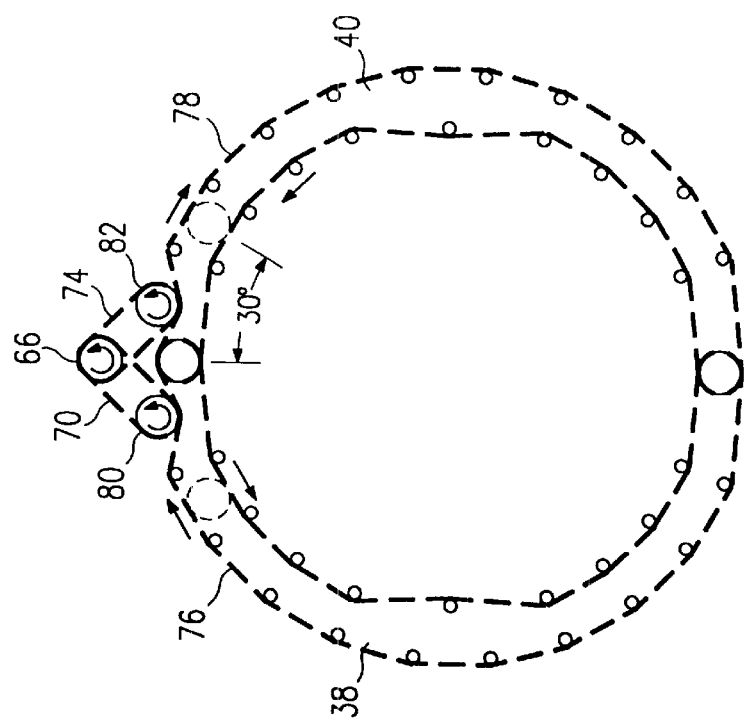
FIG. 9 is a schematic view of the chain drive for the abrasive cleaning nozzles in the operating orientation.
Figure 12:
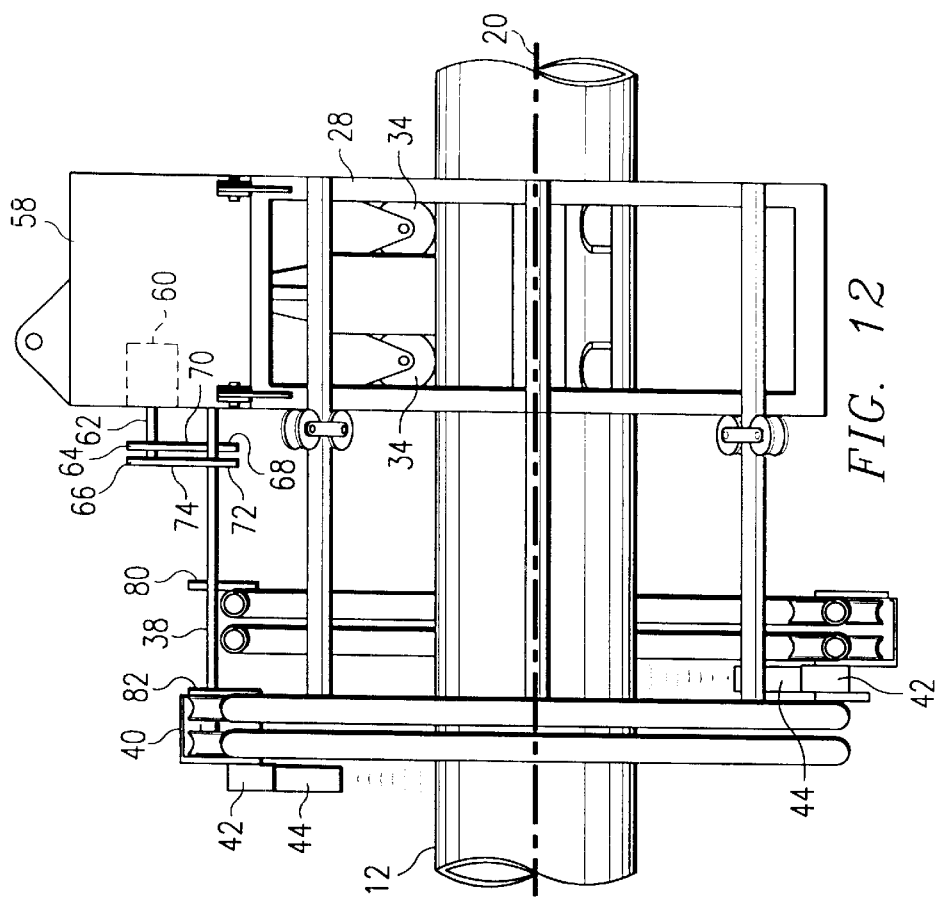
FIG. 12 is a side view of the nozzle carriage assembly and abrasive cleaning nozzles.

First driven gear 68 drives a gear 80 which engages the chain 76 when the device is in the operating position as shown in FIG. 9. Second driven gear 72 similarly drives a gear 82 which is engaged with chain 78 in the operating position. When cylinders 32 are actuated to pivot arms 26 and 28 into the installation/removal position, the chains 76 and 78 simply move out of engagement with the gears 80 and 82, as best seen in FIG. 10, to disconnect the drive train. Similarly, when the arms are pivoted to the operating position, the chains 76 and 78 re-engage the gears 80 and 82, respectively, to complete the drive train.

In operation, the travel unit 16 will drive the cleaning unit 18 along the pipeline, while the motor 60 oscillates the nozzles 44.

Chains 76 and 78 each have a special link in them which receives a floating pin extending from the nozzle carriage 42' closest to the drive motor. The continuous rotation of chains 76 and 78 translate into oscillation of nozzle carriage 42' about an arcuate distance on rings 38 and 40 determined by the length of the chains 76 and 78. The pin floats a limited direction on a radial line perpendicular to axis 22 when the arms and rings are in the operation position to follow the special link in its travel. If only a single nozzle carriage and nozzle were used on each ring, chains 76 and 78 need only be lengthened to extend about a 180° arc of the periphery of the rings, as shown in FIGS. 9 and 10.

As best seen in FIG. 16, the width W that each nozzle travels should be twice the distance D that the nozzles moves along the pipeline. Further, the arc of reciprocation for the nozzles should be about 360° divided by the number of nozzles to ensure complete coverage of the outer surface of the pipeline. For example, if twelve nozzles are used, six on each of the rings, the arc of reciprocation should be 30°. By following this standard, every area on the pipeline will be covered twice by nozzles as the apparatus moves along the pipeline to ensure cleaning of the pipeline. With such operation, a surface finish of ISO SA 2½ should be possible with a highly angular surface profile of up to 0.003 inches in mean differential to provide a superior base for a new coating.

The centering assembly 24 positions the nozzle carriage assembly 36 on the pipeline and ensures that the nozzles 44 maintain the proper standoff from the pipeline. The control module 58 directs the flow of water and abrasive to the individual nozzles and controls the oscillation of the nozzles. A two part cover 84 is mounted on the arms 26 and 28 to overly the nozzles to protect the operator and other personnel from ricocheting water and abrasive spray.

The high speed water jets in the nozzles accelerate the individual abrasive particles, typically sand, to greatly increase the momentum of the particle and allow it to more efficiently remove contaminants on the pipeline surface and obtain the needed surface profile. The high speed water jet attacks the interface that bonds the coating or contaminant to the pipe itself and removes all loosely bonded material. In addition, the water will dissolve and remove any corrosion causing salts on the pipeline. The erosive action of the abrasive is used to remove the tightly bonded material such as rust and primer and provide the desired surface profile for receiving a new coating. The sled unit 14 is designed to be towed as a separate vehicle behind the travel unit 16 and cleaning unit 18 as they move along the pipeline. The sled unit mounts the control panel for the various functions of the apparatus, and includes a computer to maintain the desired relation between speed of the units along the pipeline and the speed of oscillation of the nozzles. The sled unit also contains high pressure pump units used to provide the high pressure water at nozzles 44. One, two or three pumps can be run in tandem depending on the size of the pipeline to be cleaned and the degree of cleaning desired. Using less than the total number of pumps minimizes water consumption, fuel costs and maintenance when the full capacity is not required. Also, in the event one of the pump units goes off line, another unit can be brought on line quickly to replace it. A quintuplex positive displacement pump with stainless steel fluid and pressure lubricated power ends is a satisfactory pump. Such a pump can be rated at 10,000 psi at 34.3 gallons per minute, for example. The sled unit also contains a compressor to operate the cylinders 32, a generator for electrical power for the motor 60 and to power the air compressor and other controls. Also, the sled unit mounts containers of the abrasive to feed the cleaning unit 18.

The chain drive and single direction rotating motor that oscillate the nozzles provide a smooth ramp up and ramp down of the nozzle operation at the ends of the nozzle path, not possible if a reversing motor is used to oscillate the nozzles. The nozzles slow up smoothly as they reach the end of their oscillation arc and accelerate smoothly as they reverse their motion. This provides a smooth operation. As noted, for twelve nozzles, the arc of reciprocation should be 30°. For ten nozzles, the arc should be about 36°. For eight nozzles, the arc should be about 45°.

The apparatus 10 can be used to apply a new coating to the pipeline as well. Instead of nozzles 44 to apply abrasives and high pressure water jets, the nozzles 44 can be used to spray a polyurethane coating on to the pipeline. A polyurethane coating of the type that can be used for such coating is sold under the trademark and identification PROTOGOL UT 32 10 and is manufactured by T. I. B.-Chemie, a company located in Mannheim, West Germany. This polyurethane material is a two part material, one part being a resin and the other an isocyanate. When the two parts are mixed in a 4 to 1 ratio of resin to isocyanate, the material sets up in a hard state within thirty seconds of mixing. The apparatus 10 thus is an ideal device to apply such a spray in a continuous manner along the pipeline, providing, with the nozzle overlap, complete coating of the pipeline to the desired coating thickness as the apparatus moves along the pipeline. After the polyurethane has been applied, solvent will be driven through the nozzles and supply passages to prevent the polyurethane from hardening and ruining the apparatus. It is also possible to use only one oscillating nozzle per ring to apply the coating by oscillating each nozzle 180° or so and moving the unit along the pipeline to insure complete coverage. It is also possible to mount a plurality of nozzles in a fixed position on rings 38 and 40 for either cleaning or coating if oscillation is not desired.

Reference is now made to FIGS. 17–27 which illustrate a second embodiment of the present invention identified as automated pipeline treating apparatus 100. Many of the components of apparatus 100 are identical and work in the same manner as components of apparatus 10. Those components are designated by the same reference numerals in FIGS. 17–27.

Apparatus 100 is illustrated using only two nozzle carriage assemblies 36 and nozzles 44 in the apparatus. In contrast to apparatus 10, the nozzle carriage assemblies lie in the same plane perpendicular to the axis 20 of the pipeline, instead of being staggered along the length of the pipeline as in apparatus 10. This is made possible by providing a carriage mounting ring 102 on arm 26 and a carriage mounting ring 104 on arm 28, with each ring extending an arc of somewhat less than 180° so that there is no interference between the rings as the apparatus is placed in the operating position. A chain drive ring 106 is mounted to arm 26 adjacent to carriage mounting ring 102. A similar chain drive ring 108 is mounted on arm 28 adjacent to ring 104. Rings 106 and 108 are also somewhat less than 180° in arc to avoid interference when the apparatus is in the operating position.

Figure 23:
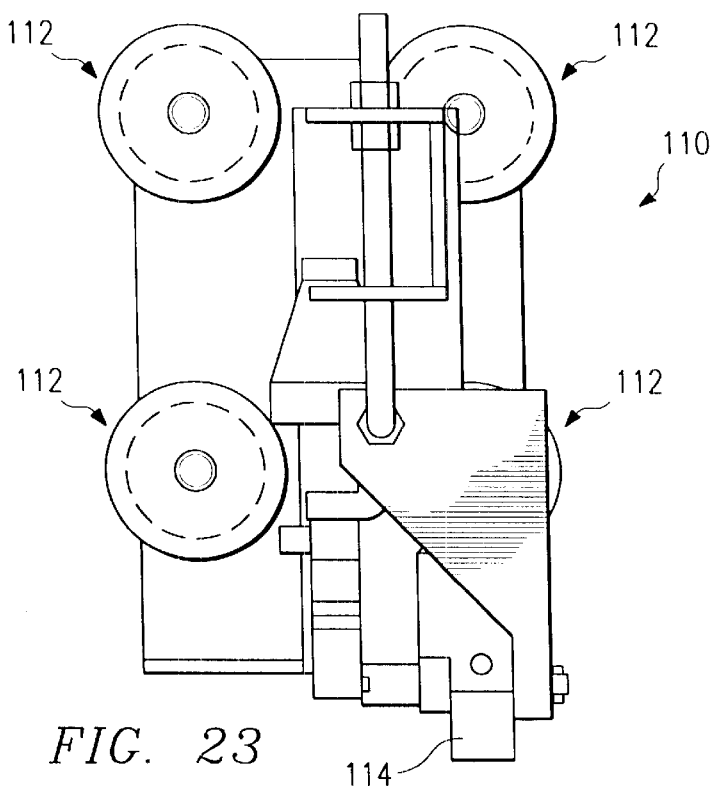
FIG. 23 is an end view of a nozzle carriage and nozzle of the apparatus of FIG. 17.
Figure 24:
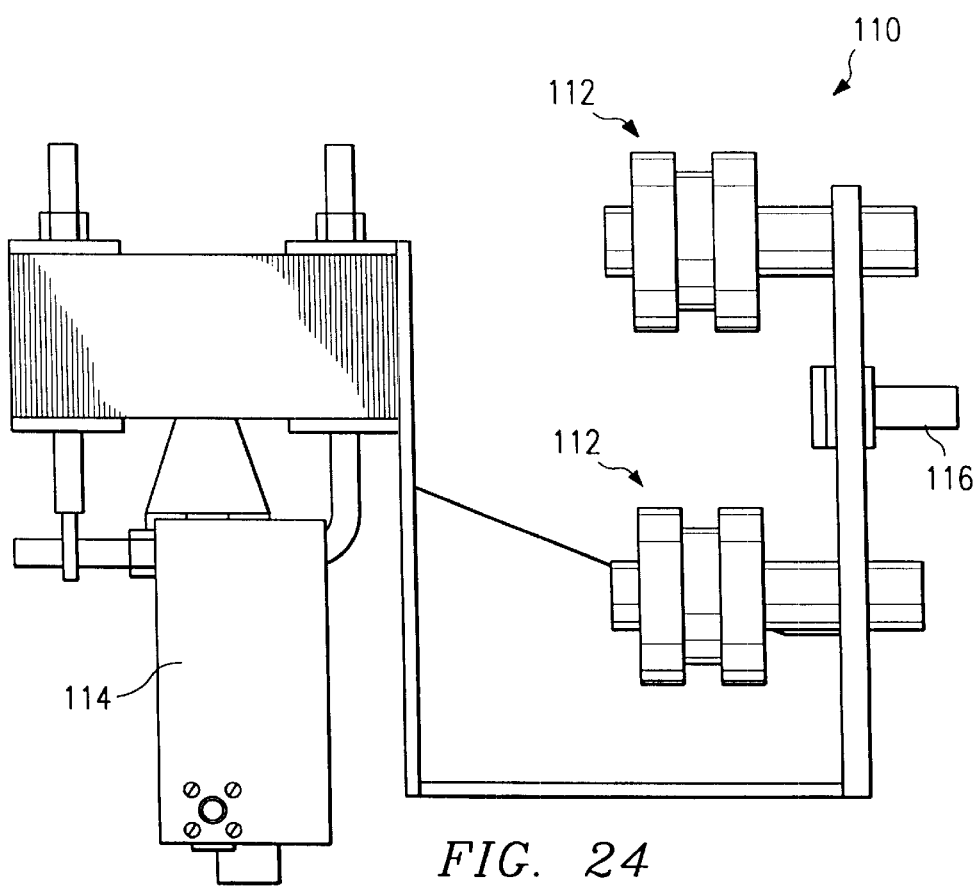
FIG. 24 is a side view of the nozzle carriage and nozzle of FIG. 23.

As best illustrated in FIGS. 23 and 24, the nozzle carriage assembly 110 is provided with four guide wheels 112, two of which run on the inner rim of a carriage mounting ring, and the other two running on the outer rim of the carriage mounting ring, to support the nozzle carriage assembly for arcuate motion along the ring. The nozzle 114 itself can be adapted for high pressure water jet cleaning using abrasives, as nozzle 44, or as a nozzle to distribute a pipeline coating such as the two part polyurethane mentioned previously. FIG. 24 illustrates the mounting of pin 116 on the carriage assembly 110 which is permitted to move a limited distance vertically as shown in FIG. 24 as it follows the special link in the drive chain in oscillation.

Figure 25:
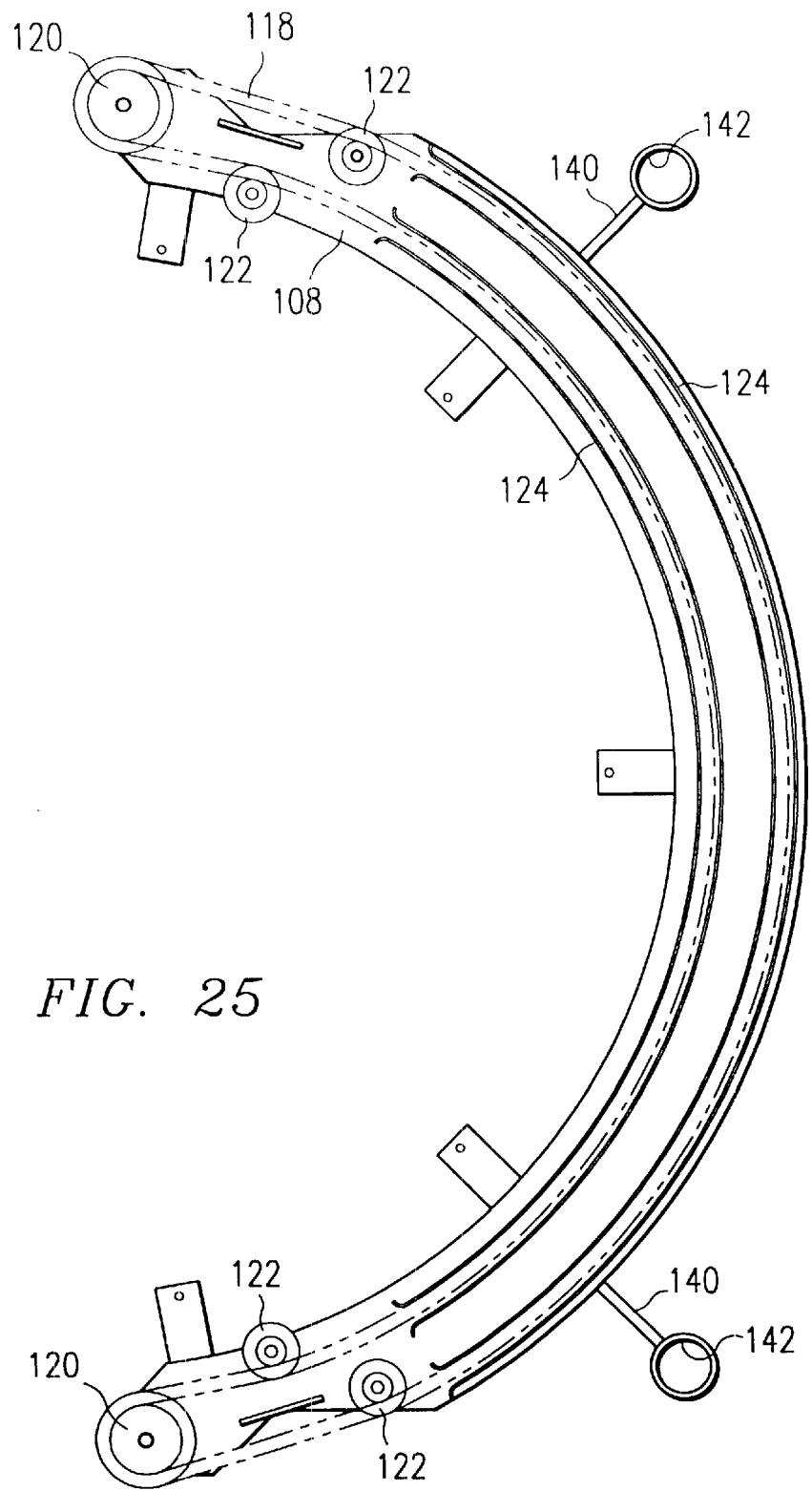
FIG. 25 is an end view of the drive ring assembly of the apparatus of FIG. 17.
Figure 28:
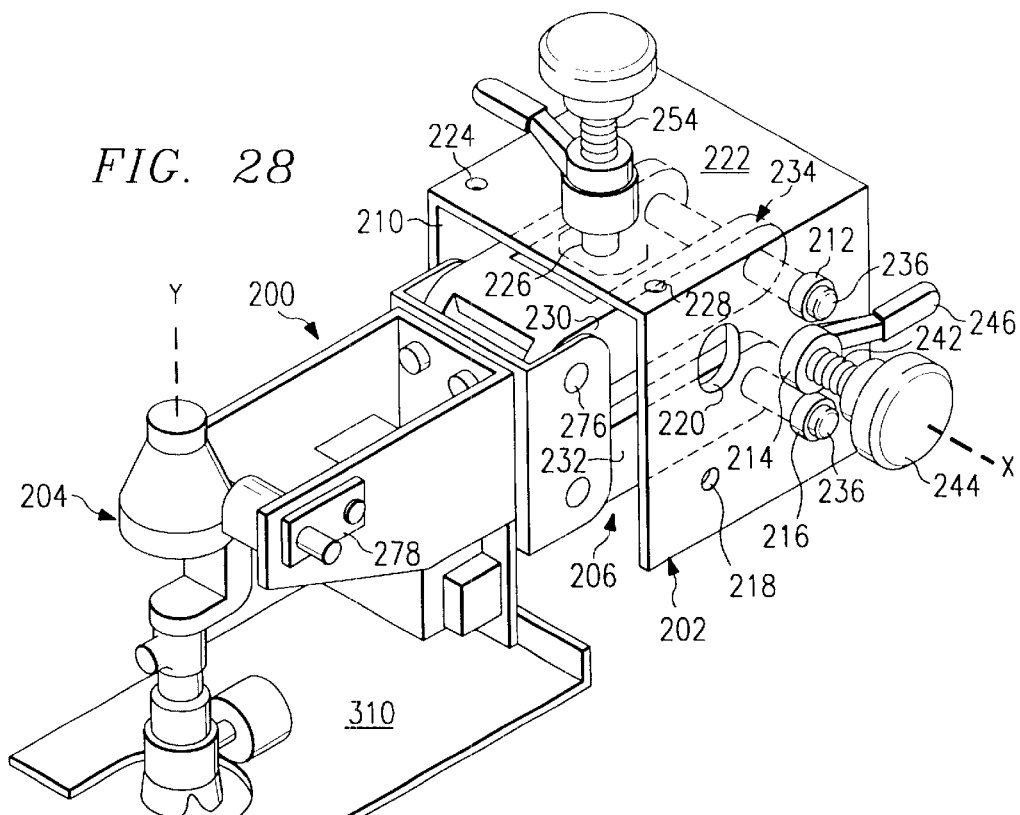
FIG. 28 is a perspective view of a nozzle assembly forming a third embodiment of the present invention.
Figure 29:
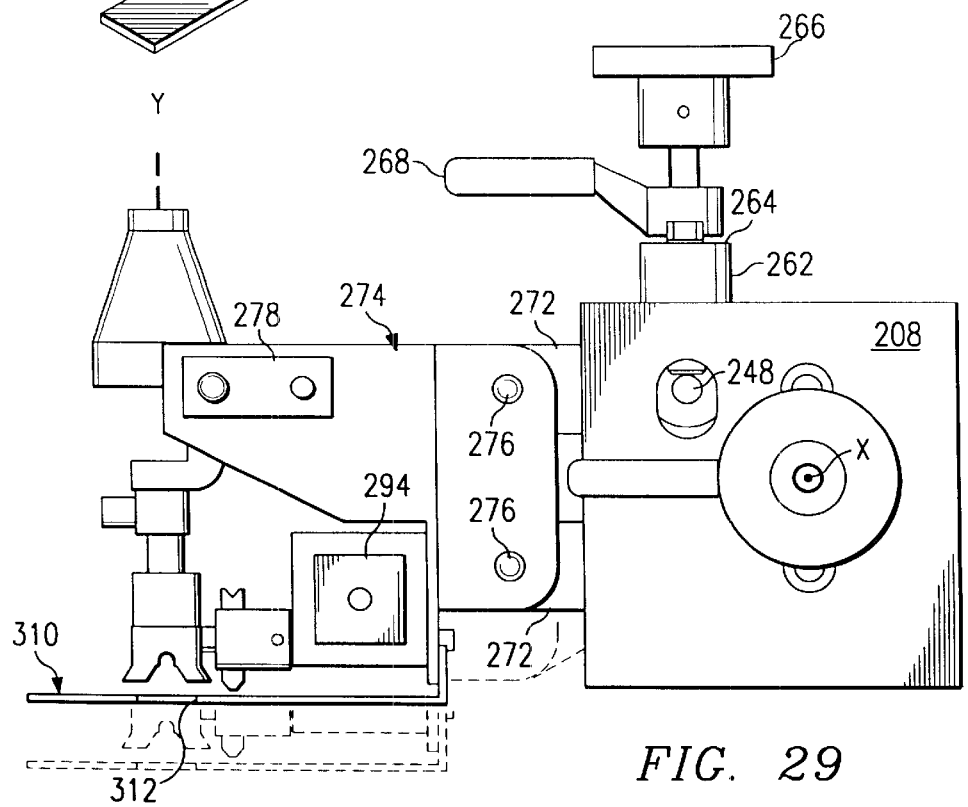
FIG. 29 is a side view of the nozzle assembly.

With reference to FIG. 25, the details of the chain drive ring 108 can be better described. As only a single nozzle is mounted on the associated carriage mounting ring, it will be desirable to have the nozzle carriage assembly and nozzle oscillate 180°. Thus, the continuous chain 118 mounted on the chain drive ring 108 extends about the entire periphery of the drive ring and is supported by tensioning wheels 120 and 122. Guides 124 are also provided to guide the chain about the ring.

Figure 22:
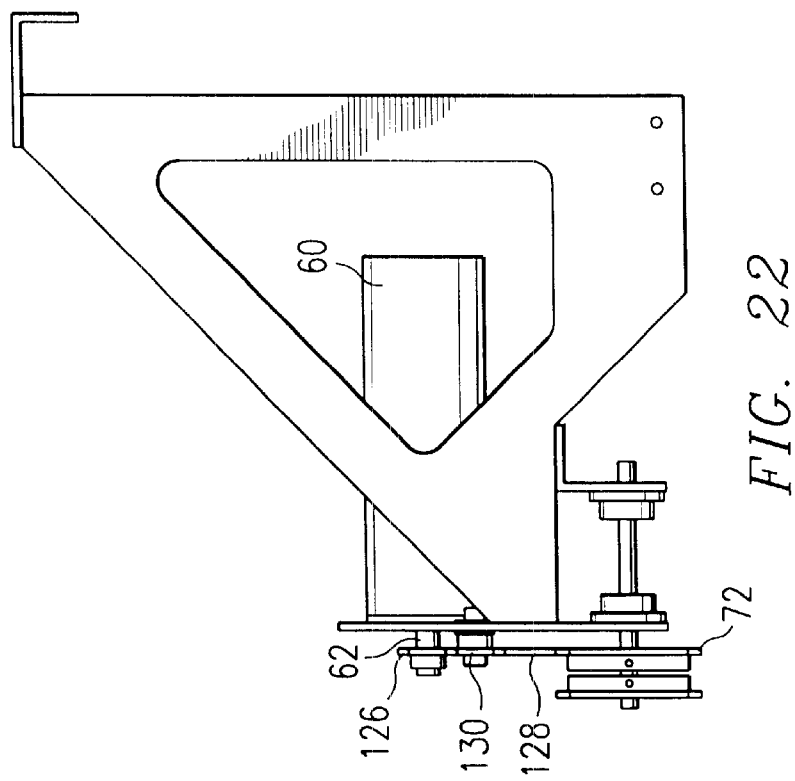
FIG. 22 is a side view of the chain drive of FIG. 21.
Figure 21:
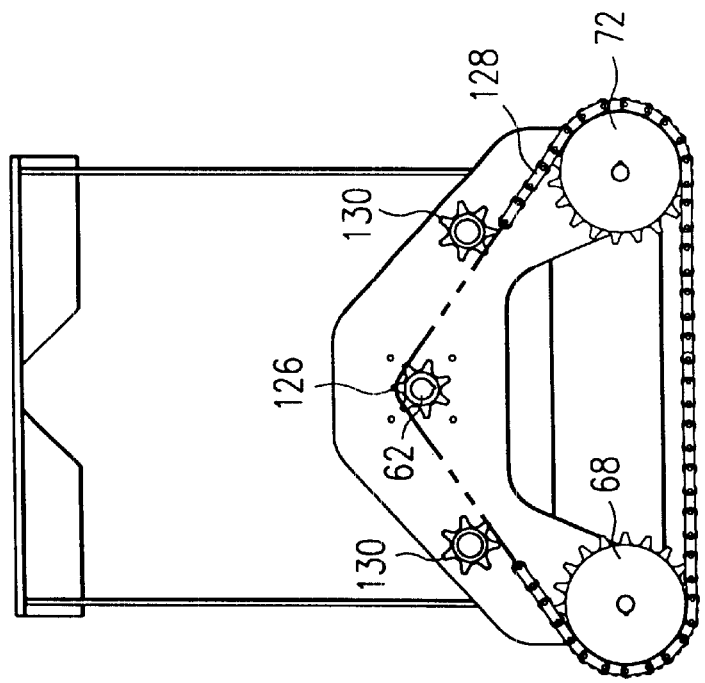
FIG. 21 is an end view of the chain drive of the apparatus of FIG. 17.

With reference to FIGS. 21 and 22, the nozzle oscillating driving elements of apparatus 100 are illustrated. The motor 60 drives a single drive gear 126 from its drive shaft 62. A continuous chain 128 connects drive gear 126 with driven gears 68 and 72. Tensioning gears 130 allow for tensioning of the chain. It can be seen in apparatus 100 that the positioning of the rings 102 and 104 in a parallel plane permits a single drive gear 126 to operate the nozzles being oscillated.

With references to FIGS. 17–20, arm 26 can be seen to have parallel bars 132 and 134 extending from the arm parallel to the axis 20 of the pipeline which supports the nozzle carriage assembly 36. Arm 28 has a similar pair of bars 136 and 138 which extend parallel the axis 20. The chain drive rings 106 and 108 are supported on the bars through brackets 140 which have cylindrical apertures 142 so that the rings can be slid over the bars and supported thereby. The carriage mounting rings 102 and 104 have similar brackets 144 as best seen in FIG. 20.

To isolate the nozzle action from the remainder of the pipeline and apparatus other than that being treated, semi-circular annular plates 146 and 148 are mounted on arms 26 and 28, respectively, which lie in a plane perpendicular axis 20 and are closely fit around the outer circumference of the pipeline to isolate the components of the centering assembly from the portion 150 of the pipe being treated. Each semi-circular annular plate includes a semi-cylindrical shield 152 which extends from the plate concentric with the pipeline radially inward of the carriage mounting rings, chain drive rings and nozzles. An aperture 154 must be formed in the shield 152 at the position of each of the nozzles used so that the nozzles spray passes through the associated aperture to impact on the outer surface of the pipeline. Where, as shown in apparatus 100, the nozzles will move approximately 180°, the aperture 154 must extend roughly a similar arcuate distance.

With reference to FIGS. 26 and 27, a two part shield assembly 156 including shield 158 and shield 160 are mounted on the bars 132–138.

Figure 18:
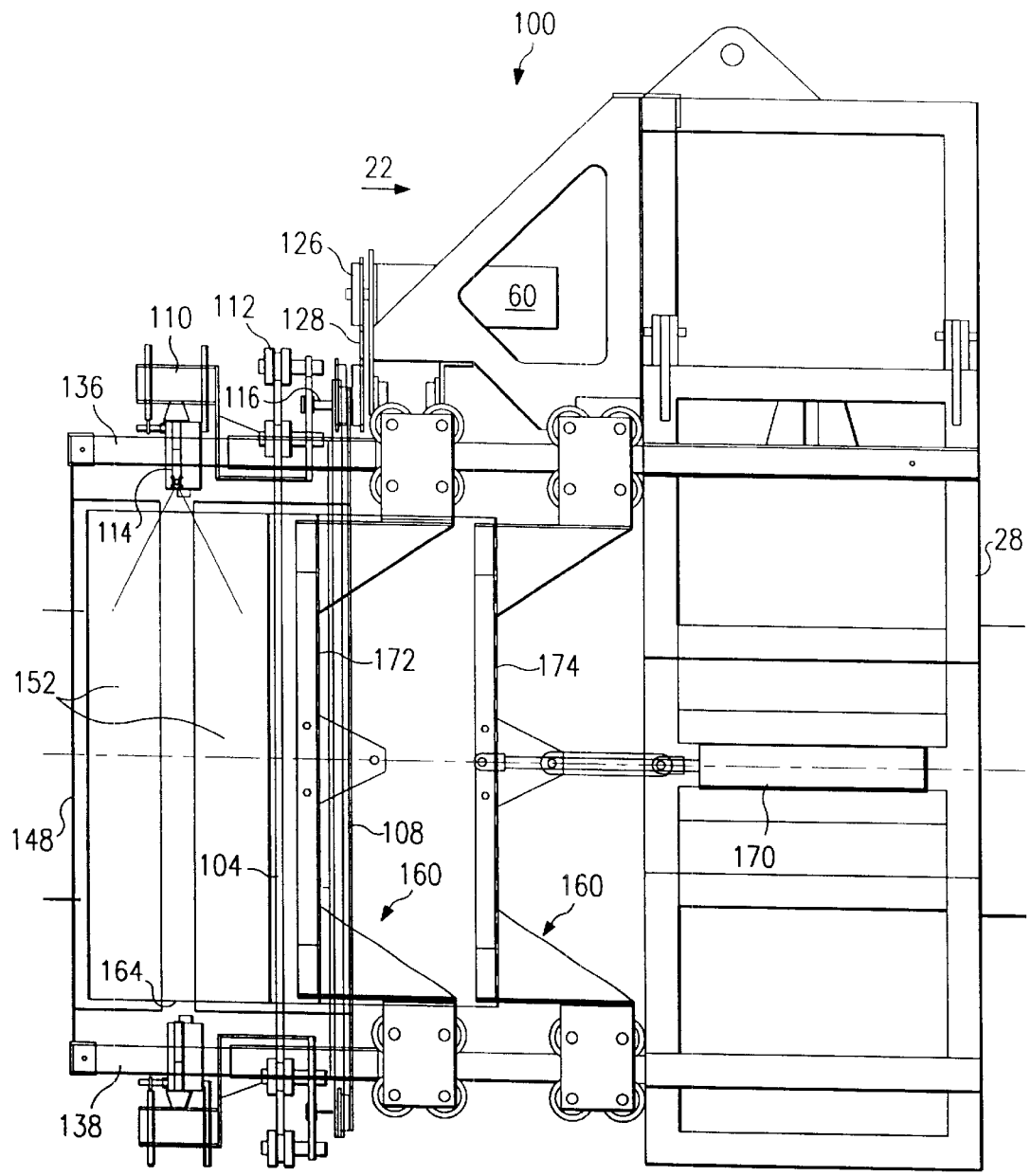
FIG. 18 is a side view of the apparatus of FIG. 17.
Figure 19:
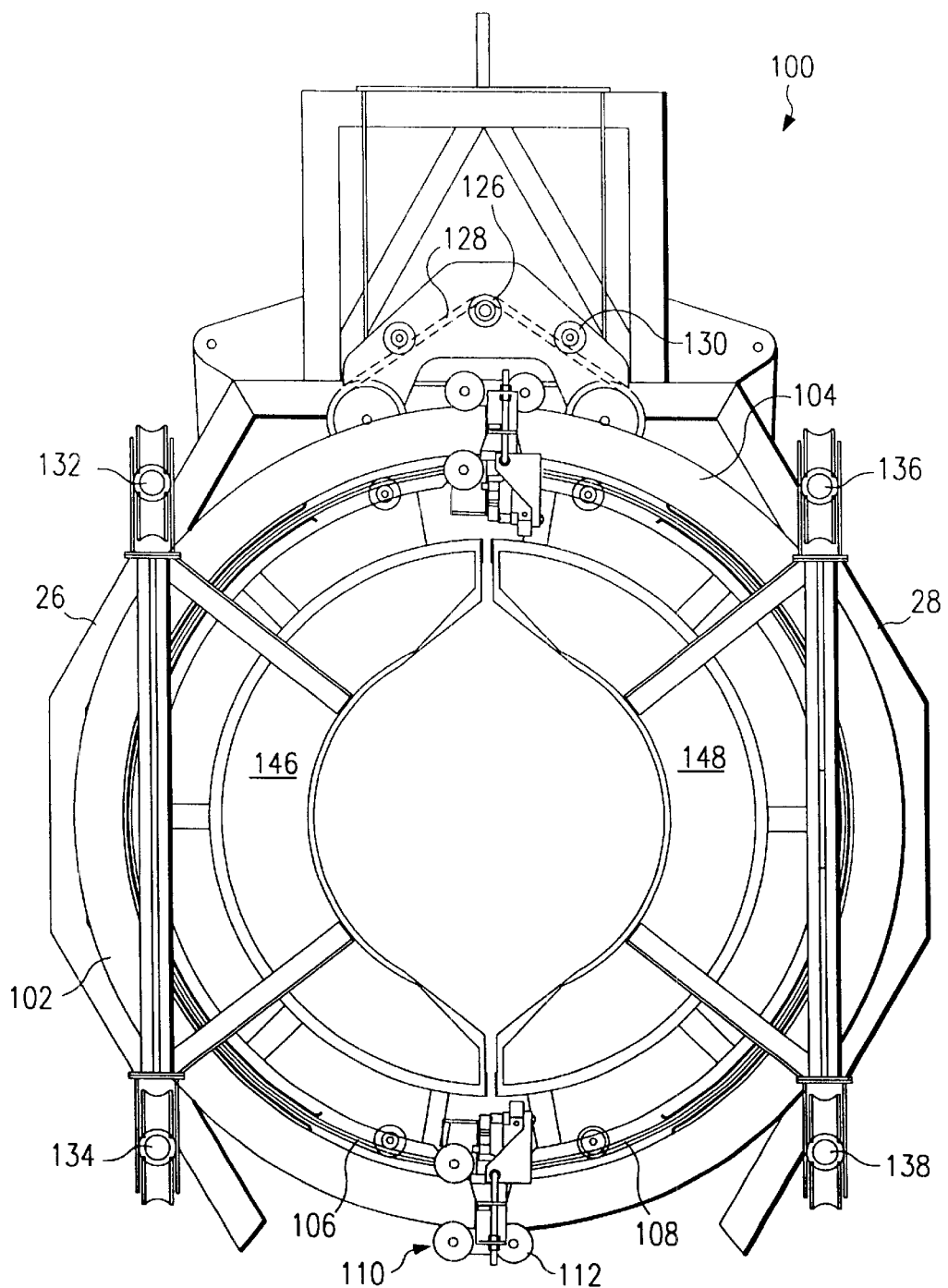
FIG. 19 is a simplified end view of the apparatus of FIG. 17.

Shield 160 illustrated in FIGS. 26 and 27 can be seen to include wheels 162 for guiding the shield along bars 136 and 138. The shield 160 includes a semicylindrical concentric plate 164, and annular plates 166 and 168 which extend in a radial direction from the axis 20 of the pipeline. A pneumatic double acting cylinder 170 is mounted on each of the arms 26 and 28 to move the shields 158 and 160 along the bars between a first position 172 and a second position 174 as seen in FIG. 18. In the first position 172, the plate 164 fits concentrically within the shields 152 and radially inward from the nozzles. Thus, the shields 158 and 160 prevent either the high pressure water jet or coating discharged from the nozzles from contacting the pipeline surface. In the first position, the annular plates 166 and 168 prevent the discharge of the nozzles from spraying either direction along the axis of the pipeline.

In the second position 174, the shields 158 and 160 are moved to permit the nozzle spray to impact on the portion 150 of the pipeline being treated. However, the annular plate 166 will prevent the spray from escaping from the apparatus in the direction of arrow 22.

The use of shield assembly 156 can have a number of benefits when coating a pipeline, for example. It may be desirable to leave a short length of the pipeline uncoated, for example, at a weld, and this can be achieved without stopping the motion or operation of the apparatus along the pipeline by simply drawing the shield assembly into the first position for a sufficient period of time to prevent the coating over the desired gap. Once the gap is passed, the shield assembly 156 can be returned to the second position and coating of the pipeline can continue without interruption.

To insure consistent cleaning, surface preparation and even coverage of the coating material being applied, it is desirable if the spray nozzle position can be adjusted. The spray nozzles may vary in the width of the spray pattern, profile of the pattern, and size of the orifice. These variations are a result of the manufacturing tolerances encountered in the manufacturing of the spray nozzle. Variations will also occur as the spray nozzle wears during operation.

The amount of material (water, water and abrasive, and/or coating) directed or applied to the surface of the pipe per unit of time is affected by the variables listed above. The spray exits the spray nozzle in a "fan" pattern. The closer a spray nozzle is to the surface of the pipeline, the smaller the "footprint" made by the spray on the pipeline. As the width of the spray pattern at a specified distance from the spray nozzle may vary, the desired spray "footprint" on the pipeline can be obtained if the distance of the spray nozzle from the pipeline can be adjusted.

During the operation of the spray nozzles, the nozzles become worn and the fan pattern width at a given distance will decrease. To compensate for this wear and to prolong the useful life of the spray nozzle, it is necessary to increase the distance of the spray nozzle from the pipeline. This should be done frequently to insure optimum performance.

The profile of the spray pattern may vary also. This can result in the pattern being skewed to one side or the other. Skewing of the fan pattern can cause a portion of the fan pattern to miss the desired target on the pipeline. This skewing can be severe enough that a portion of the spray pattern may actually miss the pipeline entirely, causing inefficiencies and loss of water, water and abrasive, or coating material. To compensate for this, the spray nozzle needs to be moved arcuately, along the arcuate ring.

The size of the orifice can vary from spray nozzle to spray nozzle. The larger the orifice, the greater amount of material that will exit the nozzle per unit of time. The sprayed material exits the nozzle in a "fan" pattern, consequently the amount of spray material contacting the pipeline per square inch per unit of time can be decreased by increasing the distance of the spray nozzle from the pipeline.

To compensate for these numerous factors it is desirable to be able to adjust the distance of the spray nozzle from the pipeline and the position of the spray nozzle around the arcuate ring. Further, these adjustments must be made while the unit is operating so the adjusting mechanism must be capable of being operated by worker in bulky protective clothing and heavy gloves. The adjustments, once made, should be able to get "locked" in to prevent the spray nozzle position from changing due to vibration or operation of the equipment.

When spraying water, water and abrasive, or coating materials, the orifice of the spray nozzle will occasionally become partially of completely plugged with foreign matter. This will distort the spray pattern if partial blockage occurs and reduce the amount of material per unit of time being sprayed through the nozzle. This problem is particularly significant when rapid set coating materials are used. If spray nozzle blockage occurs in this situation and flow cannot be restarted quickly, the coating material in the system will set up and require stopping work and rebuilding the entire system.

Many times this blockage can be removed from the spray nozzle if the spray nozzle can be rotated 180° and the blockage "blown out" of the spray nozzle using the high pressure water, water and abrasive or coating. The nozzle can then be rotated back to the operating position and commence spraying.

With reference now to FIGS. 28–38, a nozzle assembly 200 is illustrated which forms another embodiment of the present invention. The nozzle assembly 200 will replace a cleaning nozzle 44 and can be mounted either on nozzle carriages 42 or directly on an arcuate ring, such as rings 38 and 40. The nozzle assembly 200 provides for reversing the tip of the nozzle for cleaning. The nozzle assembly 200 further provides for adjusting the position of the nozzle in both the Y direction along a radius from the center line of the pipe being coated or cleaned and the X direction, about the circumference of the pipe to provide a proper spray pattern on the exterior surface of the pipe. Such adjustments are of great benefit as each nozzle will have a slightly different spray pattern due to manufacturing variations and, as the spray nozzle wears, the spray pattern will change. Thus, the nozzle assembly 200 provides a mechanism for initially setting the spray pattern for optimal cleaning or coating and allows the operator to adjust the nozzles as they wear to maintain the optimum coating or cleaning, while extending the useful service life of the nozzle.

With reference now to FIGS. 28–31, the nozzle assembly 200 can be seen to include a bracket 202 which is rigidly secured to the nozzle carriage assembly or ring and is thus in a fixed relation to the pipe being cleaned or coated during the operation. A spray gun 204 is mounted to the bracket 202 through a parallel arm assembly 206 which allows predetermined movement of the spray gun 204 in the Y direction, toward or away from the outer surface of the pipe. The parallel arm assembly 206, in turn, is mounted to the bracket 202 by a mechanism which allows it, and the attached spray gun 204, to be moved in the X direction, along the circumference of the pipe.

The bracket 202 includes sides 208 and 210 in which are formed a series of aligned holes 212, 214 and 216 extending along the X direction. Spaced from the series of holes 212–216 are aligned holes 218 and aligned elongated openings 220. The bracket 202 also includes a top 222 which has a series of holes 224, 226, and 228 formed therethrough which extend along the Y direction.

As seen in FIGS. 28–31, the parallel arm assembly includes an upper arm 230 and a lower arm 232. The first ends 234 of each of the arms 230 and 232 are supported for limited movement in the X direction by a pair of pins 236 received in aligned holes 212 and 216 of the bracket 202. Also mounted along the pins for movement in the X direction, and captured between the first ends 234, is a threaded adjustment nut 238. The nut 238 has a threaded aperture 240 which aligns with holes 214 in the bracket 202. A threaded screw 242 is mounted to the bracket 202 through holes 214 for rotation about a longitudinal axis parallel the X direction, but is prevented from motion along the X direction. A knob 244 and clamping handle 246 are mounted at one end of the screw. The screw is threaded through the aperture 240 in nut 238. Thus, as the knob 244 is rotated one way or the other, the nut 238, arms 230 and 232 and assembly 206 are moved in the X direction. Because the spray gun 204 is attached to the parallel arm assembly 206, the gun is similarly traversed in the X direction. Once a desired position has been achieved, the handle 246 can be rotated to lock the screw relative to the bracket 202 to prevent movement of the spray gun.

Movement of the spray gun in the Y direction is accomplished in the following manner. A rod 248 is mounted on the upper arm 230 which extends along the X direction. A nut 250, best shown in FIGS. 32 and 33, is slidable along rod 248 and has an aperture 252 to receive the end of a threaded screw 254. The threaded screw 254 has a groove 256 formed in the end thereof which is positioned within the aperture 252 adjacent to holes 258 in the nut. Holes 258 receive pins to prevent the threaded screw 254 from pulling out of the aperture 252, but allow the threaded screw to rotate within the aperture. A block 262 is mounted on the top 222 of the bracket 202 through holes 224 and 228 and has a threaded aperture 264 aligned with hole 226 through which the screw 254 is threaded. A knob 266 and clamping handle 268 are mounted at the end of the threaded rod exterior of the bracket. Rotation of the knob will cause the threaded screw to move up or down in the Y direction relative to the block 262. This, in turn, causes the parallel arm assembly 206 and the spray gun 204 to move in the Y direction as well. While the actual movement of the spray gun is along a curved arc, the relatively minor travel along the Z direction is inconsequential while achieving the proper position in the Y direction. Preferably, the rod 248 extends into the elongated openings 220 in the bracket 202 which predetermines the range of motion in the Y direction between the ends of the openings 220.

The second ends 272 of the parallel arm assembly 206 are pivotally attached to a gun mount bracket assembly 274 with a pair of removable pins 276 such as sold by Reed Tool. Each removable pin has a spring detent which holds the pin in place during normal operation, but allows the pin to be readily removed by simply pulling the pin out to allow the gun to be removed for cleaning.

The spray gun 204 is mounted to the bracket assembly 274 with a gun mount pin 278 as seen in FIGS. 34 and 35. Spray gun 204 can, for example, be a Model 24AUA AutoJet Automatic Spray Gun manufactured by Spraying Systems Co., North Avenue at Schmale Rd., Wheaton, Ill. 60187. This gun has a T-handle screw to lock the gun onto a pin 278. The gun mount pin 278 has a pair of flats 280 and 282 which allows the spray gun 204 to be clamped to the pin at a predetermined orientation as the end of the T-handle screw on the gun will be tightened on one of the flats. The pin 278 has an orienting extension 284 which fits into an alignment hole in the bracket assembly 274 to orient the pin relative to the bracket assembly. Thus, the angle of the spray gun 204 will be set relative to the nozzle assembly 200. Two flats 280 and 282 are provided so that the pin can be inserted from either side of the bracket assembly and properly orient the spray gun.

In the design of the present invention, the X and Y movements can be adjusted simultaneously, which gives the operator great flexibility in adjusting the spray pattern.

With reference to FIGS. 36–38, the operation of the reversible nozzle 286 will be described. The tip 288 of the nozzle can be rotated within the nozzle about an axis 290 perpendicular the direction of the aperture 292 through the nozzle. This permits the tip 288 to be reversed and cleaned by the flow through the nozzle. Such a nozzle is sold by Graco, Inc., P.O. Box 1441, Minneapolis, Minn. 55440-1441 as their Rack IV nozzle, Patent No. 222-674. This nozzle was meant to be operated manually with a finger operated T-handle, however, the nozzle is modified to attach the tip 288 to a ball valve operator 294. Ball valve operator 294 is designed to rotate a shaft 296 180° in one direction, and the same in the reverse direction as would normally be done to activate a ball valve. An adapter 298 as seen in FIGS. 37 and 38, connects the shaft 296 of the ball valve operator to the tip 288 of the nozzle 286. The adapter 298 has an aperture 300 for a pin to pass through the adapter and the shaft 296 to insure joint rotation. A notch 302 in the end of the adapter 298 receives the T-handle of tip 288. Thus, activation of the ball valve operator 294 will cause the tip 288 to reverse and then return to normal operation position. A suitable ball valve operator is manufactured by the Whitey Valve Company of 318 Bishop Rd., Highland Height, Ohio 44143, as an air actuator for ball valves, Series 130, 150 and 121, and is air solenoid activated.

When the nozzles 286 are used to spray two component coatings, particularly ones that set within the space of thirty seconds, it is very important to be able to reverse the tip 288 for cleaning. An operator may observe that the spray pattern is becoming non-uniform, indicating the beginning of a clog in the tip. The operator 294 then reverses the tip so that the flow through the spray gun tends to clean out the tip. Usually, it is sufficient to maintain the tip in the reverse position for only two or three seconds for adequate cleaning. The tip is then reversed by the operator to the normal operating position where the spray pattern should be uniform.

The gun mount bracket assembly 274 also is provided with a shield 310. A rectangular aperture 312 is formed through the shield for passage of the spray from the nozzle. Since the shield 310 travels with the nozzle in both the X and Y direction, the aperture size can be minimized to reduce back spray which could clog or build up on the nozzle assembly and adversely effect performance.

A pipeline treating apparatus 350, forming a third embodiment of the present invention is illustrated in FIGS. 39–56. The apparatus 350 is again used for treating the exterior surface of pipeline 12 as will be described hereinafter.

Figure 40:
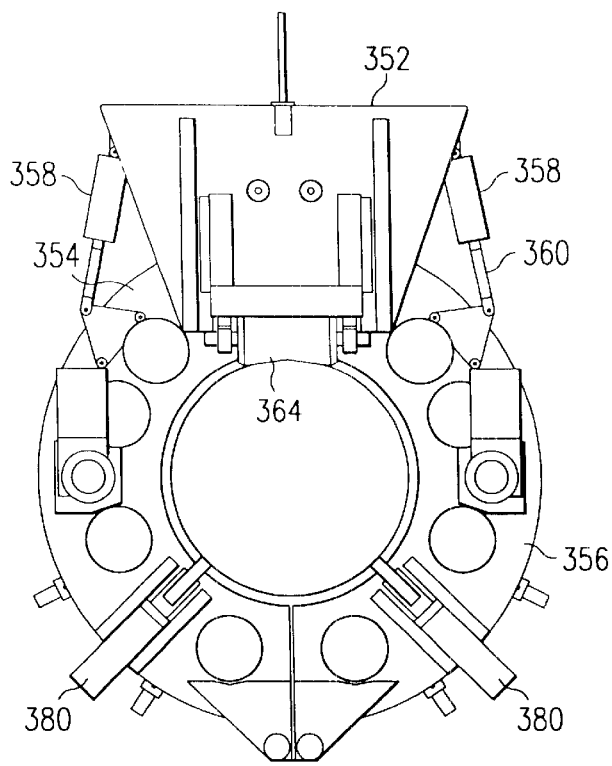
FIG. 40 is a back view of the apparatus of FIG. 39.
Figure 41:
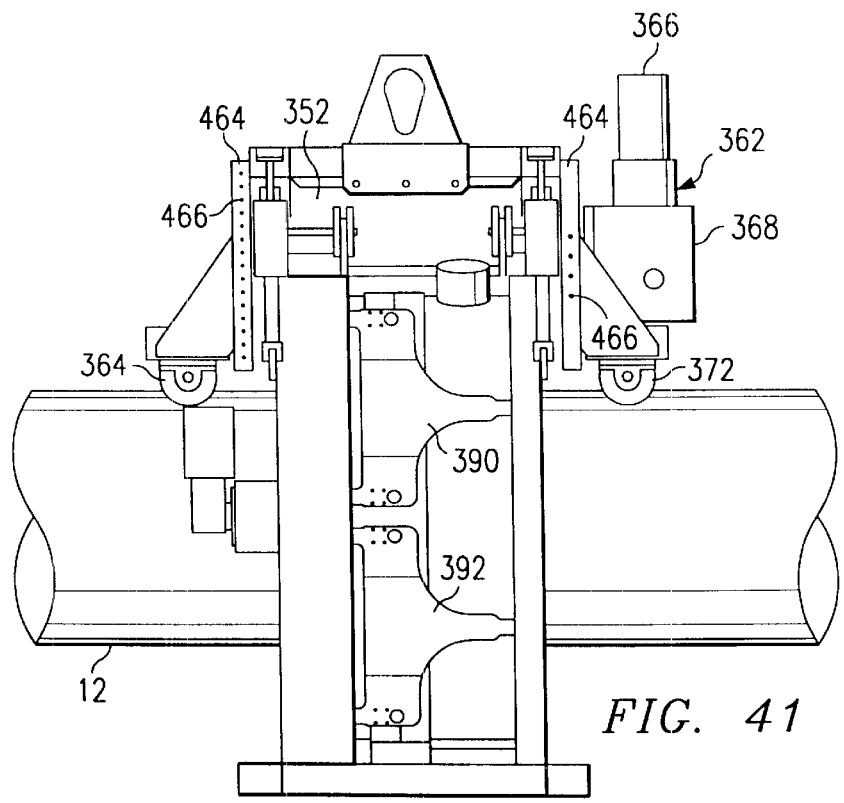
FIG. 41 is a side view of the apparatus of FIG. 39.
Figure 42:
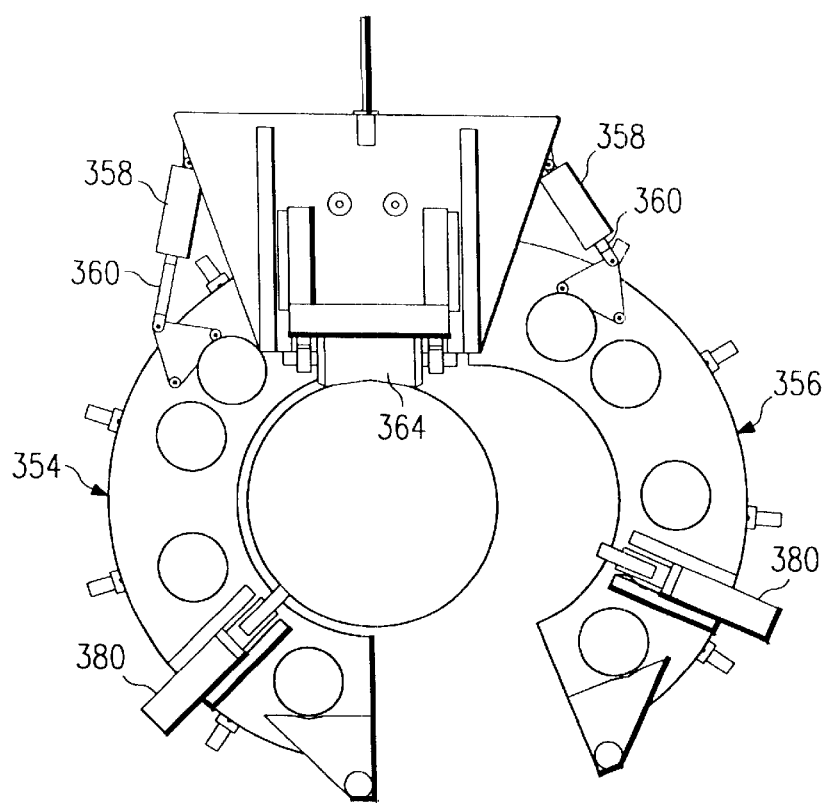
FIG. 42 is a front view of the apparatus of FIG. 39.
Figure 43:
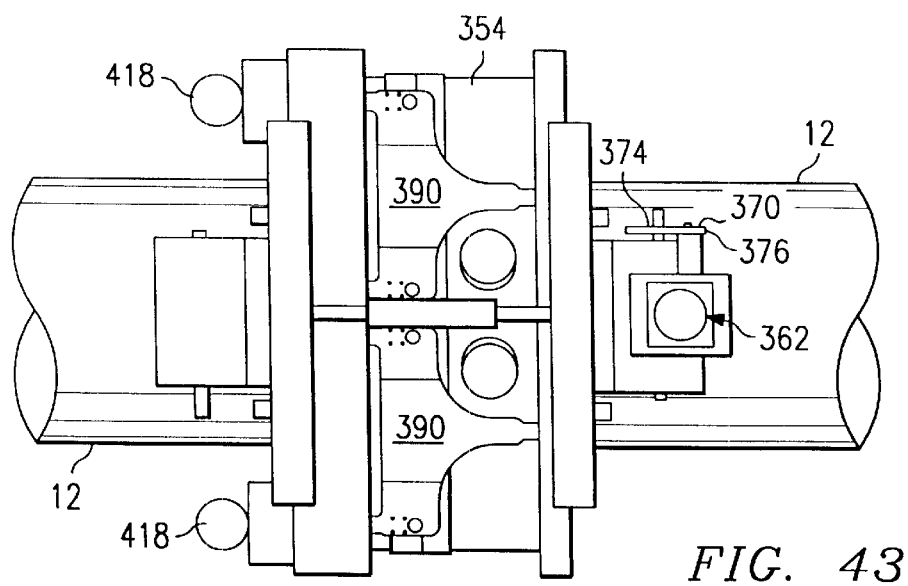
FIG. 43 is a top view of the apparatus of FIG. 39.

The apparatus includes a main frame 352 which is set atop the pipeline 12 and pivotally mounts a wing 354 and a wing 356 which enclose a length of the pipeline in the closed position. As can best be seen in FIGS. 39–43, a pair of air cylinders 358 are pivotally mounted on each side of the main frame 352 and the pistons 360 thereof are pivotally secured to the adjacent wing. Retraction of the pistons 360 into the air cylinders will cause the wings to pivot away from the pipeline (as shown by wing 356 in FIG. 42), allowing the apparatus to be removed from the pipeline. Installation is performed by pressurizing the cylinder to pivot the wings into the closed position, as seen in FIGS. 39–41 for treatment of the pipeline. An auxiliary mechanical clamp, not shown, can be used to secure the wings in the closed position in lieu of or in supplement to maintaining pressure in the cylinders 358 to hold the wings in the closed position.

Mounted at the front of the main frame 352 is a drive assembly 362. Mounted at the back of the main frame 352 is an idler roller 364. The drive assembly 362 includes a motor which drives a gear reduction unit 368 with an output at gear 370. A driven roller 372 is mounted on the assembly and engages the top of the pipeline. A gear 374 is secured at one end of the roller and a chain 376 interconnects the gears 370 and 374 to transmit rotation from the motor to the drive roller 372. In this manner, the apparatus can be moved along the pipeline as desired.

As can be seen in FIGS. 39–43, each wing also mounts a front idler wheel 378 and a back idler wheel 380 which engage the surface of the pipeline when the wings are in the closed position. In the closed position, wheels 378 and 380 and rollers 364 and 372 are about 120° apart about the circumference of the pipeline.

Figure 44:
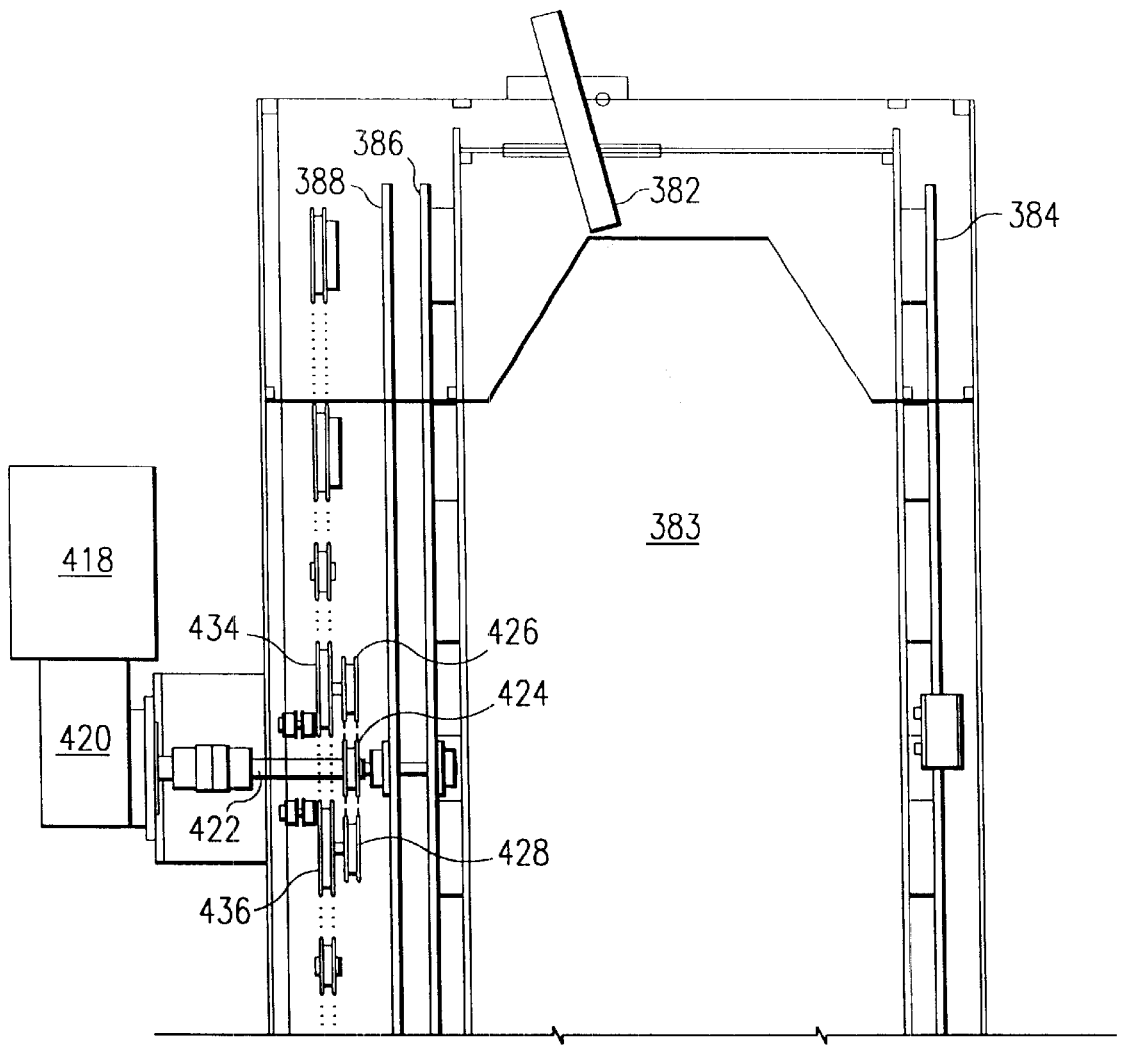
FIG. 44 is a partial cross-sectional view of the apparatus.

With reference now to FIG. 44, certain of the internal components of the apparatus will be described. Each of the wings mounts a number of separate nozzles 382 to perform the operation on the pipeline. As will be described, each nozzle is oscillated in an arc lying in a plane perpendicular to the center axis of the pipeline sufficiently large so that every bit of the outer surface of the pipeline will be treated. The nozzles discharge against the outer surface of the pipeline within a blast chamber 383 defined by the apparatus. For example, four nozzles can be mounted on each of the wings which oscillate about 45°.

Each wing mounts a semi-circular front ring 384 and first and second semi-circular back rings 386 and 388. Each of these rings is securely fastened to the wing. Brackets 390 and 392 are mounted on the rings for arcuate motion in a plane perpendicular the center line of the pipeline and each of these brackets mounts the nozzles 382.

With reference to FIGS. 51 and 52, each bracket 390 and 392 can be seen to include a central section 394 with a forward extending arm 396 and side portions 398 and 400 extending at an angle from the central section 394. At the forward end of the arm 396 is mounted an idle carriage 402 as best illustrated in FIGS. 49 and 50. The idle carriage has a pair of notched outer rollers 404 which engage the outer rim of the front ring 384. The carriage also has a single notched inner roller 406 which engages the inner rim of the ring 384. Thus, the idle carriage, and therefore the arm 396, is restrained from radial movement along a radial line extending from the center line of the pipeline, but is permitted to move in an arc at a constant radius from the center line guided along the inner and outer rims of the front ring 384.

Figure 47:
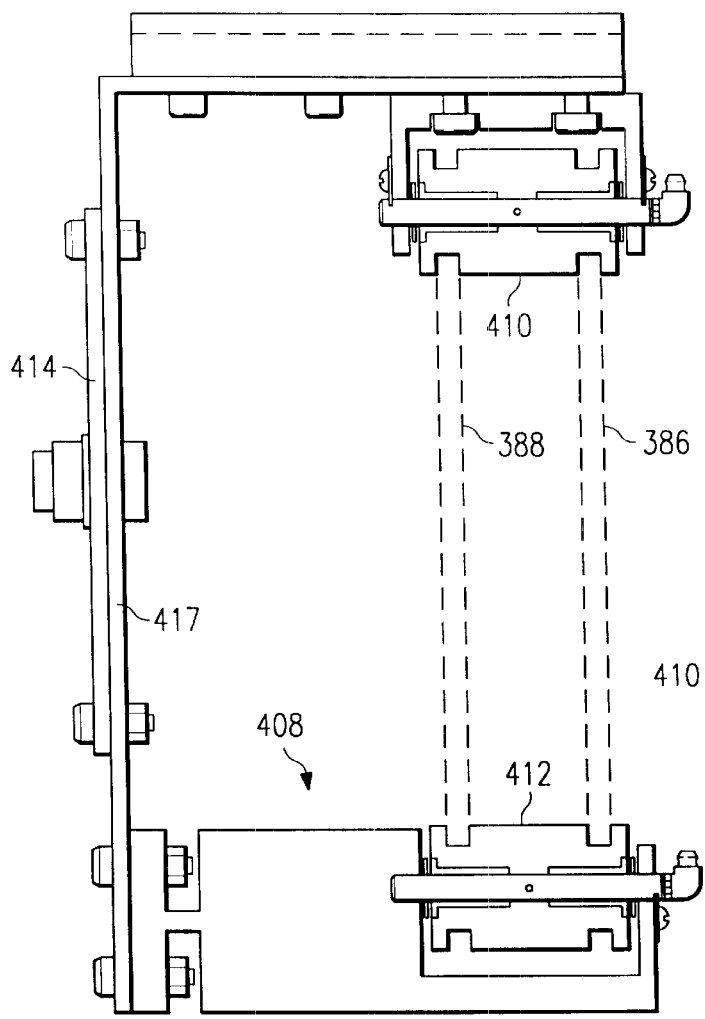
FIG. 47 is a side view of a carriage used in the apparatus.
Figure 48:
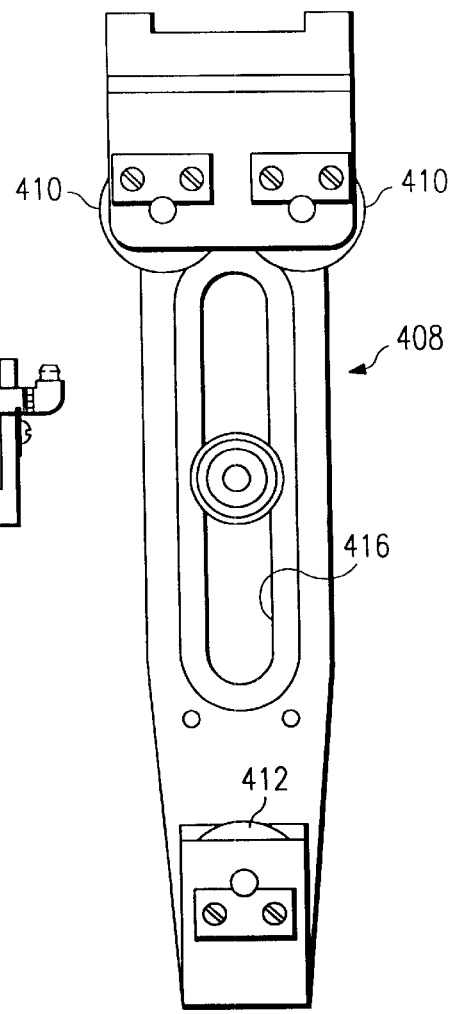
FIG. 48 is a front view of the carriage of FIG. 47.

Mounted to each of the side portions 398 and 400 of the brackets is a drive carriage 408 as illustrated in FIGS. 47 and 48. The drive carriage 408 mounts a pair of double notched outer rollers 410 which engage the outer rims of the rings 386 and 388. A single double notched inner roller 412 engages the inner rim of the rings 386 and 388. Again, the drive carriages 408 and side portions 398 and 400 are prevented from movement in a radial direction along a radial line from the center line of the pipeline by the engagement between the rollers and the rings. However, the carriages and side portions can move in an arcuate direction at a constant radius from the center line of the pipeline guided by the inner and outer rims of the rings 386, 388. Also forming part of each drive carriage 408 is a member 414 which defines an elongated guide slot 416 to engage the chain drive described hereinafter.

A quarter section backing plate 417 is bolted between each pair of drive carriages 408. The backing plate provides support to the carriages 408 and brackets as they oscillate.

Figure 45:
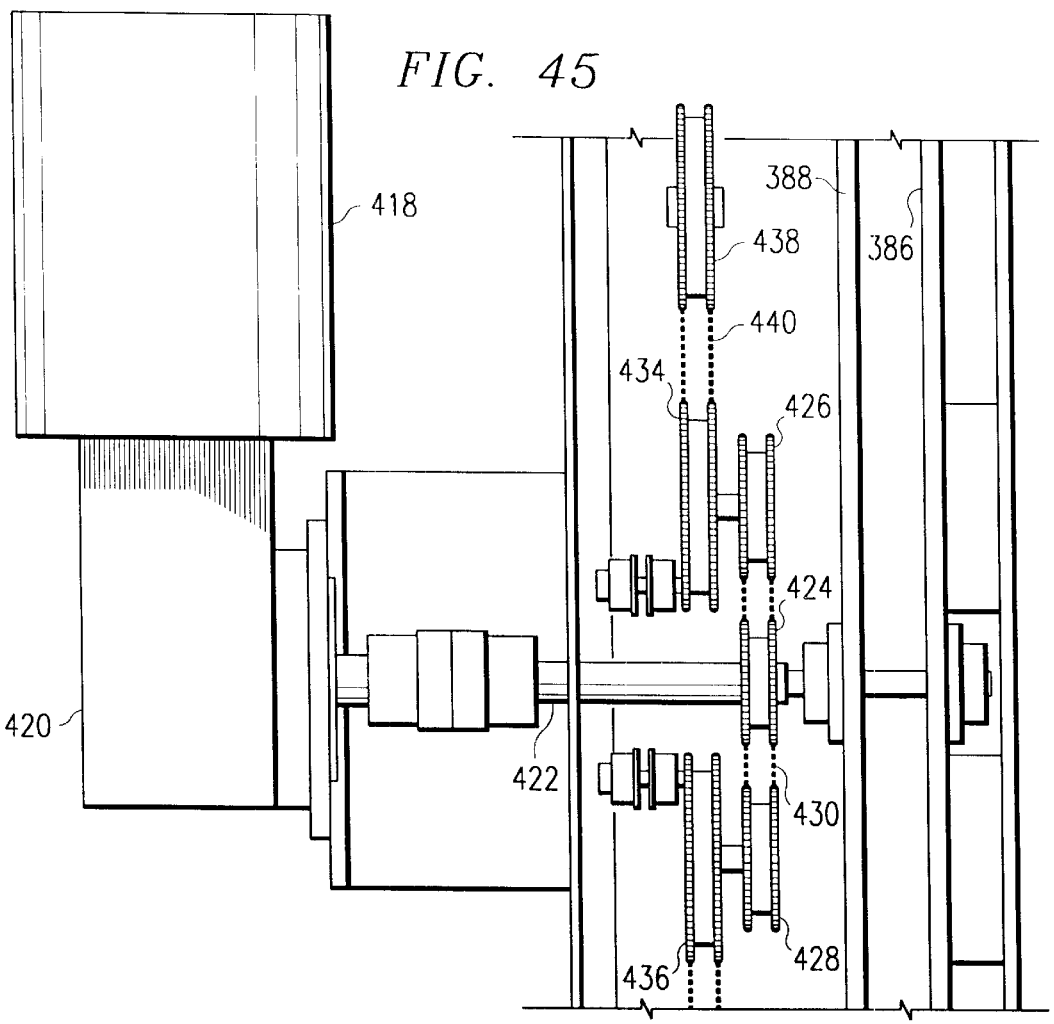
FIG. 45 is an illustrative view of the drive train of the apparatus.
Figure 46:
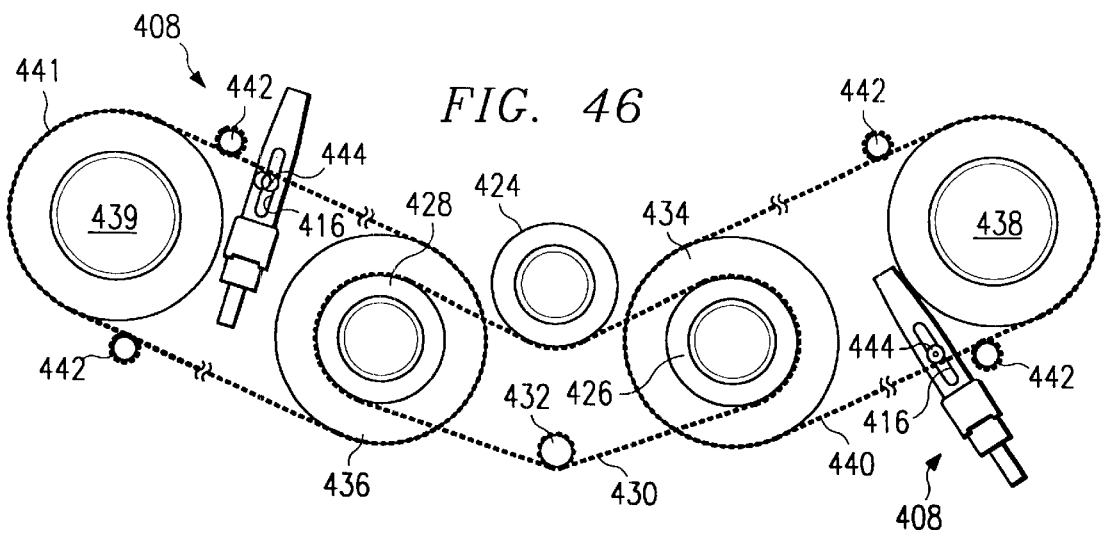
FIG. 46 is an illustrative view of the chain drive of the apparatus.
Figure 55:
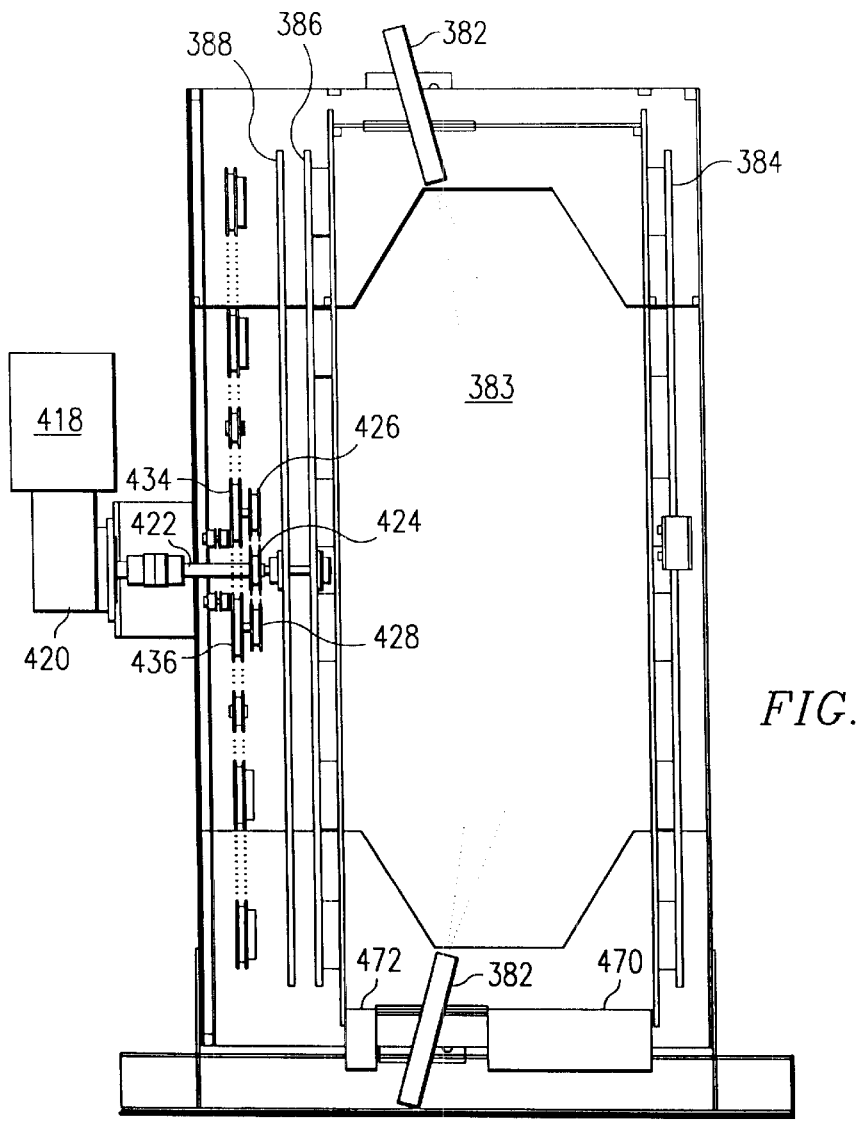
FIG. 55 is a cross-sectional view of the apparatus.
Figure 56A:
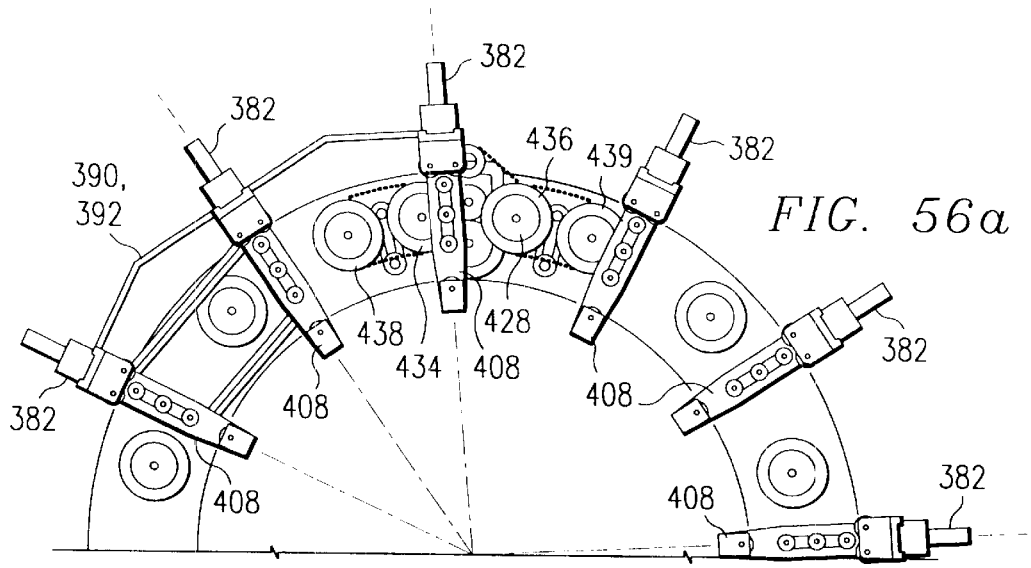
FIGS. 56A, B and C illustrate various nozzle Configurations on the apparatus.
Figure 56B:
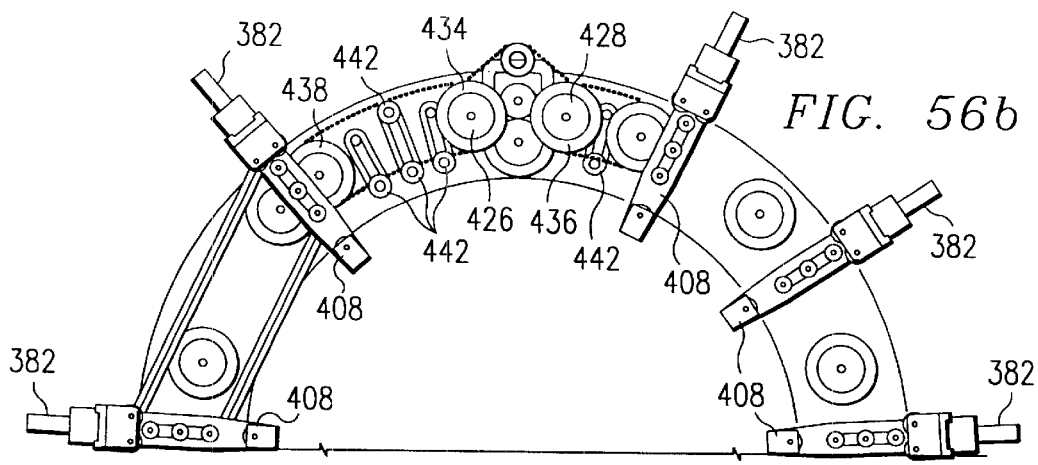
Figure 56C:
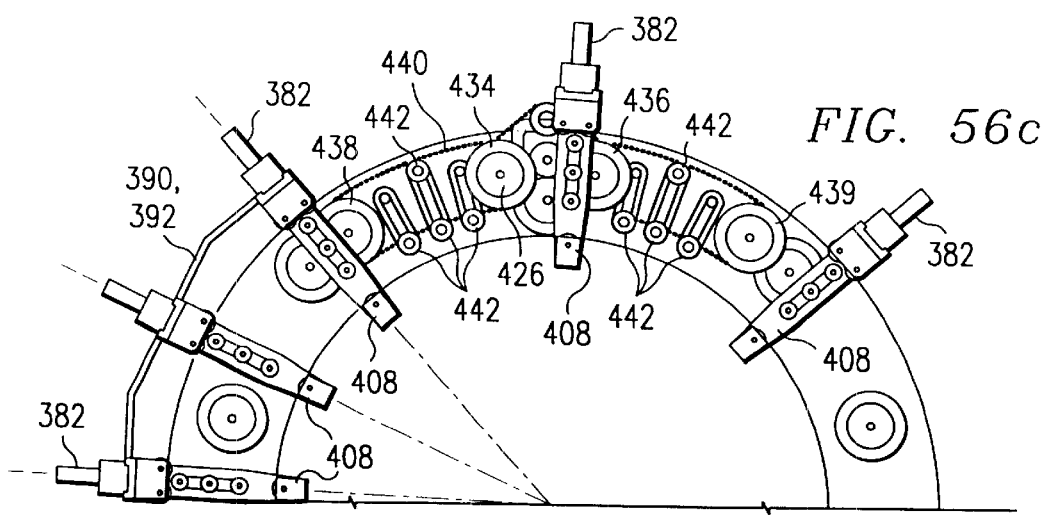
Figure 57:
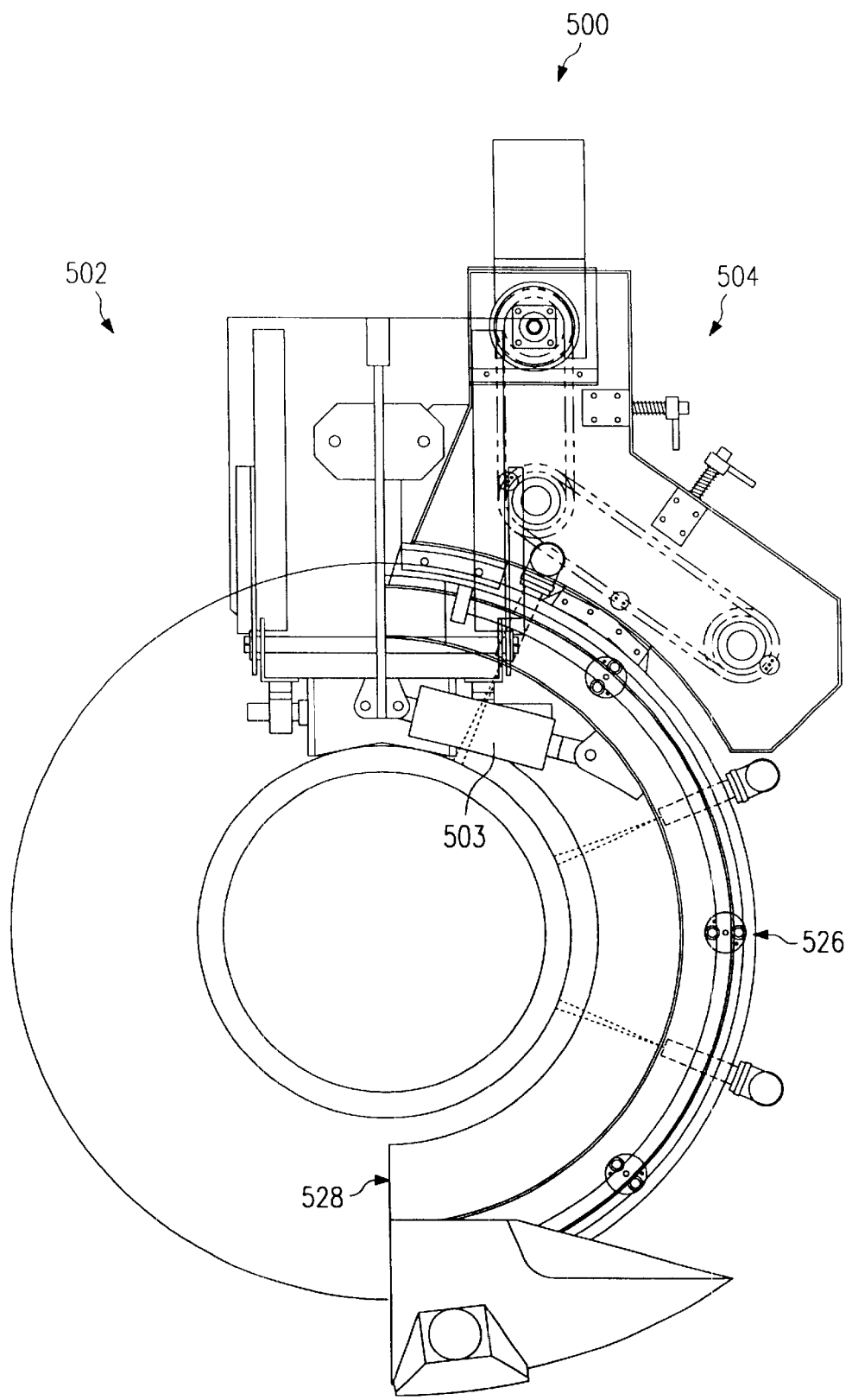
FIG. 57 is an end view of a carriage forming a fifth embodiment of the present invention.
Figure 58:
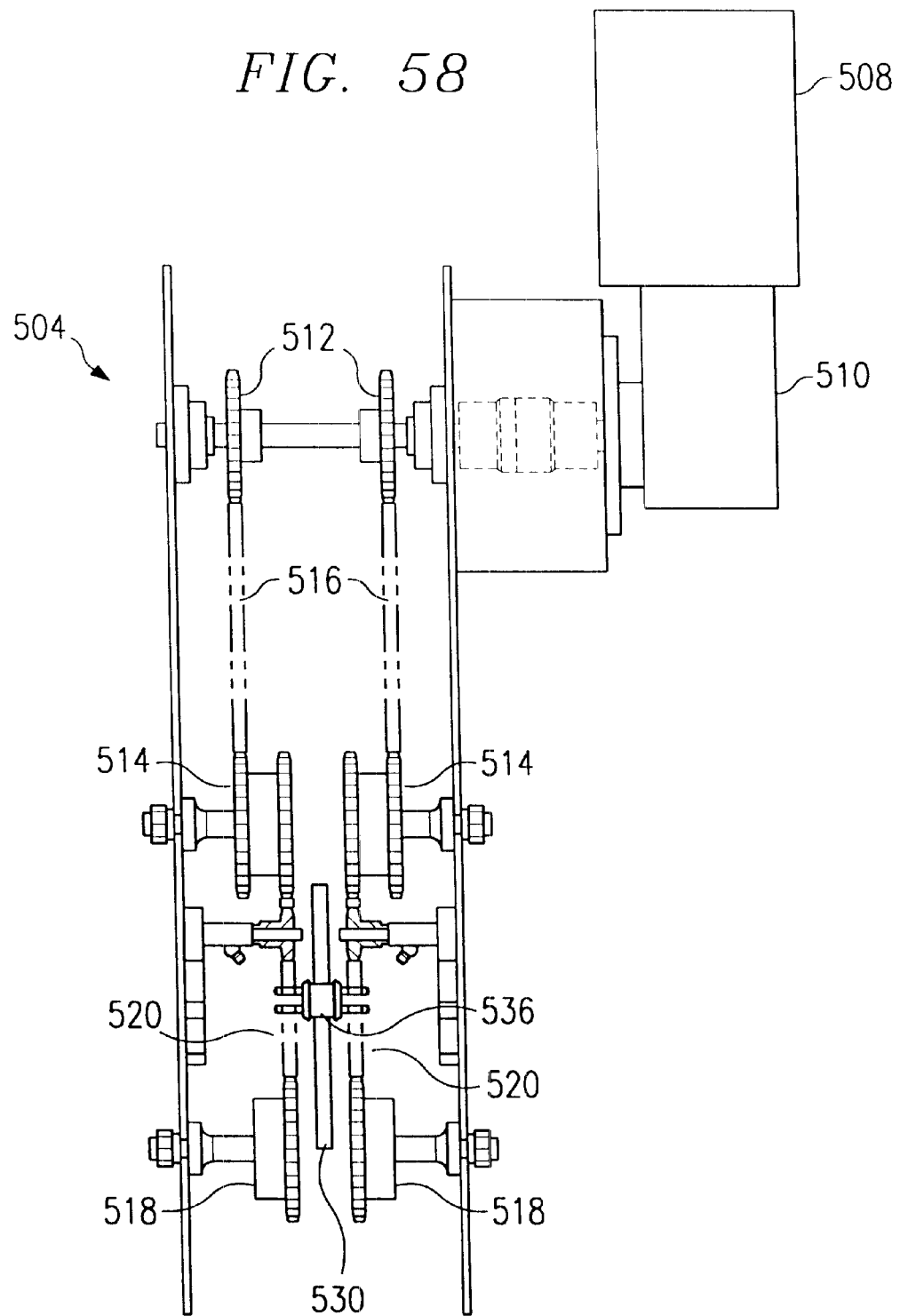
FIG. 58 is a detail view of the drive assembly of the carriage.
Figure 59:
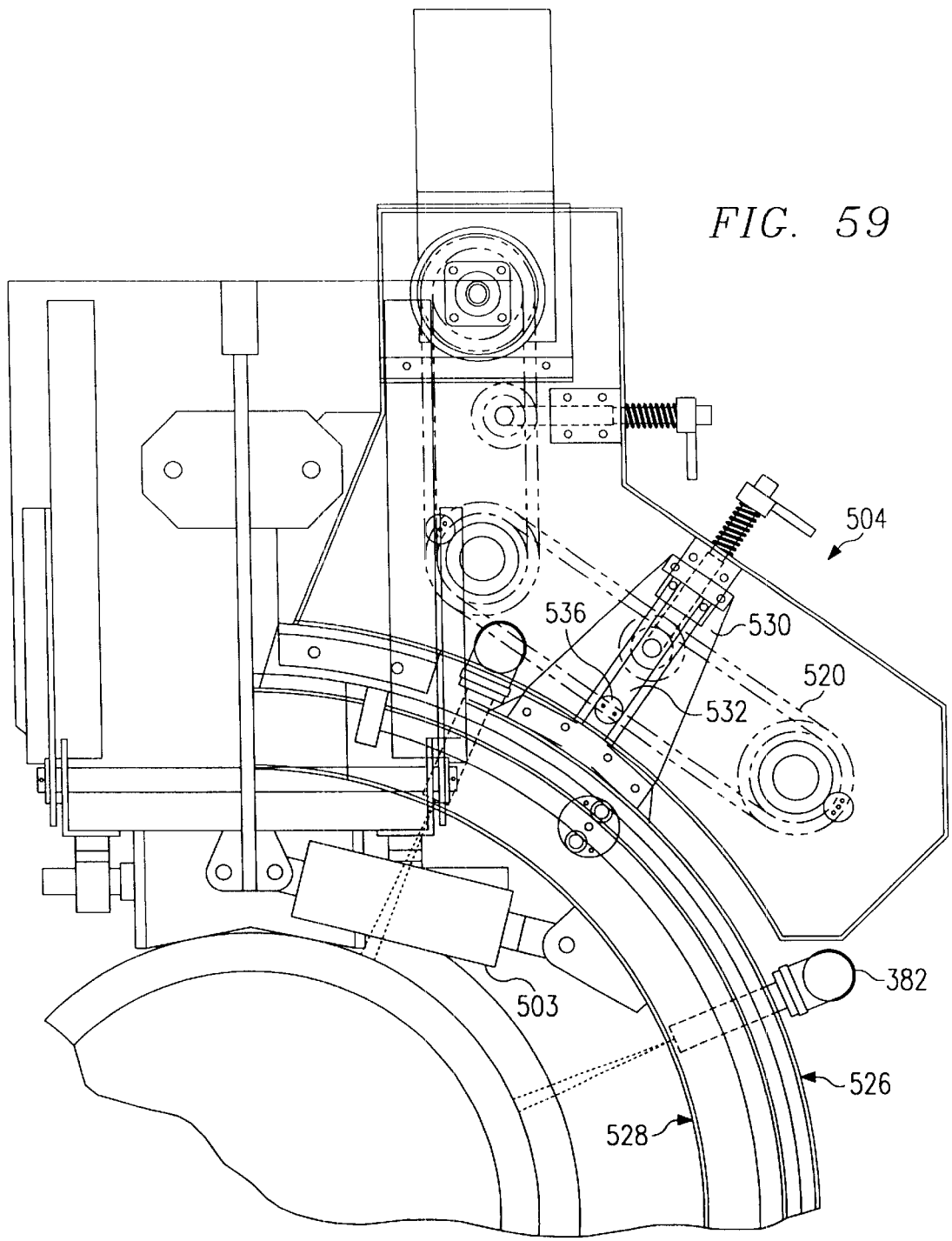
FIG. 59 is a detail end view of the carriage showing the detail of the drive assembly.
Figure 60:
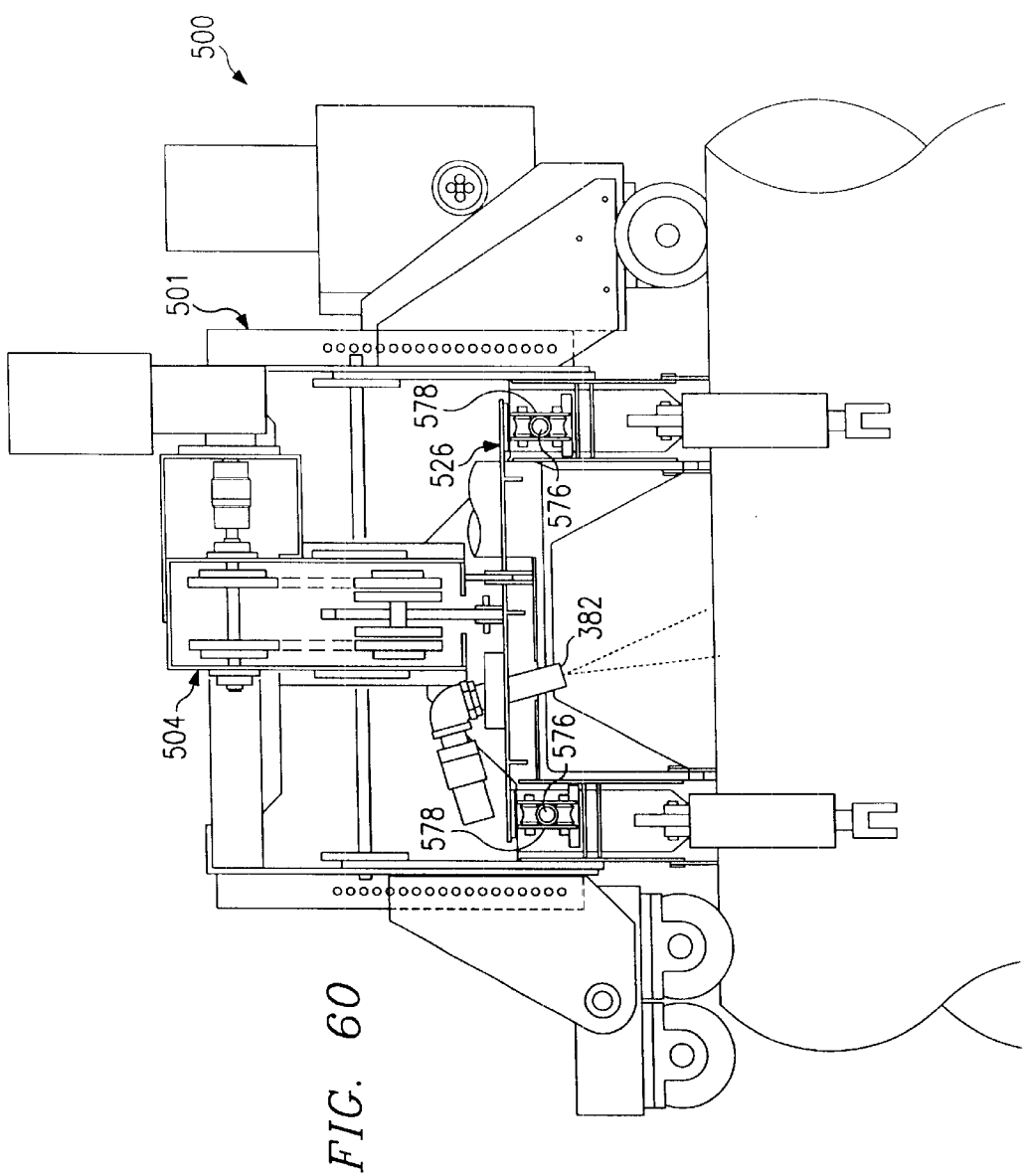
FIG. 60 is a side view in partial cross-section of the carriage.

Each wing mounts one or more drive motors 418 on the back side thereof (see FIGS. 44, 45 and 55). The drive motor is connected to a gear reduction unit 420 and the output of the unit 420 is provided through a drive shaft 422 ending in a gear 424. With reference now to FIGS. 44 and 45, the gear 424 drives gears 426 and 428 through a drive chain 430 tensioned by a tension idler 432. The gears 426 and 428, and tension idler 432, are each mounted for rotation on the back ring 388.

A gear 434 is mounted to gear 426 for joint rotation. Similarly, a gear 436 is attached for rotation with the gear 428. A gear 438 is spaced along the ring from gear 434 and is secured to the ring. A chain 440 extends about the gears 434 and 438 and is tensioned by chain tensioners 442. One link of the chain 440 is provided with a pin 444 which extends rearward from the chain and into the elongated guide slot 416 in one of the two drive carriages 408 mounted on the bracket 390. As the motor drives the gears and chain 440 in a constant unidirectional motion, the pin 444 will cause the drive carriage 408 and nozzles mounted thereon to be oscillated in an arcuate manner determined by the length of the chain 440. The position of gear 438 can be adjusted on the ring 388, and the chain 440 lengthened or shortened accordingly to change the degree of oscillation of the drive carriage, and therefore the nozzles. Similarly, a gear 439 is spaced along the ring from gear 436 and a chain 441 is tensioned about gears 436 and 439 by tensioners 442. One of the links of the chain also has a pin 44 extending rearward to engage the guide slot 416 in one of the drive carriages 408 on bracket 392.

The arcuate motion of each of the brackets 390 and 392 can be tailored for the number of nozzles mounted on the bracket. For example, if two nozzles are mounted on the bracket, one each on a side portion 398 or 400 as seen in FIG. 39, the arcuate motion of the bracket will be desired to about 45°. This will insure that the entire quadrant of the pipeline surface covered by the bracket will be treated. If three nozzles are mounted on the bracket, the chain 440 driving the bracket will be shortened and the gear 438 will be repositioned so that the arcuate motion is about 30°.

It should be noted that each driving motor, driving two brackets 390 and 392, can drive those brackets with different arcuate motions simultaneously. For example, pipe is often rustier on its bottom surface than its top surface. It may therefore be important to provide a heavier cleaning effort on the lower portion of the pipeline than the upper portion in order to maximize the speed of movement of the cleaning apparatus. As such, three nozzles could be put on the brackets 392 on the lower quadrants of the pipeline surface and two nozzles on the brackets 390 on the upper quadrants of the pipeline surface with the respective chains 440 and 441 and gears 438 and 439 positioned so that the upper quadrant is reciprocated 45° and the lower quadrant is reciprocated 30° for the same motion of the drive motor and drive gear 424. Thus, the present design provides great flexibility in tailoring the nozzle distribution for a particular pipeline application. For example, 4 to 12 nozzles, or more, could be used on the apparatus.

Figure 53:
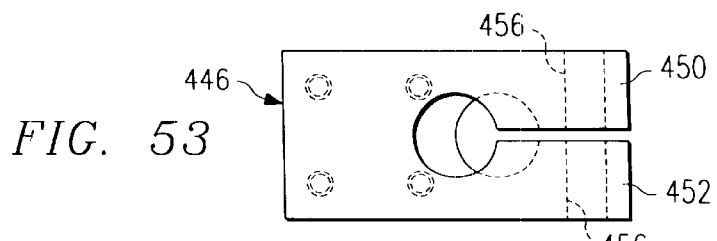
FIG. 53 is a top view of a clamp used in the apparatus.
Figure 54:
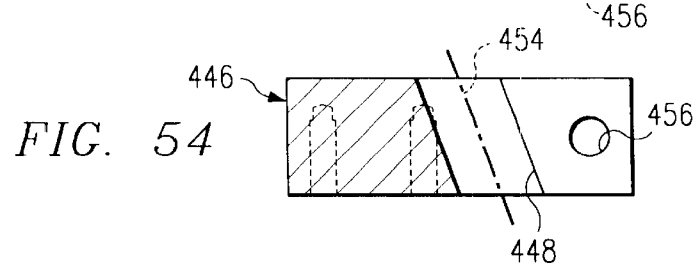
FIG. 54 is a side view of the clamp of FIG. 53.

With reference now to FIGS. 53 and 54, the individual nozzles 382 are held in position on the brackets by a nozzle clamp bracket 446. The bracket has an aperture 448 defined between two clamp arms 450 and 452 to receive the nozzle. The center line 454 of the aperture is preferred to be at an angle from perpendicular to the outer surface of the pipeline, typically 15°, which is believed to enhance the action of the nozzle discharge on the outer surface of the pipeline. The nozzle position relative to the outer surface of the pipeline can be varied by moving the nozzle along the center line of the aperture. When the desired position is reached, a bolt is passed through mating holes 456 in each of the arms and the arms are clamped together to clamp the nozzle to the bracket 446.

As seen in FIGS. 39–43, the pipeline treating apparatus 350 can be quickly adjusted for use on a different size pipeline within a predetermined range of sizes, for example, between 20–36 inches pipeline diameter. This is accomplished through the mounts of the drive assembly 362, roller 364 and the idler wheels 378 and 380. As can best be seen in FIG. 39, each idler wheel is mounted on a bracket 460 which has a plurality of holes 462 spaced at one inch intervals therealong which lie on a radial line from the center line of the pipeline. The idler wheels can simply be reattached at different holes 462 along the bracket 460 to adjust the radial position of the idler wheel. The drive assembly 362 and roller 364 are similarly mounted on brackets 464 with a plurality of holes 466 lying on a radial line from the center line of the pipeline to permit the drive assembly to be radially moved in a similar manner.

In addition to the movement of the drive assembly and idler wheels, the annular brushes 468 at each end of the apparatus will be changed to accommodate the diameter of the pipeline. The brushes 468 are intended to isolate the blast chamber 383 defined by the apparatus about the outside of the pipeline being treated from the exterior environment during surface preparation activities.

In one application, pipeline treating apparatus 350 is designed for cleaning the exterior of a pipeline with small steel particles exhausted from the nozzles by air at a pressure between 100 and 150 psi. The particles, and debris removed from the exterior of the pipeline, will fall by gravity near the bottom of the apparatus 350. Manifolds 470 and 472 are provided at the bottom of the apparatus and are connected to vacuum piping to draw the debris and material out of the apparatus for separation, treatment and disposal.

With reference now to FIGS. 57–60, a pipeline treating apparatus 500 forming a modification of the present invention is illustrated. Many of the elements are identical to those previously described in pipeline treatment apparatus 350 and are identified by the same reference numeral.

Apparatus 500 has an oscillating assembly which includes a pair of identical chain drive assemblies 502 (not shown) and 504 which oscillate nozzles in an arcuate manner about the outer surface of the pipe 12 being treated. Each chain drive assembly includes an electric motor 508, a gear reduction 510 and a pair of drive gears 512 rotated by the motor 508. Each of drive gears 512 is connected to intermediate gears 514 through drive chains 516. Each of the intermediate gears 514 is, in turn, connected to final gears 518 through drive chains 520.

A drive carriage 522 (not shown) is mounted on one wing 524 (not shown) of the apparatus for arcuate motion along a predetermined angle, for example about 45°. Similarly, an identical drive carriage 526 is mounted on an identical wing 528 for similar arcuate motion. Each of the drive carriages has a drive plate 530 which extends between the drive chains 520 and is linked to the drive chains 520 to oscillate the drive carriages. Each drive plate 530 has a slot 532 formed therein which receives a pin 536 which extends between the drive chains 520. In this design, as discussed previously, the continuous unidirectional motion of the drive chains 520 will induce a reciprocating motion in the drive carriages as the pin 536 moves the drive carriages in the arcuate manner while moving up and down within the slot as the pin moves from the upper flight of the drive chain to the lower flight of the drive chain.

The mechanism described has significant advantages in providing a balanced force to the drive carriages to oscillate the carriages.

Wings 524 and 526 are pivoted to main frame 501 and can be moved between an open, removal position by cylinders 503 for removal or installation of the apparatus on the pipeline and a closed position concentric with the pipeline for treating the surface.

Figure 61:
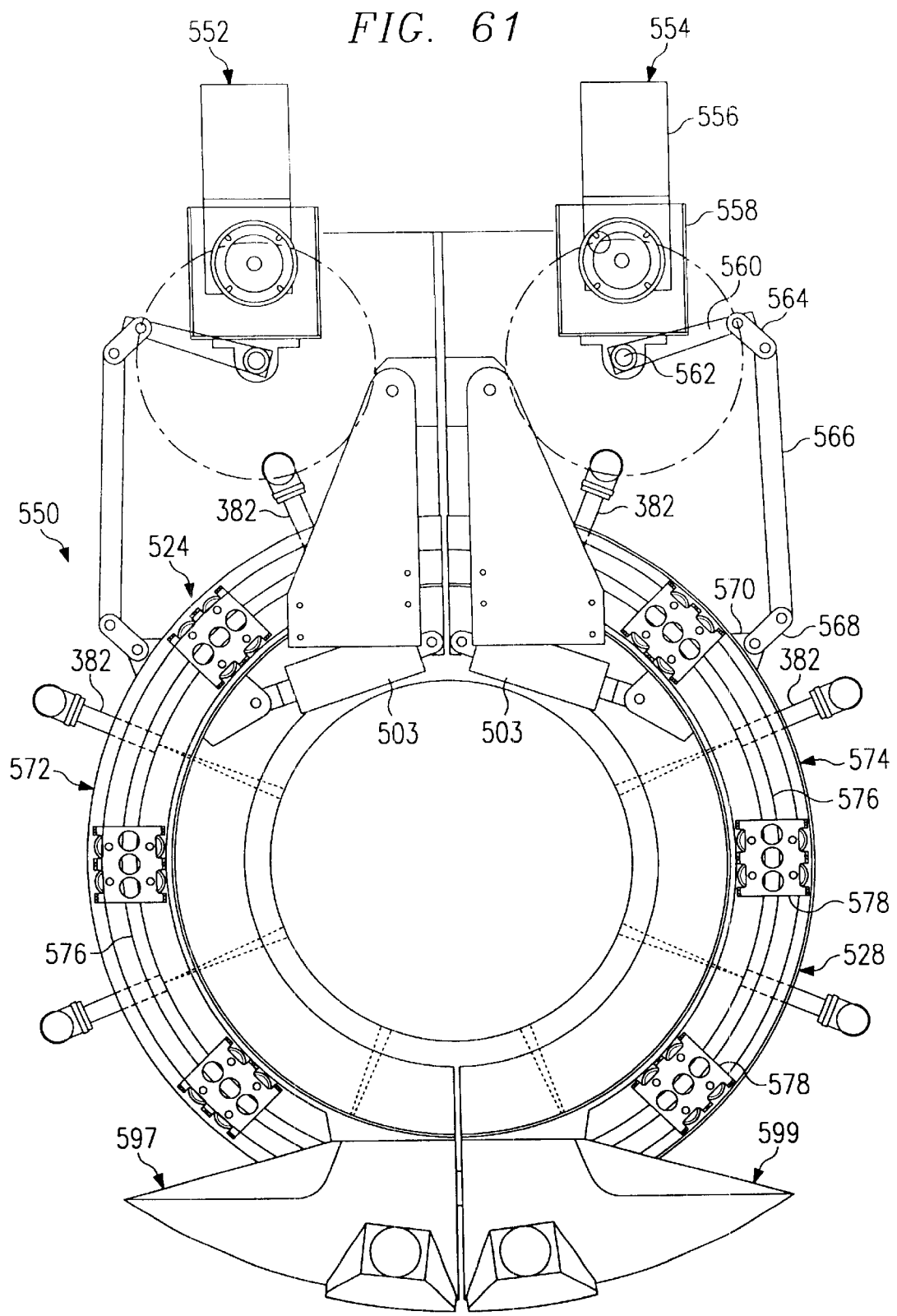
FIG. 61 is an end view in partial cross-section of a carriage forming a sixth embodiment of the present invention.
Figure 62:
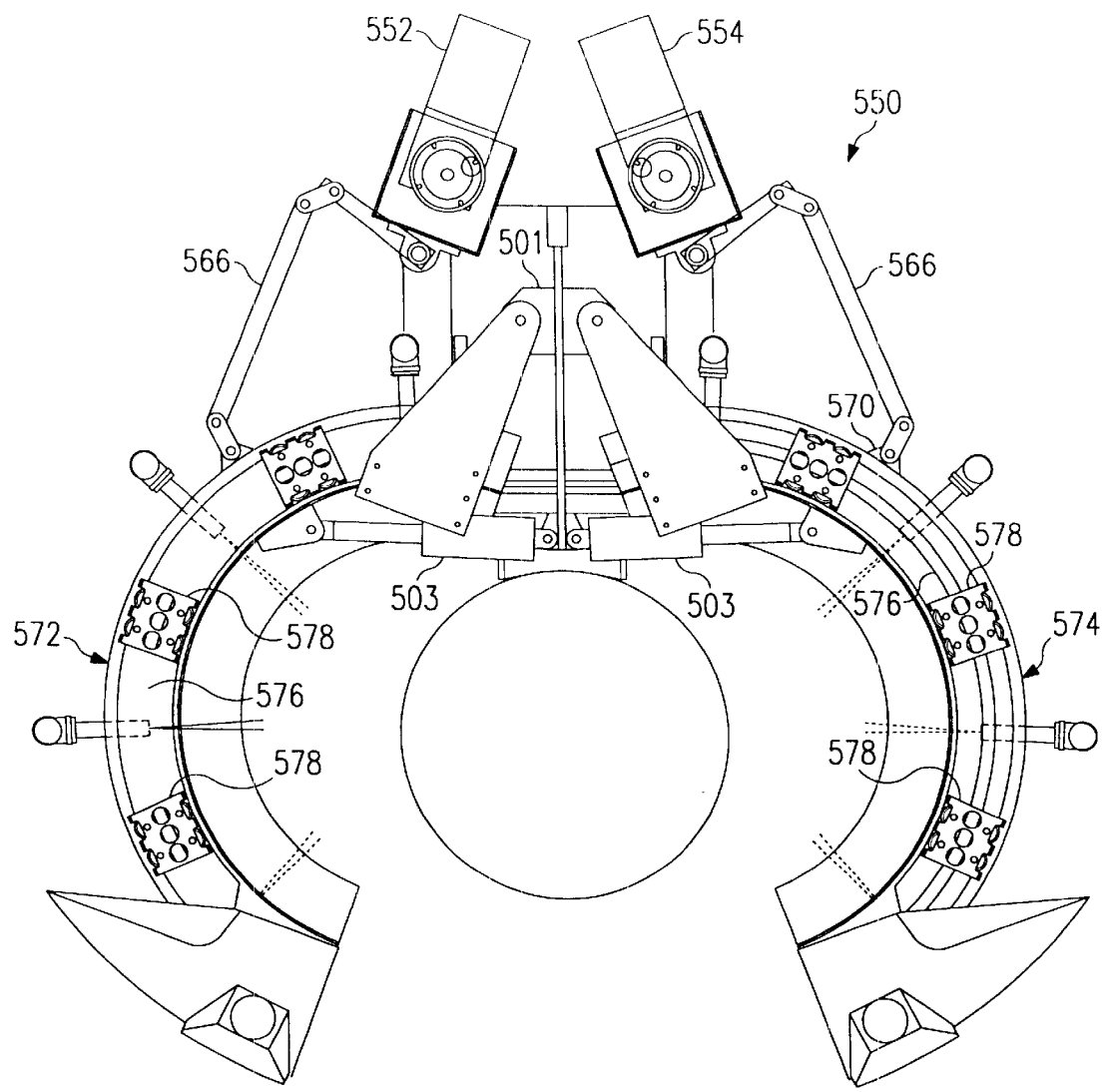
FIG. 62 is an end view in partial cross-section of the carriage showing the wings open to the removal position.
Figure 63:
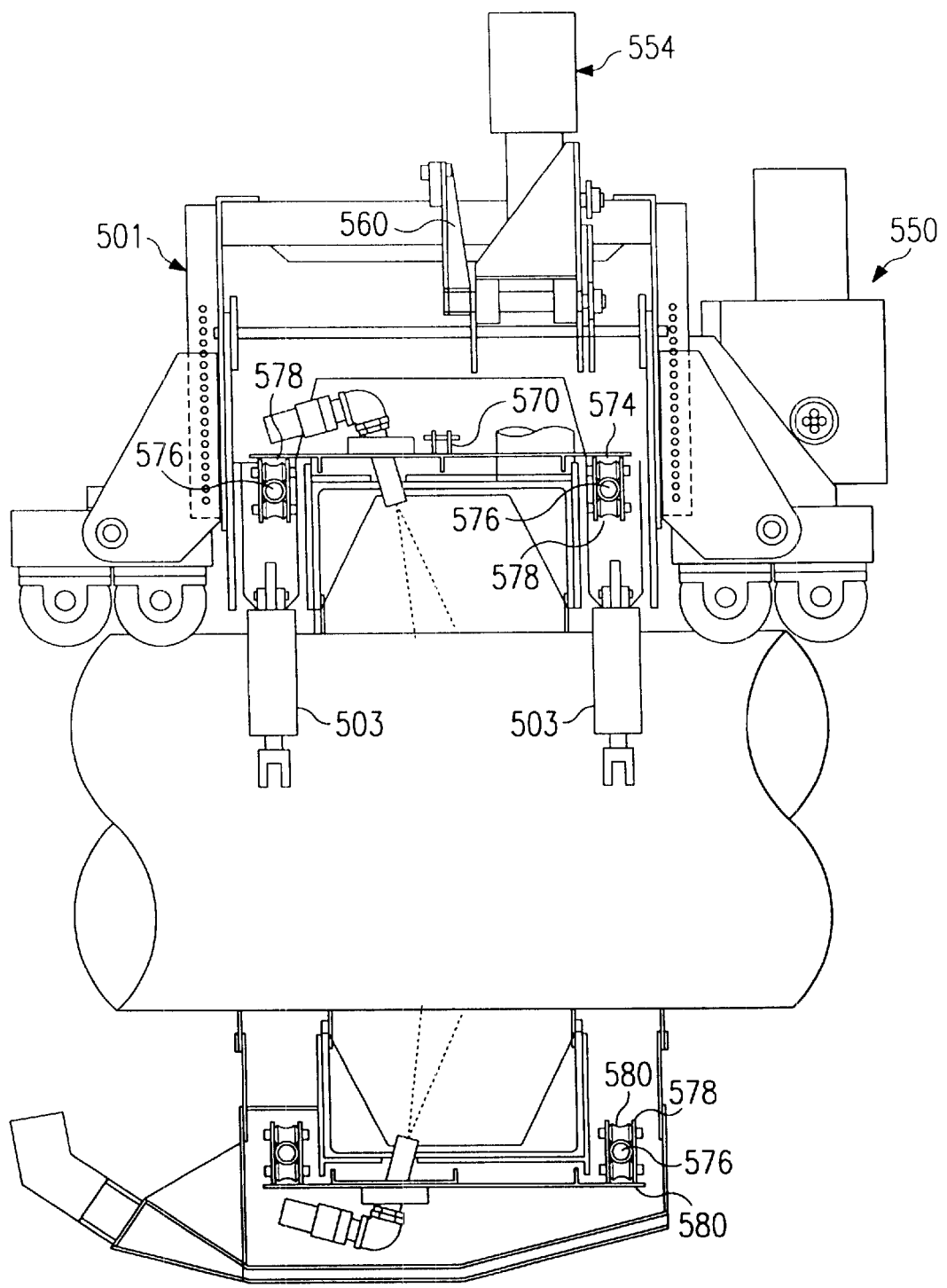
FIG. 63 is a side view in partial cross-section of the carriage.
Figure 64:
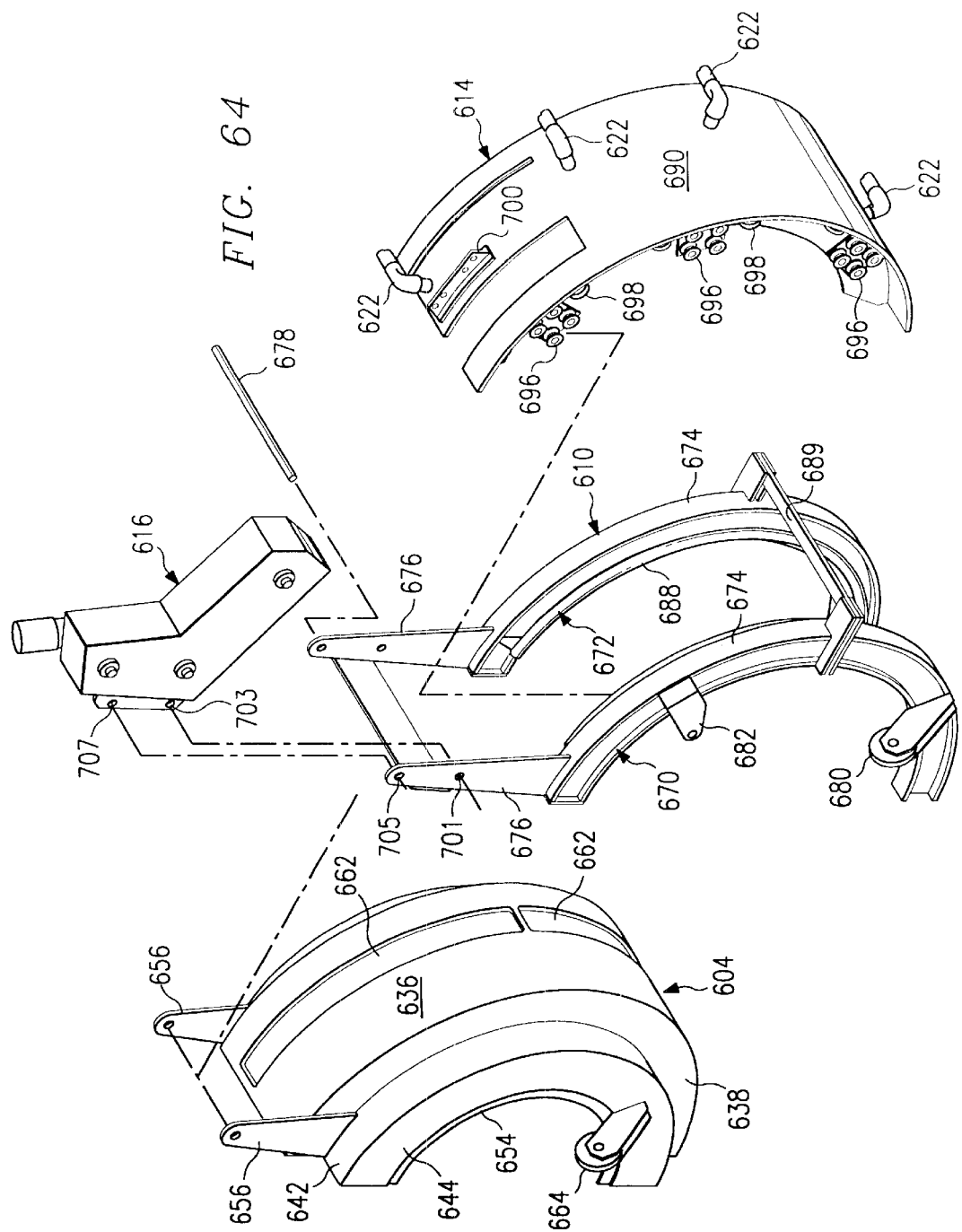
FIG. 64 is an exploded perspective view of a carriage forming a seventh embodiment of the present invention.

With reference now to FIGS. 61–63, apparatus 550 will be described. Many of the elements of apparatus 550 are identical to those of apparatus 500 and are identified by the same reference numeral.

Apparatus 550 has crank arm drive assembly 552 and 554. Each crank arm drive assembly includes an electric motor 556, a gear reduction box 558 and a crank arm 560. The crank arm is rotated about the axis of rotation 562. The end of each crank arm distant from the axis of rotation is pivoted to one end of a transition link 564. The other end of transition link 564 is, in turn, pivotally secured to one end of an intermediate link 566. The other end of intermediate link 566 is, in turn, pivotally secured to one end of a second transition link 568. Finally, the other end of the second transition link 568 is pivotally secured to a bracket 570 on the drive carriages 572 and 574.

The drive carriages 572 and 574 are mounted for arcuate motion on arcuate guide rails 576. A guide rail 576 is positioned on each side of a drive carriage and the drive carriage is mounted to the guide rails through bearing assemblies 578. As can be seen in the figures, each bearing assembly includes a plurality of bearings 580 which are grooved or notched to conform to the circular outer surface of the guide rails 576.

As will be apparent, as the motors 556 rotate the crank arms 560, the drive carriages will oscillate in an arcuate manner guided by the guide rails 576. Preferably, the drive carriages will oscillate about an arc of 450 when four nozzles are mounted on each drive carriage. Clearly, the arcuate motion can be varied to correspond to the number of nozzles utilized.

In an embodiment constructed in accordance with the teachings of the present invention, the nozzles are mounted on the drive carriages to be adjustable in increments of 5° for angles of between 15 to 300 relative to the surface of the pipeline. Depending on the number of nozzles, the drive will oscillate 20 to 50 times per minute. With this mechanism, the distance between nozzles is controlled and constant. The drive carriages also act as shields to keep the blast media inside the chamber.

A collection pan half 597 is mounted at the lower end of wing 524 and a collection pan half 599 is mounted at the lower end of wing 528. When wings 524 and 528 are moved to the concentric position about the pipeline, as seen in FIG. 61, the halves 597 and 599 form a complete collection pan to collect debris from the treating operation. Ports 598 in the halves allow for disposal of the debris.

Figure 74:
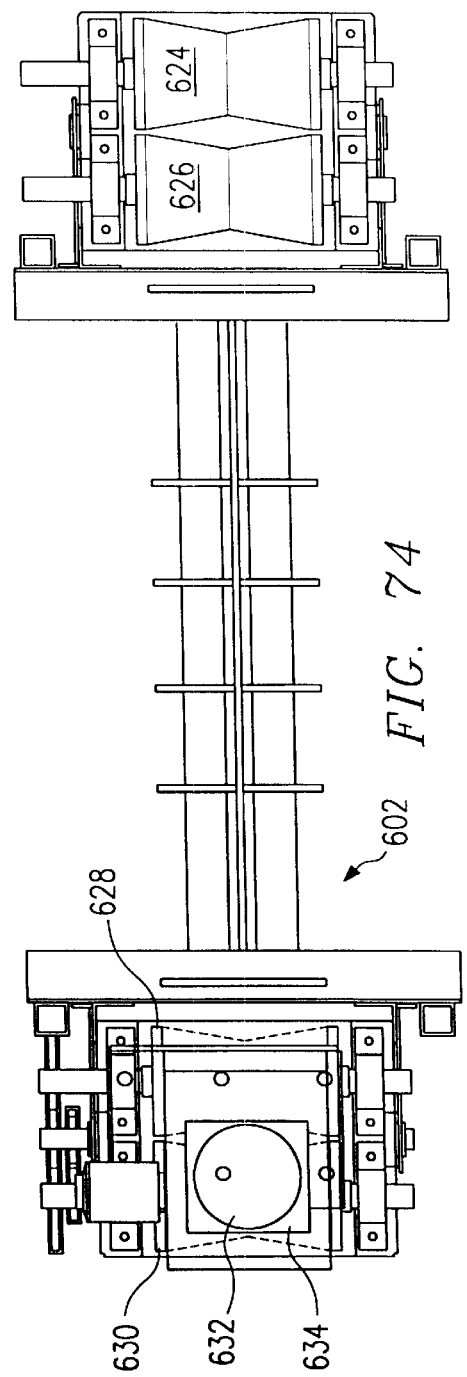
FIG. 74 is a top view and partial cross-section of the main frame of the carriage.
Figure 75:
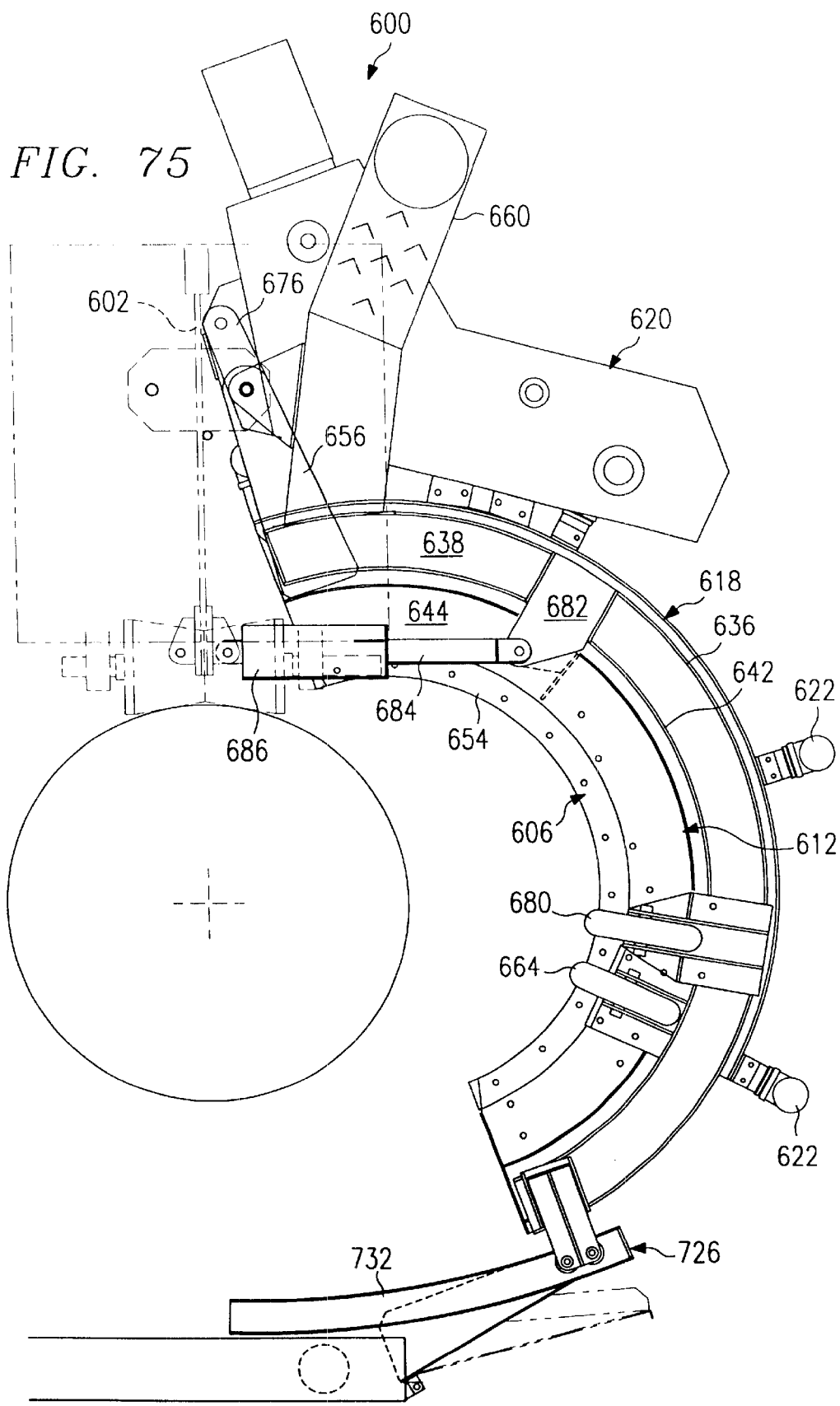
FIG. 75 is an end view, in partial cross-section, of the carriage with the housing sections and the nozzle frames moved to the removal position.

With reference now to FIGS. 64–75, another modification of the invention is illustrated and identified as apparatus 600. The apparatus 600 can be used to clean, blast or coat the pipeline. The apparatus 600 has a main frame 602 which is supported through rollers on the pipe being treated. Supported from the main frame 602 are a first housing section 604 and a second housing section 606. The housing sections are pivoted to the main frame for pivotal motion from an operational position, where the housing sections fit closely about the outer circumference of the pipe to define a chamber 608 therein (FIG. 66), to a removal position where the housing sections 604 and 606 are separated from each other to permit the apparatus 600 to be lifted off or lowered onto the pipe (FIG. 75).

Figure 66:
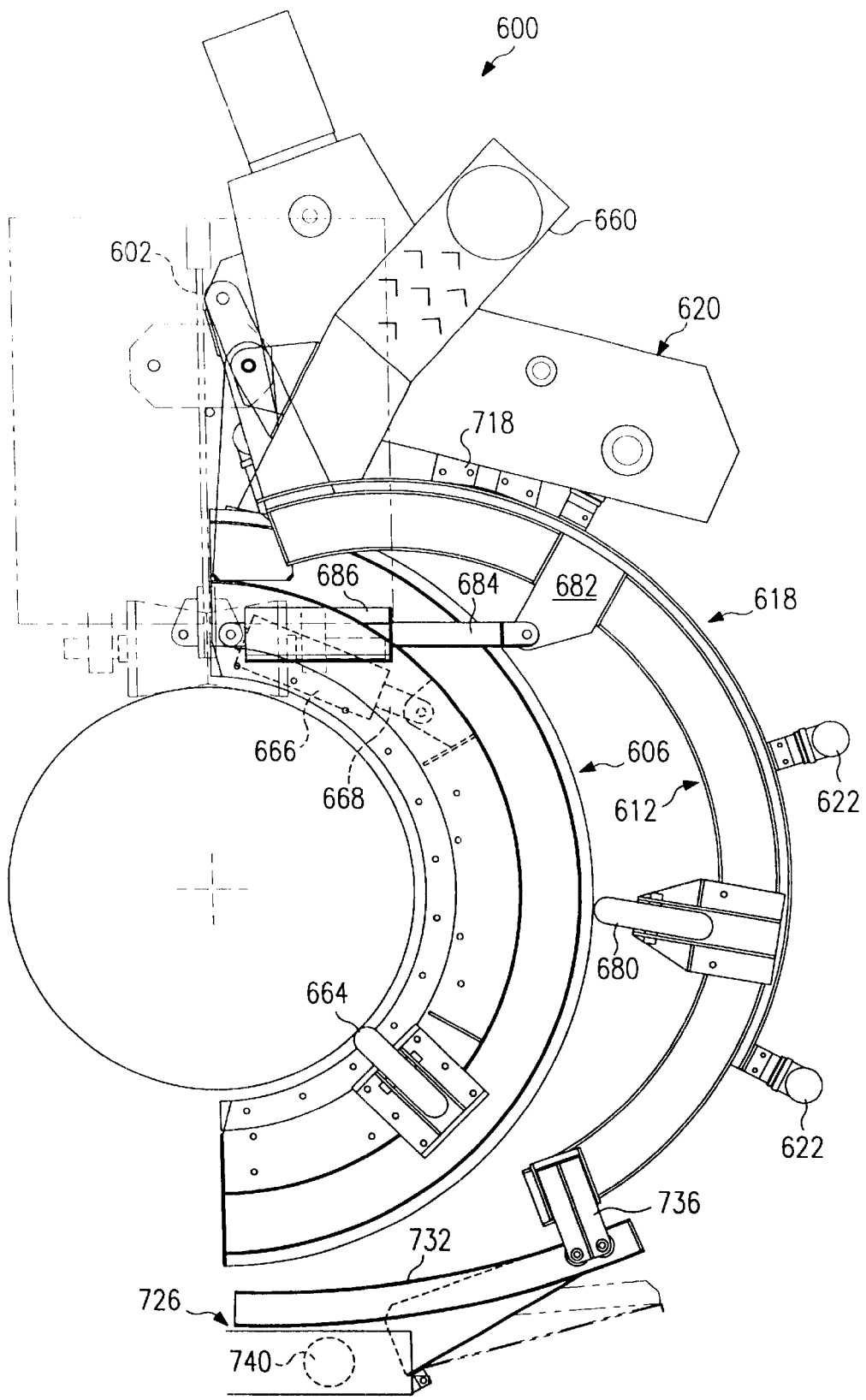
FIG. 66 is an end view in partial cross-section of the carriage.

A first nozzle frame 610 and a second nozzle frame 612 are pivoted to the main frame 602 and similarly can move, independent of housing section 604 and 606, between an operational position concentric with the pipe being treated and a removal position permitting the apparatus 600 to be lifted on or lowered onto the pipe (FIGS. 66, 75). The first nozzle frame 610 mounts a first nozzle plate 614 and a first oscillation drive 616 which oscillates the nozzle plate 614 relative to the nozzle frame 610 and to the circumference of the pipe. A second nozzle plate 618 and a second oscillation drive 620 are mounted to the second nozzle frame 612 for similar oscillation motion. The individual nozzles 622 are mounted on the nozzle plates 614 and 618 and are oscillated through a predetermined arc relative to the outer circumference of the pipe to perform the desired operation.

With reference to FIG. 74, the main frame 602 can be seen to include unpowered rollers 624 and 626 at one end of the frame and powered rollers 628 and 630 at the other end of the frame. The rollers support the apparatus 600 on the pipe and drive the apparatus 600 along the pipe during treatment. The powered rollers are driven by a motor 632 acting through a gear reduction unit 634 and a chain drive which rotates the rollers 628 and 630.

Figure 67:
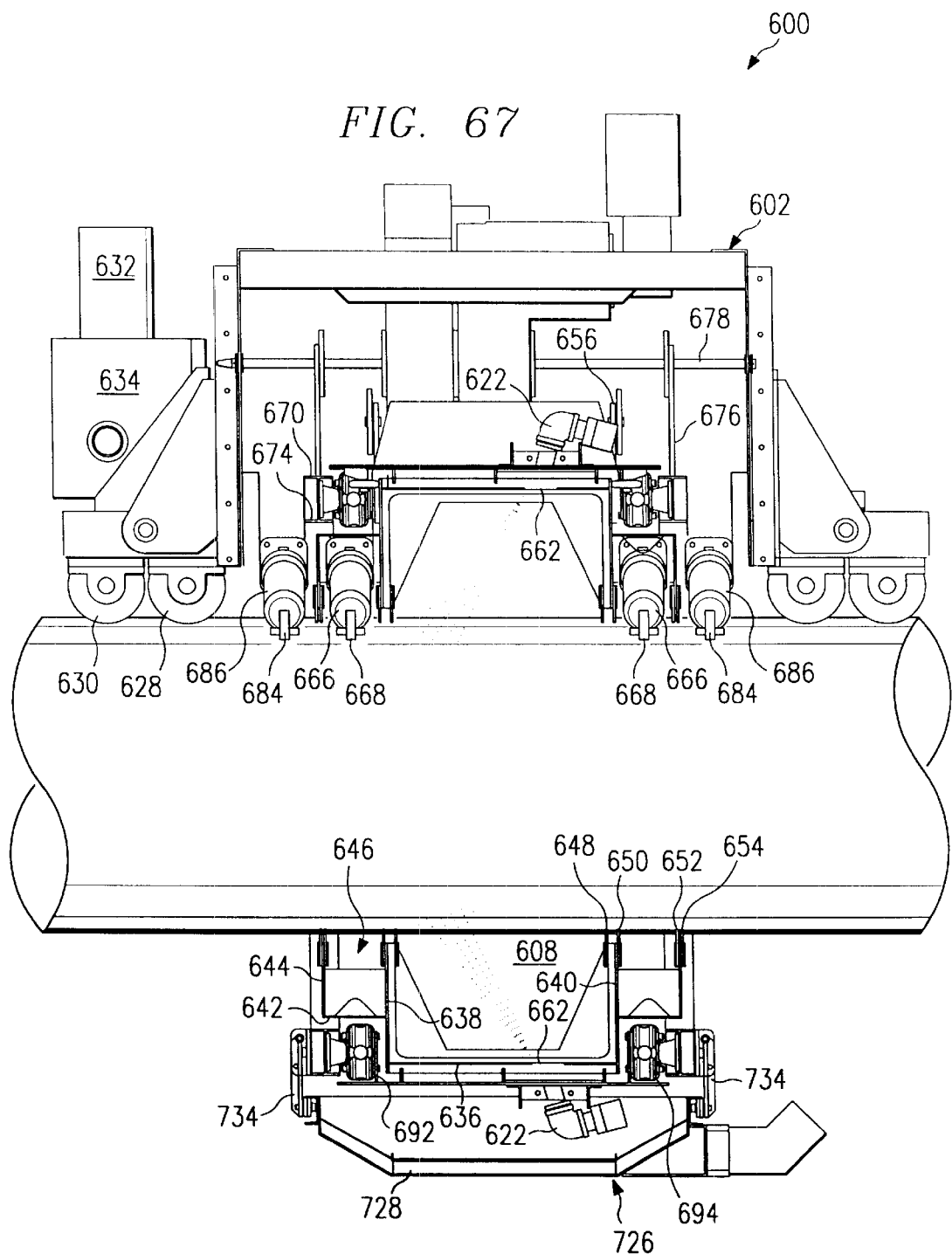
FIG. 67 is a side view in partial cross-section of the carriage.
Figure 68:
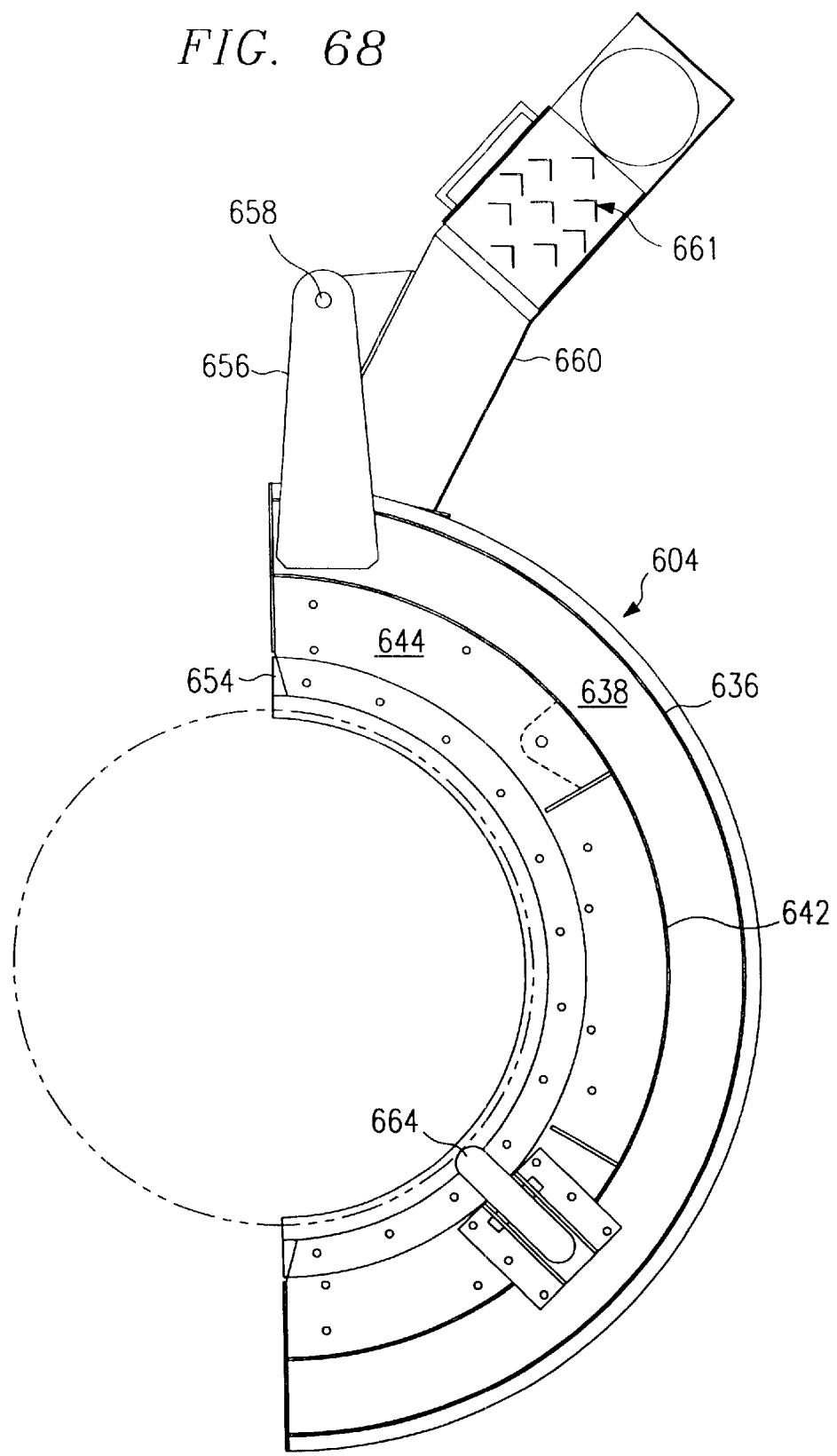
FIG. 68 is an end view of the first housing section of the carriage.

With reference to FIGS. 67 and 68, the first housing section 604 will be described. The second housing section 606 is essentially identical, being a mirror image of the first housing section 604. The first housing section 604 defines a hemicylindrical member including a hemicylindrical outer plate 636 and side plates 638 and 640 which combine to define the chamber 608. Extending outwardly from each side plate is a hemicylindrical side outer plate 642 and, from the outer edge of plate 642, an outer side plate 644. The plates 638, 640 and 644 and side outer plate 642 define outer chambers 646. A pair of seals 648 and 650 are mounted on either side of plates 638 and 640 to isolate the chamber 608 from the outer chamber 646. Similar seals 652 and 654 are mounted on opposite sides of each of the outer side plates 644 to prevent material from escaping from the outer chambers exterior the apparatus. Thus, for material to escape to the exterior of the apparatus, it must first pass the double seals between the chamber 608 and the outer chambers 646 and then pass the double seals between the outer chambers 646 and the exterior of the apparatus. Most of the debris in chamber 608, and the debris which forces its way into outer chambers 646 simply will fall by gravity to the bottom of the apparatus where it will be collected in a collection pan as described hereinafter.

With reference to FIG. 68, the first housing section 604 can be seen to be pivoted to the main frame 602 through a pair of brackets 656 hinged on hinge pins 658 on the main frame 602. A dust collection duct 660 is mounted on each housing section over an aperture in the outer plate 636 near the top of the housing section for collection of airborne dust and the like. A deflector section 661 in the duct will reduce the kinetic energy of any debris thrown outward in the duct from chamber 608. The duct may be connected to a vacuum source to draw the dust from chamber 608 for disposal.

As seen in FIG. 67, a gap 662 is formed in each of the outer plates 636 which permits the discharge of each of the nozzles 622 to enter the chamber 608. The gap is preferably in two sections, broken by a bridge at about the middle of the housing section. The first housing section also mounts guide wheels 664 on each of the outer side plates 644 to contact the outer surface of the pipe to assist in centering the housing sections about the pipe axis. The first housing section 604 is moved between the operational position and the removal position by a pair of cylinders 666 mounted on the main frame with the piston 668 of each cylinder pivoted to the first housing section. The cylinders 666 hold the housing section in the operational position as well as the removal position.

Figure 69:
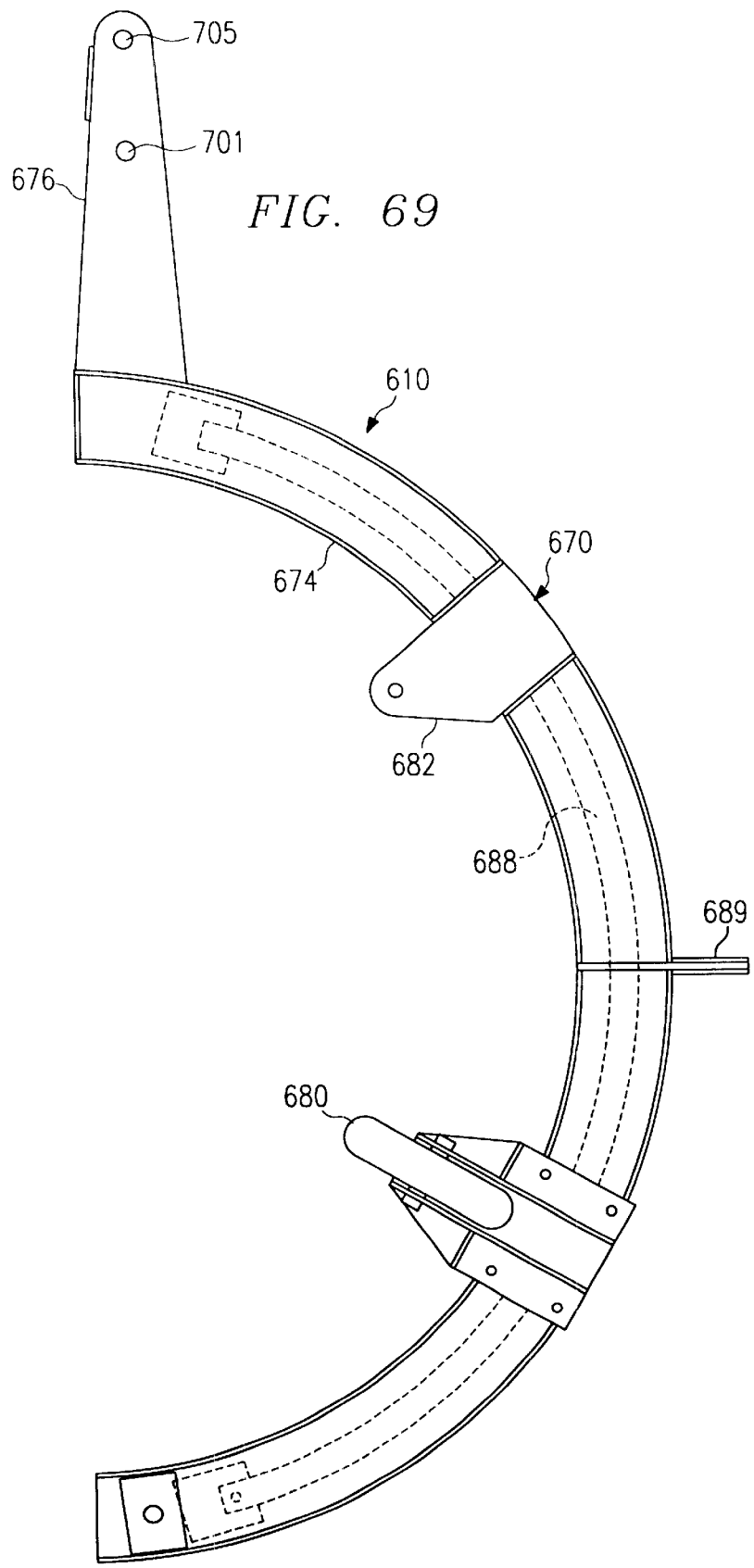
FIG. 69 is an end view of the first nozzle frame of the carriage.

With reference to FIGS. 67 and 69, the first nozzle frame 610 will be described. The second nozzle frame 612 is substantially identical, being a mirror image of the first nozzle frame 610. The first nozzle frame is formed of a left half 670 and a right half 672. Each half includes an arcuate beam 674 which extends about 180°. A bracket 676 is mounted at the top of each beam for pivotal mounting on the main frame 602 through holes 701 by pivot pins. A pin 678 is received through holes 705 of brackets 676 and holes 707 in oscillation drive 616. A guide wheel 680 is mounted on the beam 674 to engage the outer surface of the pipe to assist in insuring the first nozzle frame is concentric with the pipe axis. A bracket 682 is mounted on the beam 674 and pivotally mounts the end of a piston 684 of a cylinder 686 to move the nozzle frame from the operation position concentric with the pipeline to the removal position. The cylinders 686 hold the nozzle frame in the operational position as well as the removal position. On the inside surface of the arcuate beam 674 is mounted a cylindrical guide tube 688 which extends about 150° of arc. As will be described hereinafter, the first nozzle plate 614 is guided for oscillating motion along the guide tubes 688 and also acts to maintain the two halves 670 and 672 of the nozzle frame at the same distance from the pipe being treated. Two halves 670 and 672 are also connected by a cross brace 689 which does not interfere with the oscillation of the nozzle plate.

Figure 70:
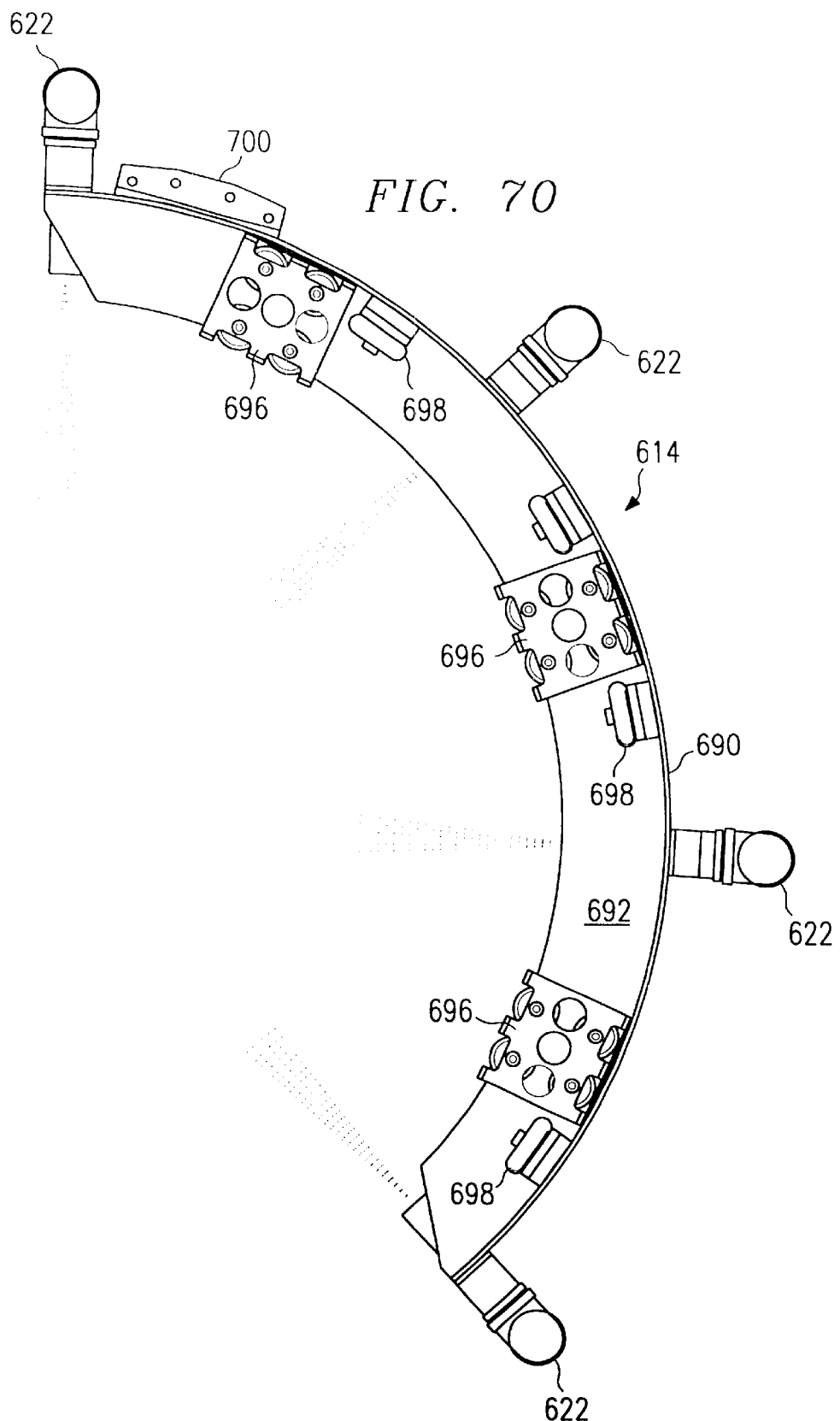
FIG. 70 is an end view of the first nozzle plate of the carriage.
Figure 73:
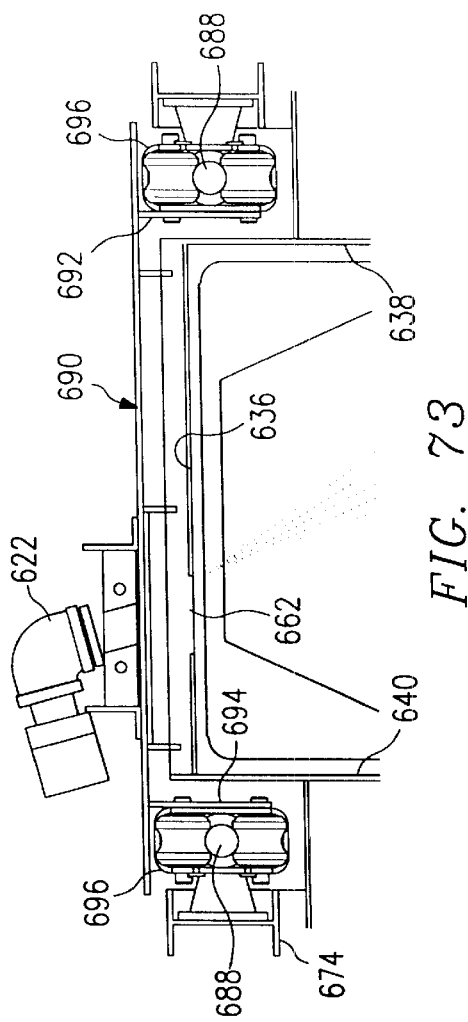
FIG. 73 is a partial cross-sectional view of the carriage showing the nozzle plate.

With reference now to FIGS. 67 and 70, the first nozzle plate 614 will be described. The second nozzle plate 618 is substantially identical, being a mirror image of the first nozzle plate 614.

The first nozzle plate 614 defines an outer cylindrical plate 690 which extends for an arc less than 180°, preferably about 140°. Side plates 692 and 694 extend radially inward from the inner surface of the plate 690 spaced inwardly of the outer edges of the plate 690. On each side plate is mounted three roller carriages 696 which engage the guide tubes 688 of the first nozzle frame 610, permitting the first nozzle plate to move in an arcuate direction relative to the first nozzle frame along the guide tubes. Four guide wheels 698 are mounted on the outer cylindrical plate 690 and bear against the outer surface of 604 (FIG. 64) binding of the roller carriages 696 and guide tubes 688 and to properly space the halves of the first nozzle frame. Near the top of the plate 690 is mounted a bracket 700. Multiple nozzles 622 are mounted on the outer cylindrical plate 690 and extend therethrough at equal spaced arcs along the plate. For example, four nozzles can be mounted on the plate at 45° spacing as shown, or five nozzles at 36° spacing, or any other number of nozzles desired.

With reference to FIGS. 71 and 72, the first oscillation drive 616 will be described. The second oscillation drive 620 is substantially identical. The first oscillation drive 616 includes a casing 702 forming a frame which is pivoted to the main frame 602 at holes 703 and attached to the first nozzle frame 610 at holes 707 by pin 678 spaced from the axis of holes 703 which allows the first oscillation drive 616 to pivot with the first nozzle frame 610 and the first nozzle plate 614. A motor 704 is mounted on the frame which drives a gear reduction unit 706 to rotate an output shaft 708. A pair of gears 710 are mounted on the shaft 708 for rotation therewith. A pair of intermediate gears 712 are mounted on the frame spaced from gear 710. Chains 714 interconnect aligned gears 710 and 712 for joint rotation. Gears 722 are mounted in casing 702 and are driven by gears 712 though chains 724. A drive link 716 is mounted between the chains 724 so that as the gears rotate, the drive link 716 is moved in a circular pattern first around gears 712 and then around gears 722. A drive bracket 718 is bolted to the bracket 700 on the first nozzle plate. A slot 720 is formed in the drive bracket which receives the drive link 716. Thus, as the motor is continuously rotated in a single direction, the gears will cause the drive link 716 to move in a continuous elongated circular pattern which, in turn, causes the drive bracket 718 to move in an oscillating arcuate manner to oscillate the first nozzle plate 614 and the nozzles mounted thereon.

The use of the chain drive allows the nozzles 622 to dwell longer at the end of its arc of travel to give better treatment at the limits of nozzle motion. This occurs because the linear speed of the chain is constant and the nozzle oscillation will slow down and dwell at the limits of its motion as the drive link 716 follows the chains about the circumference of the gears 712 and 722. By changing the diameter of gears 712 and 722 this dwell time can be varied. Even with this advantage of dwell time, the nozzle motion is smooth, without sudden stops or starts because the linear speed of the chain remains uniform throughout the oscillation.

Figure 65:
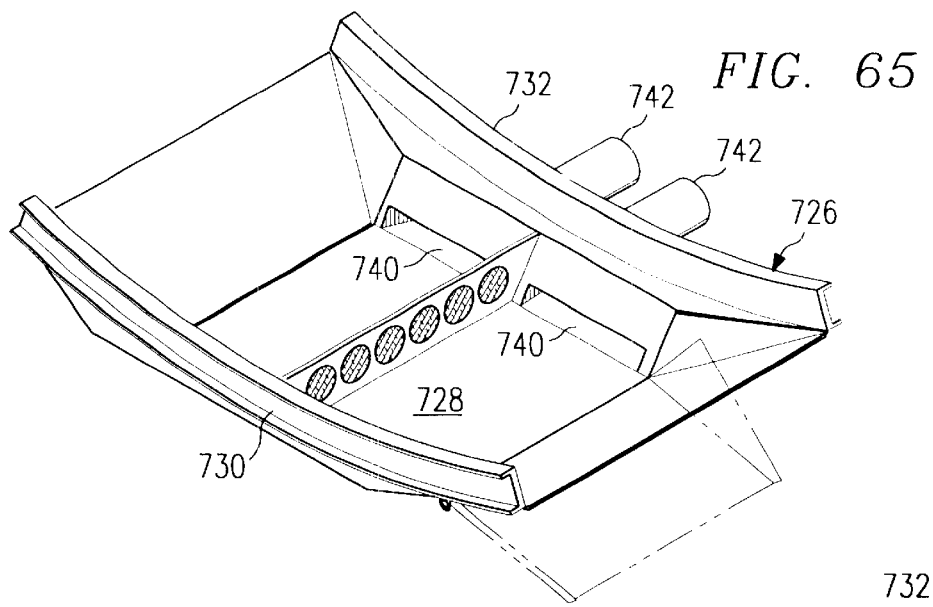
FIG. 65 is a detail view of the collection pan used in the carriage.
Figure 65A:
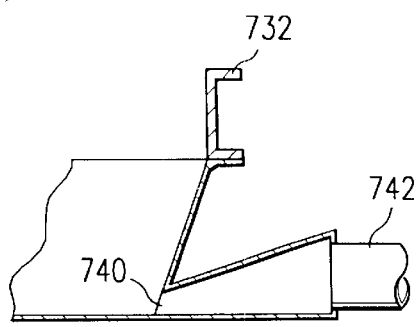
FIG. 65A is a detail cross-sectional view of a port in the collection pan.
Figure 76:
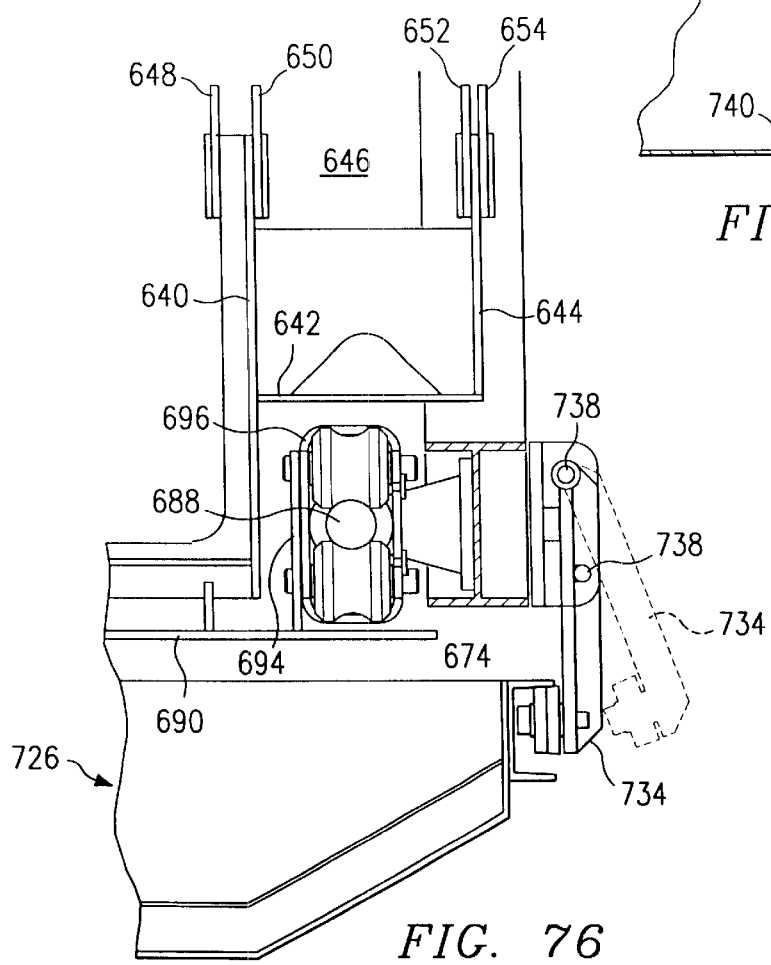
FIG. 76 is a detail view of the guide rollers of the carriage.

With reference to FIGS. 65, 66 and 67, a collection pan assembly 726 is mounted between the first and second nozzle frames 610 and 612 and is designed to catch the debris discharged from the chamber 608 and from the outer chambers 646 for collection and disposal. The housing sections 604 and 606 have holes or apertures at their lower ends which lie above the collection pan assembly 726. The debris from chambers 608 and 646 fall through these holes or apertures into the collection pan assembly. The assembly includes a collection pan 728 which has guide rails 730 and 732 mounted on opposite sides thereof. The rails 730 and 732 define a C-shaped cross section and each receive guide rollers 734 and 736 mounted on the first and second nozzle frames 610 and 612, respectively. As the nozzle frames are pivoted to the operational position, the guide rollers 734 and 736 run along the guide rails 730 and 732 to lift the collection pan 728 closer to the bottom of the housing section 604 and 606. When the nozzle frames are moved to the removal position, the guide rollers 734 and 736 move outwardly on the guide rails 730 and 732, permitting the collection pan 728 to drop downward relative to the bottom of the housing sections 604 and 606. As best seen in FIG. 76, each of the guide rollers 734 and 736 is mounted to its respective nozzle frame by two quick release pins 738 allowing the collection pan assembly to be quickly removed from the nozzle frames and permitting the apparatus 600 to be removed from or placed onto the pipe. Only one of the quick release pins need be removed, permitting the guide rollers to be pivoted outwardly about the other quick release pin as shown in phantom in FIG. 76.

On one side of the collection pan 728 ports 740 are formed through the side and mount discharge conduits 742 for drawing the debris from the collection pan 728 to a remote location for disposal.

In any of apparatus 350, 500, 550 and 600, each of the wings, housing sections and nozzle sections can be formed in multiple pivoting portions to facilitate installation and removal of the apparatus from the pipeline.

Figure 77:
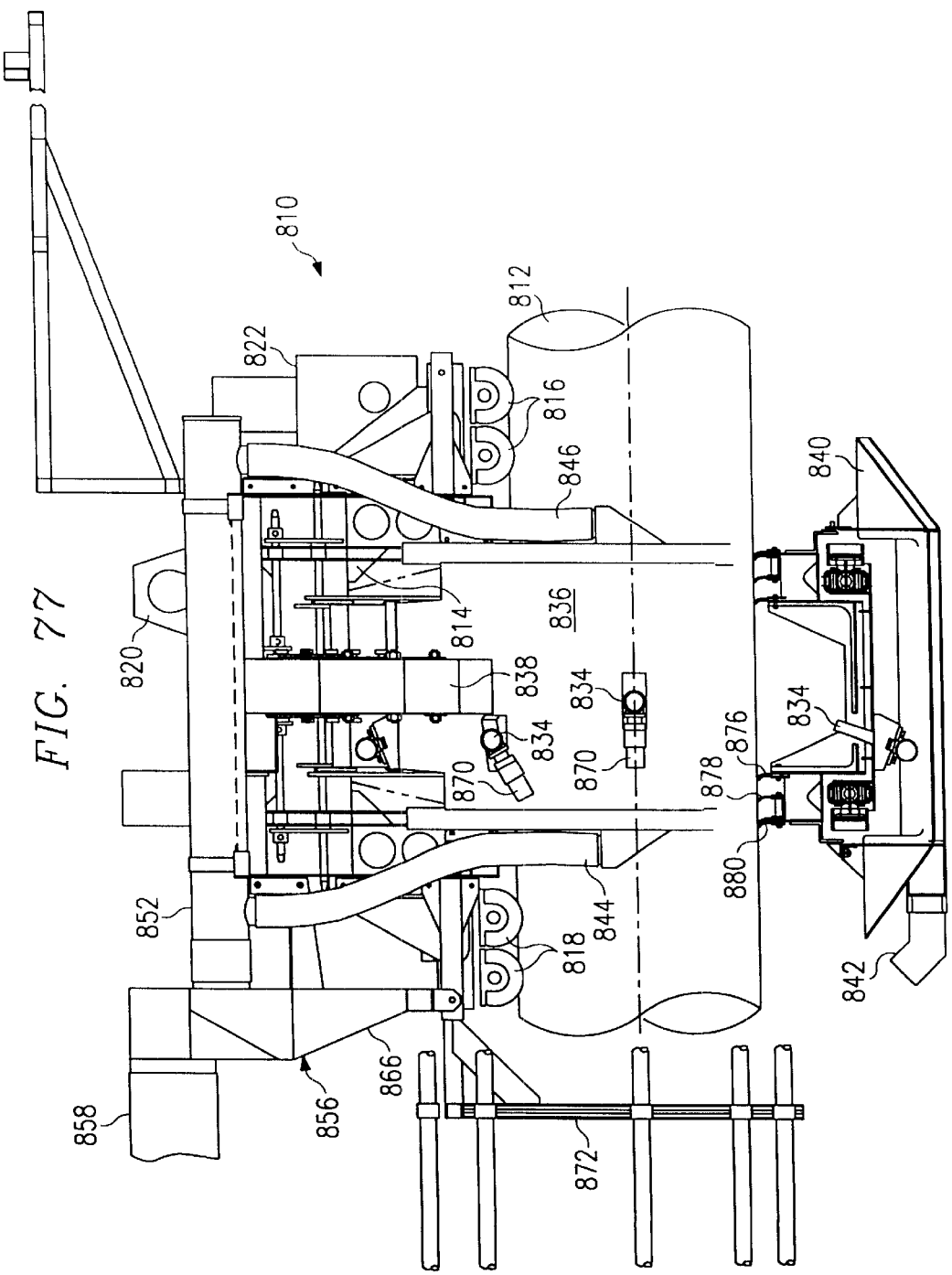
FIG. 77 is a side view of an eighth embodiment of the present invention.
Figure 78:
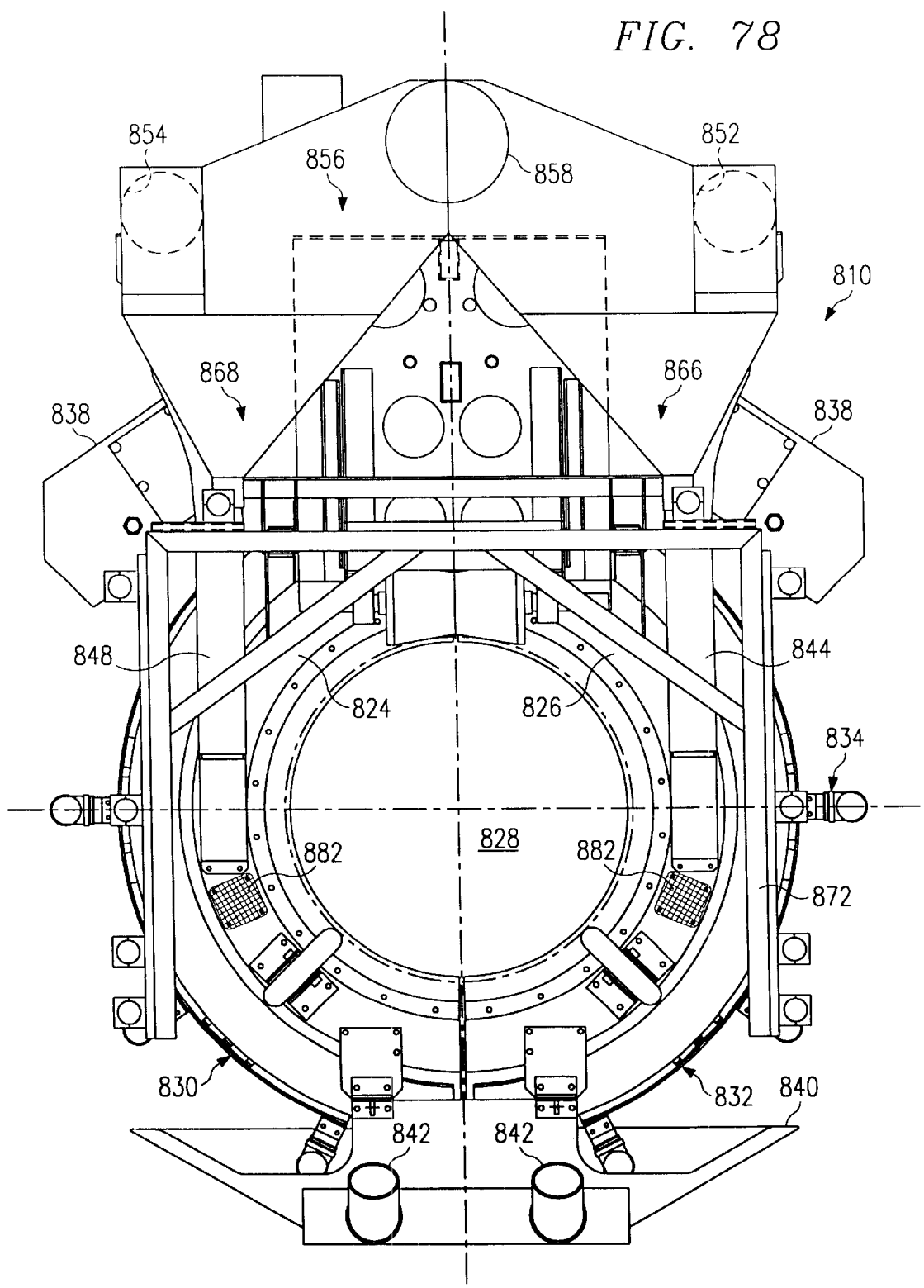
FIG. 78 is an end view of the embodiment of FIG. 77.

With reference now to FIG. 77, a pipeline treating apparatus 810 is illustrated forming an eighth embodiment of the present invention. In all respects except as noted hereafter, apparatus 810 is essentially identical to apparatus 600. The apparatus 810 is designed to travel along a pipe or pipeline 812 to clean the pipeline with jets of high pressure air with abrasive entrained in the air flow. The apparatus 810 includes a frame 814 which mounts front rollers 816 and rear rollers 818 which engage the upper surface of the pipeline to support the weight of the apparatus directly on the pipeline. The frame 814 includes a lifting eye 820 which permits the apparatus to be removed from or installed on the pipeline by a crane or the like. Frame 814 also mounts a main drive 822 which rotates the front rollers 816 to drive the apparatus 810 along the pipeline as the pipeline is cleaned.

A first blast chamber housing 824 and a second blast chamber housing 826 are pivoted from the frame 814 and completely surround the exterior of the pipeline along a portion of its length to define a blast chamber 828. The housings 824 and 826 can be pivoted from the cleaning position surrounding the pipe, as seen in FIGS. 77,f78 and 79, to a position pivoted away from the pipeline to allow the apparatus to be removed and installed from the pipeline. The blast chamber housings are very similar to housing sections 604 and 606 in apparatus 600.

A first nozzle oscillating frame 830 and second nozzle oscillating frame 832 are also pivoted onto the frame 814 separate from the housings 824 and 826. Frames 830 and 832 are very similar to nozzle frames 610 and 612 in apparatus 600. Each of the frames 830 and 832 mount a series of nozzle assemblies 834 with nozzles 911 on an oscillating plate 836 for delivery of the high pressure air and entrained abrasives to the exterior of the pipeline. The plates 836 are oscillated a predetermined arc about the exterior circumference of the pipeline by drives 838 mounted on the frames. The nozzles pass through a slit opening in the housings so that the nozzles discharge directly against the exterior of the pipeline surface.

As the high pressure air and abrasive remove the old coating from the pipeline, a large quantity of debris is generated, which includes the old coating removed from the pipeline and the abrasive. This debris must be removed from the apparatus to maintain the efficiency of the apparatus.

Further, it is desirable to separate the components of the old coating from the abrasive to allow the abrasive to be reused.

In the present invention, heavier and larger debris will fall to the bottom of the blast chamber 828 and into a collection pan 840. Pan 840 is very similar to pan assembly 726 of apparatus 600. Vacuum ducts 842 extend from the pan and are connected to a source of vacuum to draw the debris from the pan for sorting in a device traveling alongside the apparatus 810 on the right-of-way. The debris pan is preferably formed of aluminum to save weight.

Apparatus 810 further has a series of four vacuum ducts or hoses 844, 846, 848 and 850 connected about the midportion of each housing 824 and 826 near both ends of the housings. The ducts are preferably four inches in diameter. Ducts 844 and 846 extend to a header duct 852 on one side of the apparatus while ducts 848 and 850 extend to another header duct 854 on the opposite side of the apparatus. The ducts 852 and 854 are preferably eight inches in diameter. The rearward ends of the header ducts 852 and 854 are, in turn, connected to a manifold duct 856. A single centrally oriented return duct 858 is mounted on the manifold and is connected to a source of vacuum (not shown). Duct 858 is preferably twelve inches in diameter.

The vacuum drawn through the ducts causes airborne debris and dust within the blast chamber to be sucked along the ducts. The tortuous chamber defined by interior panels within the manifold duct 856 assist in separating the lighter airborne debris from the material removed from the pipeline from the heavier abrasive media. The length of ducts 844–854 and the tortuous chamber allows the abrasive to lose its momentum. The heavier material falls into hoppers 866 and 868 formed as part of the manifold duct 856 and then falls into collection pan 840. The dust will be drawn through the return duct 858 for disposal.

Each of the oscillating frames supports five nozzle assemblies 834. Therefore, the nozzle assemblies will have to be oscillated in an arc of about 36° in order to cover the entire exterior of the pipeline. Each nozzle assembly is supplied with abrasive and high pressure air through a hose 870 attached thereto. A hose support frame 872 is mounted at the rear of frame 814 which supports each of the hoses in a position approximate the center of its associated nozzle's oscillation.

Each of the nozzle assemblies is mounted on the oscillating frames by a snap fit fitting 874 shown in detail in FIGS. 81–86. The fitting 874 includes a Ushaped bracket 900 which is bolted to one of the oscillating plates 836. The facing sides of the bracket have a pair of aligned attachment holes 902 and safety holes 904.

A nozzle block 906 is inserted within the U-shaped bracket 900 and secured thereto by a pair of quick fastening pins 908 which pass through the attachment holes 902.

Figure 81:
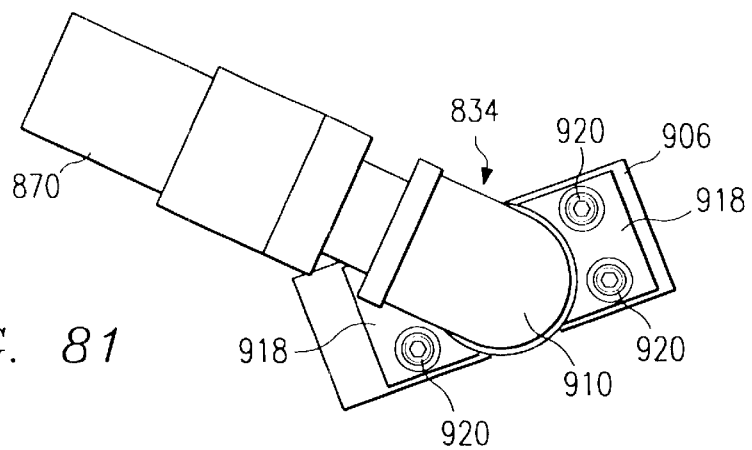
FIG. 81 is a plan view of the nozzle assembly.
Figure 82:
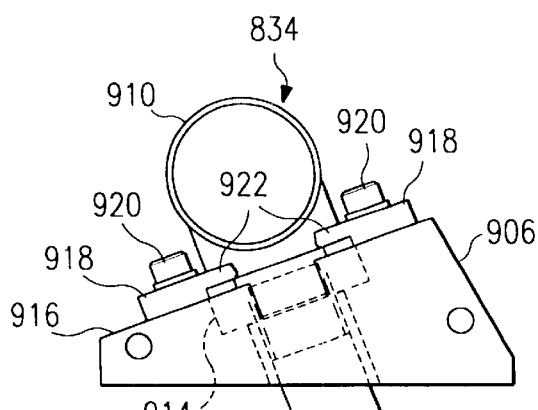
FIG. 82 is a side view of the nozzle assembly.
Figure 83:
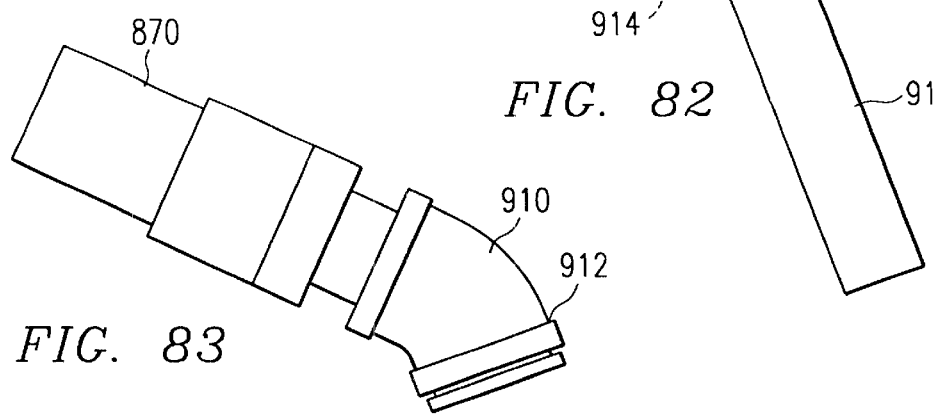
FIG. 83 is a side view of an elbow for the nozzle.
Figure 84:
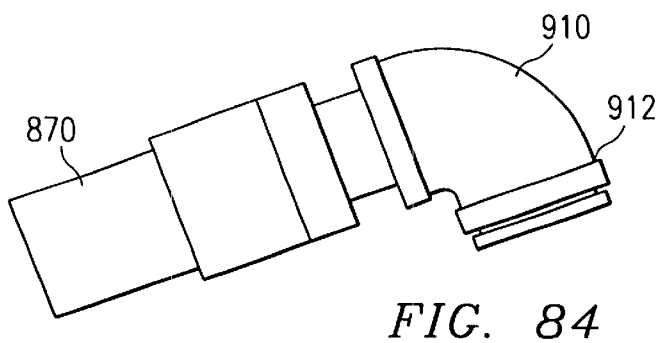
FIG. 84 is a side view of a modified elbow for the nozzle.

The nozzle 911 itself is attached to an elbow 910 which has a flange 912. FIGS. 81, 82, and 84 illustrate a right angle elbow 910. FIG. 83 shows a 45° elbow 910. The nozzle block 906 has an aperture 914 to receive the nozzle and a portion of the elbow so that the flange 912 is positioned slightly above the upper surface 916 of the block 906. A pair of securing clamps 918 are bolted to the block 906 on either side of the nozzle with bolts 920. Each securing clamp has a actuate bearing ring 922 which engages the flange 912 to secure the elbow 910, and thus the nozzle, to the nozzle block 906. Thus, to remove the nozzle, only four bolts 920 need be removed to remove the securing clamps 918 from the nozzle block 906 and the elbow 910 can simple be lifted out of the nozzle block 906. This permits the nozzles to be readily installed and removed. A threaded connection tends to become filled with debris, which made it difficult to change nozzles. Another advantage of this design is the possibility of using nozzles 911 of different configuration to tailor the nozzle to a particular application. For example, the stand off, or distance from the end of the nozzle 911 to the pipe surface being treated may need to be varied for a particular application. By installing nozzles of different length, or possibly a nozzle with an expansion adaptor on it, the machine can be tailored for the specific application relatively easily. Also, the use of securing clamps 918 allow the nozzle to be pivoted about along its axis by simply loosening the securing clamps 918 sufficient to permit the pivotal motion. This permits less strain to be exerted on the hose connecting the nozzle to the pressure source as the nozzle can be pivoted to conform with the position of the hose.

The blast chamber housings 824 and 826 are sealed at their ends to the outer surface of the pipeline to prevent debris from escaping exterior of the blast chamber. As best seen in FIG. 77, triple seals at each end are employed, which include annular seal 876, annular seal 878 and annular seal 880. Annular seal 880 is a double seal as seen in FIG. 77. Between the inner annular seal 876 and the intermediate annular seal 878, a passage is provided for debris to fall into the collection pan 840. By having a triple seal, the amount of debris escaping from the blast chamber will be better controlled.

Figure 79:
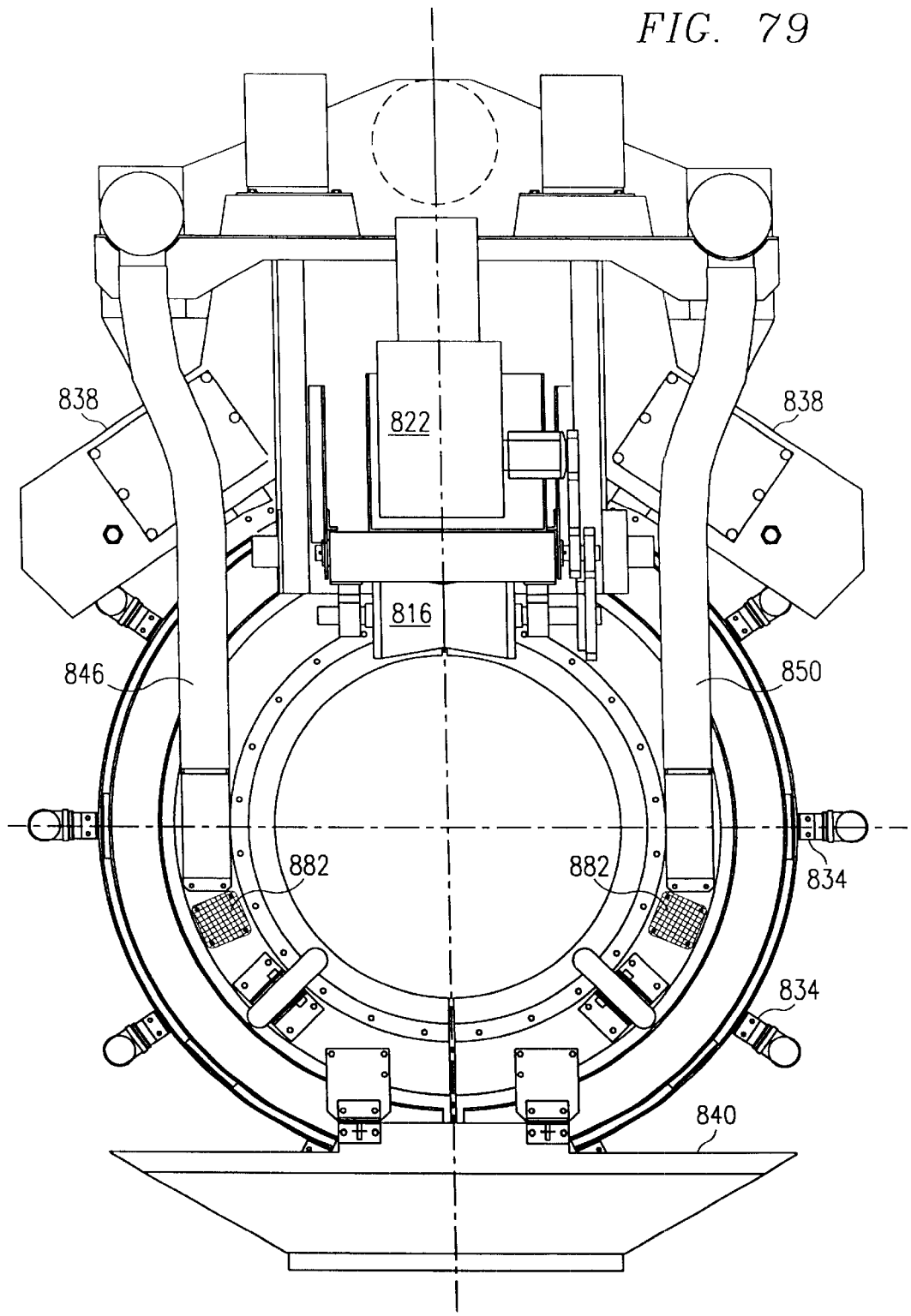
FIG. 79 is an end view from the opposite end of the embodiment shown in FIG. 77.
Figure 80:
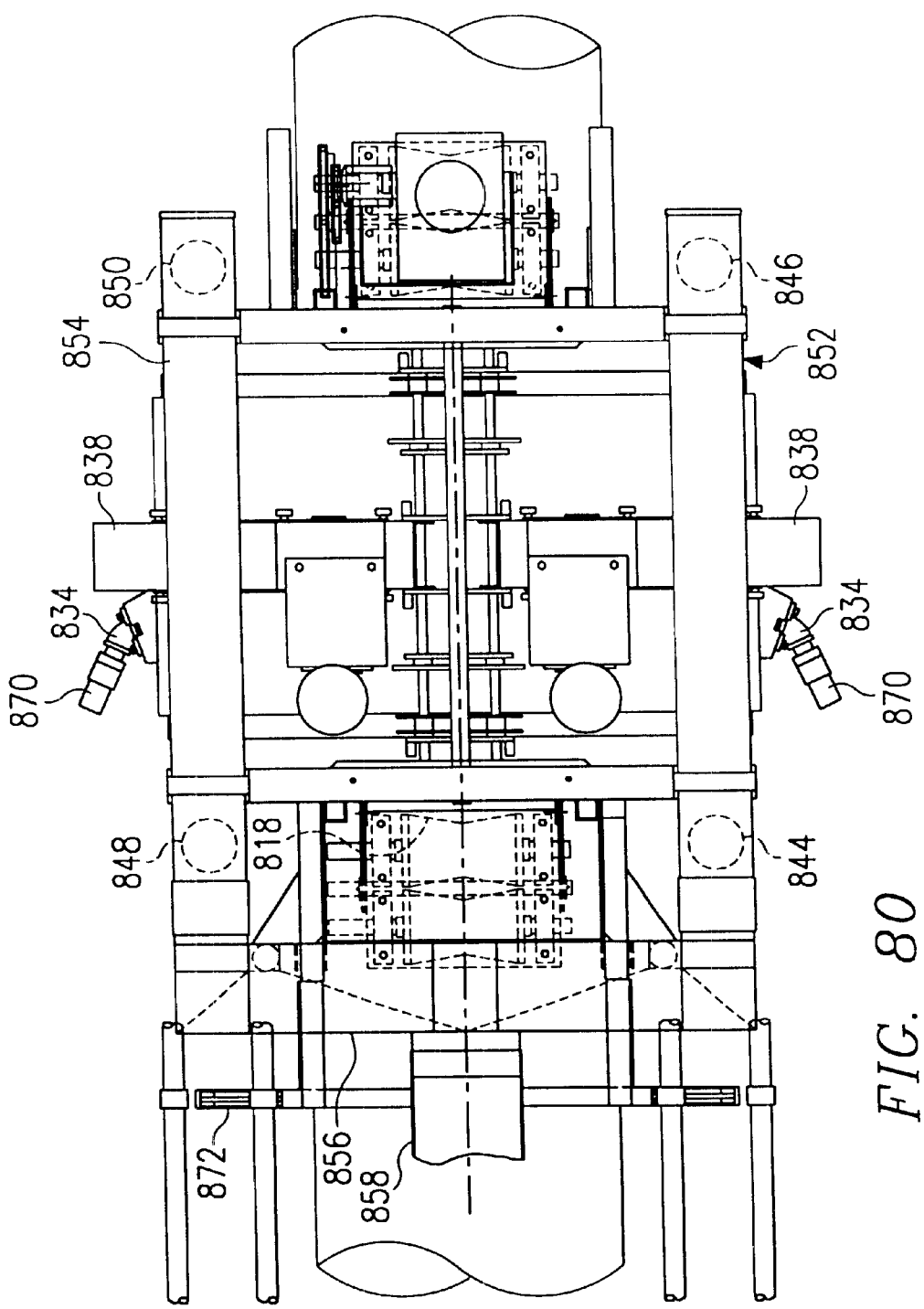
FIG. 80 is a top view of the embodiment of FIG. 80.

In addition to the use of triple seals, pressure relief filters 882 (FIG. 79) are mounted on the front ends and rear ends of the blast chamber housings which reduces the air pressure within the blast chamber 828 to reduce the driving force that would tend to drive debris past the seals 876–880. Preferably, two filters 882 are mounted at each end of each housing, for a total of eight. The filters permit air to escape from the blast chamber to reduce the air pressure therein but filter out the debris so that the debris stays within the blast chamber. It would be expected that the filters would need to be cleaned or replaced at fairly frequent intervals.

Figure 85:
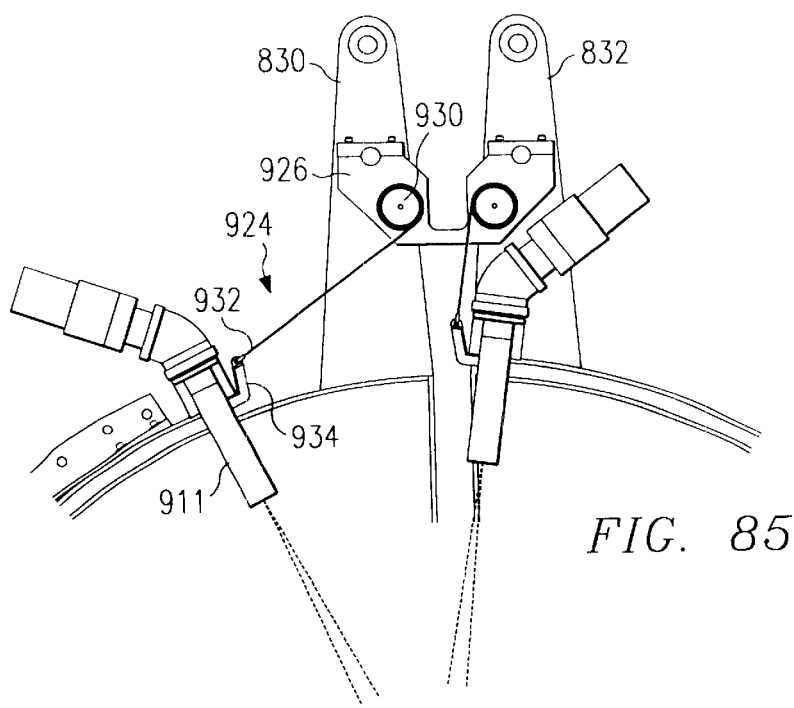
FIG. 85 is an end view showing the flexible shield.
Figure 86:
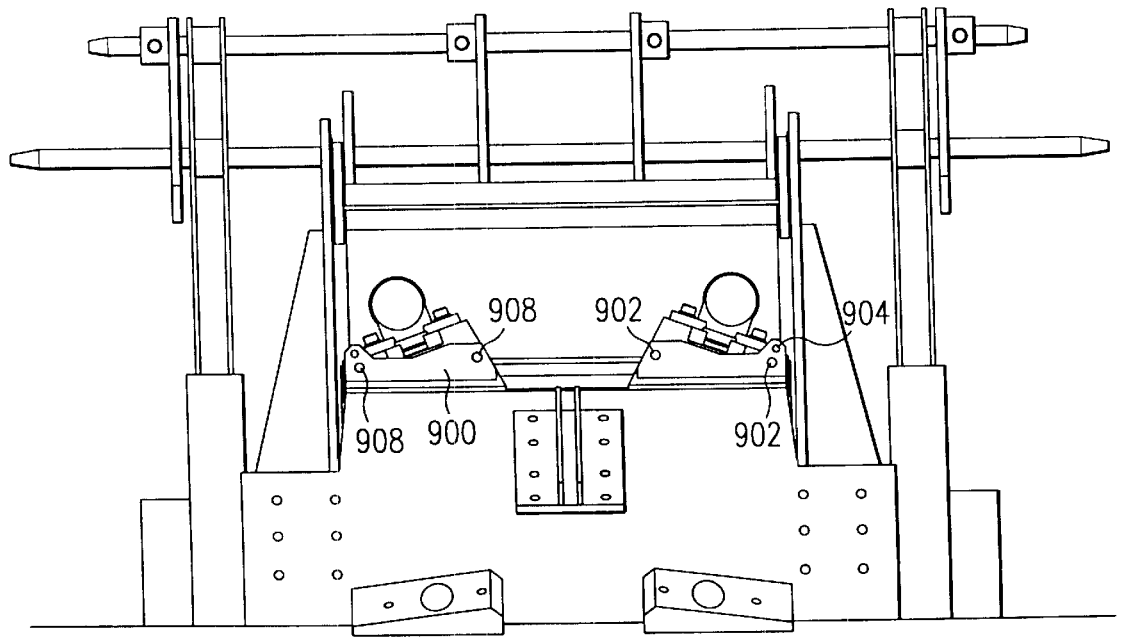
FIG. 86 is a side view of the apparatus.

As the oscillating plate 836 moves downward from the top of the apparatus, as seen in the left side of FIG. 85, a portion of the housing 824 is no longer covered by the oscillating plate. This would permit grit and debris to possibly escape the interior chamber through the gap 662 necessary for passage of the nozzles. To resist this, a shield 924 is mounted on brackets 926 which are secured to pin 928. Pin 928 is the pin on which the housing section 604 pivots from the main frame.

The shield 924 is a flexible sheet which is rolled on a roller 930 mounted between brackets 926 across the width of the oscillating plate 836. Brackets 926 are secured to the hinge pins on which oscillating frames 830 and 832 pivot and are therefore fixed relative frame 814. A spring, not shown, is mounted within the roller which normally forces the shield to roll up on the roller 930. However, the free end 932 of the shield is secured to the oscillating plate 836 by brackets 934 at either side of the plate 836. As the plate moves in an arc away from the top of the device, the free end 932 moves with the plate, unrolling portions of the shield from the roller to cover the exposed portions of the gap 662 to resist escape of debris from within the blasting chamber. As the oscillating plate moves back toward the top of the device, as seen in the right side of FIG. 85, the shield 924 is rolled up on the roller 930 by the internal spring so that there is never any slack in the portion of the shield extended from the roller 930 to the brackets 934. Any debris impacting on the shield 924 will slide down in the gap between the oscillating plate 836 and the housing sections and will either return through slots 662 or fall into the collection pan 728.

Although several embodiments of the invention have been described in the foregoing description and illustrated in the accompanying drawings, it will be understood that the invention is not limited to the embodiments disclosed, but is capable of numerous rearrangements, modifications and substitution of parts and elements without departing from the spirit and scope of the invention.

What is claimed is:

1. A pipeline treating apparatus for treating the exterior surface of pipeline, comprising:

a housing defining an enclosed chamber about a portion of the exterior surface of the pipeline;

a treating mechanism mounted on the housing to treat the exterior surface of the pipeline with a treating media, the treating media removing debris from the exterior surface of the pipeline;

a classifier and separator unit mounted on the housing to separate the debris and the treating media to permit disposal of the debris and recycling of the treating media to the treating mechanism;

a collector assembly mounted on the housing to remove the debris and treating media from the enclosed chamber to the classifier and separator unit;

the housing defining an annular housing about the circumference of the portion of the exterior surface of the pipeline being treated, the annular housing having an upper portion, an intermediate portion and a lower portion, the collector assembly including at least one upper duct connecting the upper portion of the annular housing to the classifier and separator unit, at least one intermediate duct connecting the intermediate portion of the annular housing to the classifier and separator unit and a collection tray mounted to the housing at the lower portion of the housing.

2. A pipeline treating apparatus for treating the exterior surface of a pipeline, comprising:

a housing surrounding a portion of the exterior surface of the pipeline;

at least one nozzle for spraying a treating media against the exterior surface of the pipeline;

a nozzle mounting structure mounted on the housing for oscillating movement relative the exterior of the surface of the pipeline; and the nozzle being mounted to the nozzle mounting structure by a snap-fit connection, the nozzle having a flange, the nozzle mounting structure including at least one securing clamp removably mounted on the nozzle mounting structure for engaging the flange on the nozzle when said securing clamp is mounted on the nozzle mounting structure to hold the nozzle in place.

3. The pipeline treating apparatus of claim 1 wherein the housing includes at least one vent to prevent overpressure of the chamber, the vent having a filter mounted therein to prevent debris and treating media from escaping the chamber through the vent.

4. A pipeline treating apparatus for treating the exterior surface of a pipeline, comprising:

a housing defining an enclosed chamber about a portion of the exterior surface of the pipeline;

a treating mechanism mounted on the housing to treat the exterior surface of the pipeline with a treating media, the treating media removing debris from the exterior surface of the pipeline;

a classifier and separator unit mounted on the housing to separate the debris and the treating media to permit disposal of the debris and recycling of the treating media to the treating mechanism;

a collector assembly mounted on the housing to remove the debris and treating media from the enclosed chamber to the classifier and separator unit;

wherein the housing includes a mainframe, a first housing section pivotally mounted to the mainframe and a second housing section pivotally mounted to the mainframe, the first and second housing sections defining the enclosed chamber when the first and second housing sections are pivoted to a first position, the first and second housing sections pivoted to a second position for removal of the pipeline treating apparatus from the pipeline, the classifier and separator unit mounted on the mainframe, the collector assembly including at least one duct extending between each of the housing sections and the mainframe, the ducts accommodating pivotal motion of the housing sections between the first position and the second position.

5. The pipeline treating apparatus of claim 1 wherein the classifier and separator unit includes an inertial separator to separate the debris from the treating media.

6. The pipeline treating apparatus of claim 1 further comprising first, second and third seals mounted on the housing and sealing against the exterior surface of the pipeline to resist movement of the debris and treating media from the chamber exterior the pipeline treating apparatus.

7. A pipeline treating apparatus for treating pipeline, comprising:

a mainframe;

a first housing section pivotally mounted to the mainframe extending about substantially one-half the circumference of the pipeline;

a second housing section pivotally mounted on the mainframe extending about substantially the other half of the circumference of the pipeline, the first and second housing sections defining a chamber between the housing sections and the exterior of the pipeline;

a first nozzle frame pivotally mounted to the mainframe separately from the first housing section and extending about substantially one-half the circumference of the pipeline;

a second nozzle frame pivotally mounted on the mainframe separately from the second housing section extending about substantially the other half of the circumference of the pipeline;

a first nozzle plate mounted on the first nozzle frame for oscillating motion relative thereto;

a second nozzle plate mounted on the second nozzle frame for oscillating motion relative thereto;

at least one nozzle mounted on each of said nozzle plates for discharging a treating media against the surface of the pipeline to remove debris from the surface of the pipeline;

a classifier and separator unit mounted on the mainframe to separate the debris and the treating media to permit disposal of the debris and recycling of the treating media to the nozzles; and at least one duct connecting each of said housing sections with the classifier and separator unit to move debris and treating media from the chamber to the classifier and separator unit.

8. The pipeline treating apparatus of claim 7 wherein each of the first and second housing sections include a front end and a rear end, a duct connecting the front end of each of the housing sections to the classifier and separator unit and a duct connecting each of the rear ends of the housing sections to the classifier and separator unit.

9. The pipeline treating apparatus of claim 8 wherein each of the ducts extending from the first housing section connect to a first housing section manifold duct, the first housing section manifold duct connecting to the classifier and separator unit, each of the ducts extending from the second housing section extending to a second housing section manifold duct, the second housing section manifold duct extending to the classifier and separator unit.

10. The pipeline treating apparatus of claim 7 wherein the classifier and separator unit is an inertial separator.

11. The pipeline treating apparatus of claim 7 further comprising a collection pan mounted between the first and second housing sections proximate the lower end of the pipeline treating apparatus, the debris separated by the classifier and separator unit being returned to the collection tray.

12. The pipeline treating apparatus of claim 11 wherein the first and second housing sections include at least first and second seals sealing against the exterior of the pipeline, a chamber being defined between the first and second seals, the chamber connected to the collection tray so that debris entering the chamber falls into the collection tray.

13. The pipeline treating apparatus of claim 12 wherein the first and second housing sections further include a third seal sealing against the exterior of the pipeline.

14. The pipeline treating apparatus of claim 7 further including at least one vent mounted on each of the housing sections, the vent including a filter to prevent debris and treating media from escaping from the chamber to exterior the pipeline treating apparatus, the vent preventing overpressure of the chamber.

15. The pipeline treating apparatus of claim 7 further including a hose connected to each of said nozzles to supply said nozzle with treating media, a hose support mounted on the housing separated from the nozzle and supporting the hose as the nozzle is oscillated.

16. The pipeline treating apparatus of claim 15 further including a hose connected to the nozzle to supply the nozzle with treating media, a hose support mounted on the housing separated from the nozzle and supporting the hose as the nozzle is oscillated.

17. The pipeline treating apparatus of claim 2, wherein the nozzle mounting structure includes a nozzle block having an aperture therein and a U-shaped bracket, the U-shaped bracket mounted on the housing and having at least one pair of aligned apertures, the nozzle block having at least one aperture therethrough, the nozzle mounting structure further including at least one quick fastening pin for passing through the aligned pair of apertures in the U-shaped bracket and aperture in the nozzle block to secure the nozzle block to the U-shaped bracket, the nozzle being mounted on the nozzle block.

18. The pipeline treating apparatus of claim 17, wherein a pair of securing clamps are bolted to the nozzle block on either side of the aperture, the nozzle being mounted to the nozzle block by the securing clamps, at least a portion of the nozzle entering the aperture in the nozzle block, said securing clamps extending over the flange when the nozzle is fit within the aperture and the nozzle block to mount the nozzle on the nozzle block.

19. The pipeline treating apparatus of claim 7, wherein each of said nozzles is mounted on said nozzle plate by a snap fit connection.

* * * * *